US011922145B2

(12) United States Patent
Taber et al.

(10) Patent No.: US 11,922,145 B2
(45) Date of Patent: Mar. 5, 2024

(54) INITIATING DATA PRIVACY PIPELINES USING REUSABLE TEMPLATES

(71) Applicant: MICROSOFT TECHNOLOGY LICENSING, LLC, Redmond, WA (US)

(72) Inventors: Yisroel Gershon Taber, Raanana (IL); Ittay Levy Ophir, Giv'atayim (IL); Lev Rozenbaum, Kfar-Saba (IL); Nerya Cohen, Elkana (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/684,210

(22) Filed: Mar. 1, 2022

(65) Prior Publication Data
US 2023/0280986 A1 Sep. 7, 2023

(51) Int. Cl.
G06F 8/36 (2018.01)
(52) U.S. Cl.
CPC ..................... G06F 8/36 (2013.01)
(58) Field of Classification Search
None
See application file for complete search history.

(56) References Cited

U.S. PATENT DOCUMENTS

| 5,907,692 | A | 5/1999 | Wise et al. |
| 8,346,870 | B2 | 1/2013 | Jazdzewski |
| 8,478,722 | B2 | 7/2013 | Lee et al. |
| 8,613,070 | B1 | 12/2013 | Deva et al. |
| 8,621,649 | B1 | 12/2013 | Van Dijk et al. |

(Continued)

FOREIGN PATENT DOCUMENTS

| CN | 110210211 A | 9/2019 |
| EP | 3477527 A1 | 5/2019 |

(Continued)

OTHER PUBLICATIONS

Liu, "Mona: Secure Multi-Owner Data Sharing for Dynamic Groups in the Cloud", 2013, IEEE (Year: 2013).*

(Continued)

Primary Examiner — Hossain M Morshed
(74) Attorney, Agent, or Firm — Shook, Hardy & Bacon L.L.P.

(57) ABSTRACT

Implementations are directed to developing and facilitating a data collaboration using a data collaboration tool that bundles data pipelines and governing contracts into a data collaboration app. The data collaboration tool may include an authoring mode and may include an electronic canvas that visually represents all contracts and pipelines of the data collaboration app on a single canvas and visually represents traceability from the contracts to the pipeline elements they enable. A developer may use authoring mode to develop a template app that includes placeholder elements, including a reference to an anonymous placeholder participant. The template app may be shared, and a recipient may invite data collaborators to fill in the placeholder elements and deploy the app, enabling the data collaborators to trigger the data pipelines to execute in a data trustee environment to generate insights from each other's assets without exposing the assets to the collaborators or the developer.

20 Claims, 26 Drawing Sheets

(56) References Cited

U.S. PATENT DOCUMENTS

| | | | |
|---|---|---|---|
| 9,195,850 B2 | 11/2015 | Hess | |
| 9,703,834 B2 | 7/2017 | Sityon et al. | |
| 9,817,991 B2 | 11/2017 | Boncha et al. | |
| 10,496,653 B1 | 12/2019 | Epshteyn et al. | |
| 10,642,832 B1 | 5/2020 | Neumann et al. | |
| 10,834,087 B1 | 11/2020 | Pillai et al. | |
| 2004/0083217 A1* | 4/2004 | Brackett | G16H 50/70 |
| 2004/0111639 A1 | 6/2004 | Schwartz et al. | |
| 2005/0154729 A1 | 7/2005 | Gutsche | |
| 2006/0080554 A1* | 4/2006 | McDonald | G06F 21/6254 |
| | | | 713/189 |
| 2006/0282281 A1 | 12/2006 | Egetoft | |
| 2007/0073695 A1 | 3/2007 | Conlan et al. | |
| 2007/0130616 A1 | 6/2007 | Ng et al. | |
| 2009/0282045 A1* | 11/2009 | Hsieh | H04L 63/104 |
| | | | 707/999.009 |
| 2010/0287562 A1 | 11/2010 | Jazdzewski | |
| 2011/0085667 A1 | 4/2011 | Berrios | |
| 2012/0143922 A1* | 6/2012 | Rane | G06F 21/6245 |
| | | | 707/E17.005 |
| 2013/0007835 A1 | 1/2013 | Iyer et al. | |
| 2013/0239228 A1 | 9/2013 | Cinarkaya et al. | |
| 2013/0247204 A1 | 9/2013 | Schrecker et al. | |
| 2013/0276134 A1 | 10/2013 | Meredith et al. | |
| 2014/0173720 A1 | 6/2014 | Jain et al. | |
| 2015/0163206 A1 | 6/2015 | Mccarthy et al. | |
| 2015/0317490 A1 | 11/2015 | Carey et al. | |
| 2015/0379082 A1 | 12/2015 | Hu et al. | |
| 2016/0132553 A1 | 5/2016 | Seo et al. | |
| 2016/0132686 A1 | 5/2016 | Peng | |
| 2017/0169253 A1 | 6/2017 | Curcio et al. | |
| 2017/0185752 A1 | 6/2017 | Lemay et al. | |
| 2017/0235645 A1 | 8/2017 | Theimer et al. | |
| 2017/0364553 A1 | 12/2017 | Jacob et al. | |
| 2018/0032576 A1 | 2/2018 | Romero | |
| 2018/0053012 A1 | 2/2018 | Myers et al. | |
| 2018/0060603 A1 | 3/2018 | Ahmed et al. | |
| 2018/0129585 A1 | 5/2018 | Martin et al. | |
| 2018/0157928 A1 | 6/2018 | Oliveira et al. | |
| 2018/0203701 A1 | 7/2018 | Nield et al. | |
| 2018/0210936 A1 | 7/2018 | Reynolds et al. | |
| 2018/0225630 A1 | 8/2018 | Creager et al. | |
| 2018/0239639 A1 | 8/2018 | Novak et al. | |
| 2018/0262864 A1 | 9/2018 | Reynolds et al. | |
| 2018/0322168 A1 | 11/2018 | Levine et al. | |
| 2018/0349384 A1* | 12/2018 | Nerurkar | G06F 16/24578 |
| 2019/0147085 A1 | 5/2019 | Pal et al. | |
| 2019/0207974 A1 | 7/2019 | Jas et al. | |
| 2019/0213346 A1 | 7/2019 | Friedman | |
| 2019/0236598 A1 | 8/2019 | Padmanabhan | |
| 2019/0303115 A1 | 10/2019 | Kelly et al. | |
| 2019/0318198 A1 | 10/2019 | Griffin et al. | |
| 2020/0173004 A1 | 6/2020 | Fujiwara et al. | |
| 2020/0250334 A1 | 8/2020 | Bandi et al. | |
| 2020/0252210 A1 | 8/2020 | Sharfman et al. | |
| 2020/0265057 A1 | 8/2020 | Jolfaei | |
| 2020/0334259 A1 | 10/2020 | Taber et al. | |
| 2020/0334370 A1 | 10/2020 | Turgeman et al. | |
| 2020/0334375 A1 | 10/2020 | Turgeman et al. | |
| 2020/0334377 A1 | 10/2020 | Turgeman et al. | |
| 2020/0336488 A1* | 10/2020 | Turgeman | G06F 21/602 |
| 2021/0081432 A1 | 3/2021 | Grunwald et al. | |
| 2021/0096936 A1 | 4/2021 | Seshadri et al. | |
| 2022/0067199 A1* | 3/2022 | Taber | G06F 21/6254 |
| 2022/0067200 A1 | 3/2022 | Taber et al. | |
| 2022/0121555 A1 | 4/2022 | Zbiciak et al. | |
| 2022/0215119 A1 | 7/2022 | Turgeman et al. | |
| 2022/0215120 A1 | 7/2022 | Turgeman et al. | |
| 2022/0215121 A1 | 7/2022 | Turgeman et al. | |
| 2022/0215122 A1 | 7/2022 | Turgeman et al. | |
| 2022/0215123 A1 | 7/2022 | Turgeman et al. | |
| 2022/0215124 A1 | 7/2022 | Turgeman et al. | |
| 2022/0215125 A1 | 7/2022 | Turgeman et al. | |
| 2022/0398338 A1 | 12/2022 | Turgeman et al. | |
| 2023/0281109 A1 | 9/2023 | Taber et al. | |
| 2023/0281342 A1 | 9/2023 | Taber et al. | |

FOREIGN PATENT DOCUMENTS

| | | |
|---|---|---|
| WO | 2006076520 A2 | 7/2006 |
| WO | 2010129432 A2 | 11/2010 |

OTHER PUBLICATIONS

"Notice of Allowance Issued in U.S. Appl. No. 17/743,341", dated Jul. 21, 2023, 11 Pages.

Behl, et al., "An Analysis of Cloud Computing Security Issues", In Proceedings of the World Congress on Information and Communication Technologies, Oct. 30, 2012, pp. 109-114.

"Non-Final Office Action Issued in U.S. Appl. No. 17/656,079", dated Oct. 10, 2023, 31 Pages.

Batini, et al., "Methodologies for Data Quality Assessment and Improvement", In Journal of ACM Computing Surveys, vol. 41, Issue 3, Jul. 30, 2009, pp. 1-52.

"Non Final Office Action Issued in U.S. Appl. No. 17/009,407", dated Nov. 17, 2022, 21 Pages.

"Final Office Action Issued in U.S. Appl. No. 16/388,696", dated Feb. 28, 2022, 21 Pages.

"Advisory Action Issued in U.S. Appl. No. 16/388,696", dated Jul. 15, 2021, 4 Pages.

"Final Office Action Issued In U.S. Appl. No. 16/388,696", dated May 3, 2021, 22 Pages.

"Non Final Office Action Issued in U.S. Appl. No. 16/388,696", dated Aug. 20, 2021, 21 Pages.

"Non Final Office Action Issued in U.S. Appl. No. 16/388,696", dated Oct. 30, 2020, 23 Pages.

"Notice of Allowance Issued in U.S. Appl. No. 16/388,696", dated May 23, 2022, 10 Pages.

"Non Final Office Action Issued in U.S. Appl. No. 16/388,700", dated Dec. 11, 2020, 20 Pages.

"International Search Report and Written Opinion Issued in PCT Application No. PCT/US21/037147", dated Sep. 24, 2021, 10 Pages.

"Final Office Action Issued in U.S. Appl. No. 16/388,700", dated Jun. 18, 2021, 22 Pages.

"Notice of Allowance Issued in U.S. Appl. No. 16/388,700", dated Mar. 16, 2022, 10 Pages.

"Notice of Allowance Issued in U.S. Appl. No. 16/388,700", dated Oct. 7, 2021, 10 Pages.

"Non Final Office Action Issued in U.S. Appl. No. 16/388,703", dated Dec. 11, 2020, 25 Pages.

"Final Office Action Issued in U.S. Appl. No. 16/388,703", dated May 25, 2021, 24 Pages.

"Notice of Allowance Issued in U.S. Appl. No. 16/388,703", dated Mar. 16, 2022, 10 Pages.

"International Search Report and Written Opinion Issued in PCT Application No. PCT/US21/037152", dated Sep. 24, 2021, 10 Pages.

"Notice of Allowance Issued in U.S. Appl. No. 16/388,703", dated Nov. 2, 2021, 10 Pages.

"Non Final Office Action Issued in U.S. Appl. No. 16/665,916", dated May 14, 2021, 22 Pages.

Sharma, et al., "Live Data Analytics with Collaborative Edge and Cloud Processing in Wireless IoT Networks", In Journal of IEEE Access, vol. 5, Apr. 24, 2017, pp. 4621-4635.

"Notice of Allowance Issued in U.S. Appl. No. 16/665,916", dated Nov. 29, 2021, 11 Pages.

"Notice of Allowance Issued in U.S. Appl. No. 16/665,916", dated Mar. 23, 2022, 10 Pages.

"Non Final Office Action Issued in U.S. Appl. No. 16/736,399", dated Jun. 11, 2021, 21 Pages.

Xiao, et al., "Security and Privacy in Cloud Computing", In IEEE Communications Surveys & Tutorials, Accepted For Publication, vol. 15, Issue 2, 2013, pp. 843-859.

(56) References Cited

OTHER PUBLICATIONS

"International Search Report and Written Opinion Issued in PCT Application No. PCT/US2020/023043", dated May 15, 2020, 14 Pages.
"Notice of Allowance Issued in U.S. Appl. No. 16/736,399", dated Sep. 24, 2021, 9 Pages.
"International Search Report and Written Opinion Issued in PCT Application No. PCT/US2020/023037", dated May 29, 2020, 17 Pages.
"International Search Report and Written Opinion Issued in PCT Application No. PCT/US2020/026488", dated Jun. 16, 2020, 15 Pages.
"Non Final Office Action Issued in U.S. Appl. No. 17/009,414", dated Oct. 13, 2021, 14 Pages.
"Notice of Allowance Issued in U.S. Appl. No. 17/009,414", dated Feb. 15, 2022, 10 Pages.
Fan, Wenfei, "Data Quality: From Theory to Practice", In Journal of ACM SIGMOD Record, vol. 44, Issue 3, Sep. 2015, pp. 7-18.
Montori, et al., "A Collaborative Internet of Things Architecture for Smart Cities and Environmental Monitoring", In Journal of Internet of Things, vol. 5, Issue 2, Apr. 2018, pp. 592-605.
Papernot, et al., "SoK: Security and Privacy in Machine Learning", In IEEE European Symposium on Security and Privacy, Apr. 24, 2018, pp. 399-414.
"International Search Report and Written Opinion Issued in PCT Application No. PCT/US20/023234", dated Jun. 8, 2020, 12 Pages.
"International Search Report and Written Opinion Issued in PCT Application No. PCT/US20/024331", dated Jun. 15, 2020, 15 Pages.
"Notice of Allowance Issued in U.S. Appl. No. 16/736,399", dated Mar. 30, 2022, 6 Pages.
"Notice of Allowance Issued in U.S. Appl. No. 17/009,407", dated Apr. 18, 2023, 8 Pages.
"International Search Report and Written Opinion Issued in PCT Application No. PCT/US23/010524", dated May 9, 2023, 11 Pages.
"International Search Report and Written Opinion Issued in PCT Application No. PCT/US23/011487", dated May 4, 2023, 13 Pages.
"International Search Report and Written Opinion Issued in PCT Application No. PCT/US22/054022", dated Apr. 28, 2023, 12 Pages.
"Non Final Office Action Issued in U.S. Appl. No. 17/743,341", dated Mar. 14, 2023, 9 Pages.
"Office Action Issued in European Patent Application No. 20719528.0", dated Apr. 5, 2023, 5 Pages.
"Non Final Office Action Issued in U.S. Appl. No. 17/656,051", dated Aug. 24, 2023, 37 Pages.
"Non Final Office Action Issued in U.S. Appl. No. 17/656,073", dated Sep. 19, 2023, 32 Pages.
"Non Final Office Action Issued in U.S. Appl. No. 17/684,204", dated Sep. 14, 2023, 10 Pages.
"Office Action Issued in Indian Patent Application No. 202117045000", dated Sep. 21, 2023, 8 Pages.
"Office Action Issued in Indian Patent Application No. 202117044993", dated Aug. 3, 2023, 7 Pages.
"Office Action Issued in European Patent Application No. 20718931.7", dated Sep. 5, 2023, 9 Pages.
"Office Action Issued in European Patent Application No. 20719254.3", dated Sep. 6, 2023, 11 Pages.
"Office Action Issued in European Patent Application No. 20721859.5", dated Sep. 7, 2023, 8 Pages.
"Office Action Issued in European Patent Application No. 20722753.9", dated Sep. 7, 2023, 7 Pages.
Rezig, et al., "Debugging Large-Scale Data Science Pipelines using Dagger", In Proceedings of the VLDB Endowment, vol. 13, Issue 12, Aug. 1, 2020, pp. 2993-2996.
Brachmann, et al., "Data Debugging and Exploration with Vizier", In Proceedings of the International Conference on Management of Data, Jun. 30, 2019, pp. 1877-1880.
Chen, et al., "Enrichr: Interactive and Collaborative HTML5 Gene List Enrichment Analysis Tool", In Journal of BMC Bioinformatics, vol. 14, Issue 1, Apr. 15, 2013, pp. 1-14.
Dimitrova, et al., "Authorization-Aware Optimization for Multi-Provider Queries", In Proceedings of the 34th ACM/SIGAPP Symposium on Applied Computing, Apr. 8, 2019, pp. 431-438.
Hellerstein, et al., "Ground: A Data Context Service", In Proceedings of 8th Biennial Conference on Innovative Data Systems Research, Jan. 8, 2017, 12 Pages.
"Non Final Office Action Issued in U.S. Appl. No. 17/656,082", dated Oct. 27, 2023, 36 Pages.
"Office Action Issued in European Patent Application No. 20719528.0", dated Oct. 25, 2023, 6 Pages.
U.S. Appl. No. 16/388,700 | US-2020-0334259-A1, filed Apr. 18, 2019 | Oct. 22, 2022.
U.S. Appl. No. 16/388,703 | US-2020-0334375-A1, filed Apr. 18, 2019 | Oct. 22, 2022.
U.S. Appl. No. 16/388,696 | US-2020-0334370-A1, filed Apr. 18, 2019 | Oct. 22, 2020.
U.S. Appl. No. 16/665,916 | US-2020-0334377-A1, filed Oct. 28, 2019 | Oct. 22, 2022.
U.S. Appl. No. 16/736,399 | US-2020-0336488-A1 | U.S. Pat. No. 11,356,456, filed Jan. 7, 2022 | Oct. 22, 2020 | Jun. 7, 2022.
U.S. Appl. No. 17/009,407 | US-2022-0067199-A1, filed Sep. 1, 2020 | Mar. 3, 2022.
U.S. Appl. No. 17/009,414 | US-2022-0067200-A1 | U.S. Pat. No. 11,361,106, filed Sep. 1, 2020 | Mar. 3, 2022 | Jun. 14, 2022.
U.S. Appl. No. 17/743,341, filed May 12, 2022.
U.S. Appl. No. 17/887,989, filed Aug. 15, 2022.
U.S. Appl. No. 17/684,204, filed Mar. 1, 2022.
U.S. Appl. No. 17/684,189, filed Mar. 1, 2022.
U.S. Appl. No. 17/656,051 | US-2022-0215119-A1, filed Mar. 23, 2022 | Jul. 7, 2022.
U.S. Appl. No. 17/656,057 | US-2022-0215120-A1, filed Mar. 23, 2022 | Jul. 7, 2022.
U.S. Appl. No. 17/656,062 | US-2022-0215121-A1, filed Mar. 23, 2022 | Jul. 7, 2022.
U.S. Appl. No. 17/656,066 | US-2022-0215122-A1, filed Mar. 23, 2022 | Jul. 7, 2022.
U.S. Appl. No. 17/656,073 | US-2022-0215123-A1, filed Mar. 23, 2022 | Jul. 7, 2022.
U.S. Appl. No. 17/656,079 | US-2022-0215124-A1, filed Mar. 23, 2022 | Jul. 7, 2022.
U.S. Appl. No. 17/656,082 | US-2022-0215125-A1, filed Mar. 23, 2022 | Jul. 7, 2022.
"Non Final Office Action Issued in U.S. Appl. No. 17/656,057", dated Nov. 13, 2023, 35 Pages.
"Notice of Allowance Issued in U.S. Appl. No. 17/743,341", dated Nov. 15, 2023, 12 Pages.
Xia, et al., "MeDShare: Trust-Less Medical Data Sharing Among Cloud Service Providers via Blockchain", In Journal of IEEE Access, vol. 5, Jul. 24, 2017, pp. 14757-14767.

\* cited by examiner

▼ Access to *IdentityData* dataset is granted to Device Marketing@Contoso by Identity Solutions@Fabrikam

Basics
Name                IdentityResolutionData
Description

Resource
Name        IdentityData
Type        DataAssetReference
Owner       Identity Solutions|Fabrikam

Subject
Name        Device Marketing | Contoso

Constraints
Constraint Type    Script
Script Name        IdentityResolution       } 315

Policies
Policy Type
Output name     Output
Applies to      Enriched
                enriched

310

▼ Access of the *Enriched* output is granted to Device Marketing@Contoso

Basics
Name            EnrichedData
Description

Resource
Name        Enriched
Type        VirtualOutputReference

Subject
Name        Device Marketing | Contoso

Constraints
Constraint Type     Script
Script Name         DeviceActivationReport    ⎫
Adapter Settings    JsonRepotOutputAdapter    ⎬ 325
report                                         ⎭

Add Entitlement                                                    ×

Entitlement name
910 ─ [ logs                                              > ]

Entitlement description
920 ─ [ Enter entitlement description                        ]

Entitlement asset
930 ─ [ ContosoDataPreparation                            > ]

Partner
940 ─ [ Device Marketing Contoso | Contoso                > ]

950 ─ Constraints    Policies ─ 960

Policy Type
970 ─ [ Output                                            > ]

Output name                  Applies to
980 ─ [ DiagnosticOutput ]    [ Enter sink name ]

🗑 Delete

＋Add new policy

[ Cancel ]  [ Save ]

| + Create new dataset ⟳ Refresh 🗑 Delete | | | |
|---|---|---|---|
| 🔍 *Filter by name* | | | |
| ☐ NAME | CREATED BY | DESCRIPTION | LAST UPDATED |
| ☐ ActivatedDevices | admin@ciprodtenant1outlook.onmi... | | 03/05/2021, 14:22 |
| ☐ DeviceReportOutput | admin@ciprodtenant1outlook.onmi... | | 03/05/2021, 15:22 |
| ☐ ContosoSales | admin@ciprodtenant1outlook.onmi... | | 27/10/2021, 21:43 |
| ☐ SuperSecretHiddenDataset | admin@ciprodtenant1outlook.onmi... | | 09/11/2021, 18:05 |

INITIATING DATA PRIVACY PIPELINES USING REUSABLE TEMPLATES

BACKGROUND

Businesses and technologies increasingly rely on data. Many types of data can be observed, collected, derived, and analyzed for insights that inspire progress in science and technology. In many cases, valuable intelligence can be derived from datasets, and useful products and services can be developed based on that intelligence. This type of intelligence can help advance industries such as banking, education, government, health care, manufacturing, retail, and practically any other industry. However, in many cases, the datasets owned or available to a particular data owner are incomplete or limited in some fundamental way. Information sharing is one way to bridge gaps in datasets, and sharing data has become an increasingly common practice. There are many benefits from sharing data. However, there are also many concerns and obstacles.

SUMMARY

Some implementations described in present disclosure are directed to techniques for developing and facilitating a data collaboration using a data collaboration tool that bundles data pipelines and governing contracts into a data collaboration app. For example, the data collaboration tool may include a development or authoring mode in which a data collaboration app may be defined on one or more interfaces such as a canvas capable of representing multiple contracts, multiple pipelines, and traceability from the contracts to corresponding assets that are governed by the contracts and used in the pipelines. In some implementations, instead of requiring participants to a data privacy pipeline (e.g., data collaborators) to build their own pipelines, the data collaboration tool allows some other developer to create a data collaboration app with one or more placeholder elements, such that the data collaboration app may serve as a reusable template. As such, the developer may share the template data collaboration app with an initiator and/or other participants (e.g., using a sharing feature of the data collaboration tool, an app store that supports data collaboration apps). Sharing the template data collaboration app may duplicate or clone the template app and create an instance of the template app in the recipient's workspace in the data collaboration tool. A recipient initiator may then initiate a collaboration and invite participants into the app, the participants may fill in placeholders, and the data collaboration app may be signed and deployed by the participants, without granting access to the developer.

Some implementations described in the present disclosure are directed to techniques for facilitating debugging without exposing tenant data through diagnostic logs. At a high level, a data collaboration tool may provide a development or authoring mode in which a data pipeline may be defined on one or more interfaces such as a canvas, and a production mode in which agreed upon data pipelines may be triggered and run on real (production) data. In some implementations, to protect against leakage of secured tenant data into diagnostic logs and out of the data trustee environment, the data collaboration tool may deny the participants access to diagnostic logs generated by a computational step running on production data (e.g., during production mode). To facilitate debugging, in some implementations, a debug mode of the data collaboration tool runs over sample data instead of production data. Since debug mode does not use production data, a data privacy pipeline may run in debug mode even if a governing contract has not been signed (and entitlements have not been granted), and/or diagnostic logs generated by a computational step in debug mode may be made available for viewing, exporting, and the like. This way, data privacy pipelines may be tested and debugged on sample data before a contract has been signed, and may be tested and debugged during production if something goes wrong while running a data privacy pipeline governed by a signed contract.

However, running over sample data will not always reproduce every exception that can occur during production. As such, some implementations described in the present disclosure are directed to techniques for facilitating debugging in production mode without exposing diagnostic logs. In some implementations, a data collaboration tool of a data trustee environment treats diagnostic logs or other log data generated by a data privacy pipeline (or entitlement, or governing contract, etc.) in production mode as a virtual data asset owned by the participants to the data privacy pipeline (or entitlement, governing contract, etc.), or by specified designated owner(s). The data collaboration tool may allow one of the constructive or designated owners to generate production log data, save or store it in a protected or secured manner (e.g., in secured storage the data trustee environment, encrypted and exported), and/or operate on the production log data to derive insights without exposing the contents of the production log data. For example, one of the participants to a particular data privacy pipeline may define a particular diagnostic log as a named virtual data asset, define an entitlement that permits the participants to use the virtual data asset in a data privacy pipeline in the data trustee environment, and build a debugging pipeline that analyzes the log. As such, the participant may trigger the particular data privacy pipeline in production mode to generate and store the diagnostic log in the data trustee environment, and trigger the debugging pipeline to derive insights from the diagnostic log without exposing the diagnostic log.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein:

FIGS. 3 and 4 are illustrations of an example configuration of example entitlements associated with the data collaboration app illustrated in FIG. 2, in accordance with certain implementations described herein;

FIG. 9 is an illustration of an example user interface for adding an entitlement that permits the use of diagnostic logs generated by a particular computational step, in accordance with certain implementations described herein;

FIG. 12 is an illustration of an example user interface listing available datasets in a particular workspace, in accordance with certain implementations described herein;

DETAILED DESCRIPTION

Overview

Figure 1:
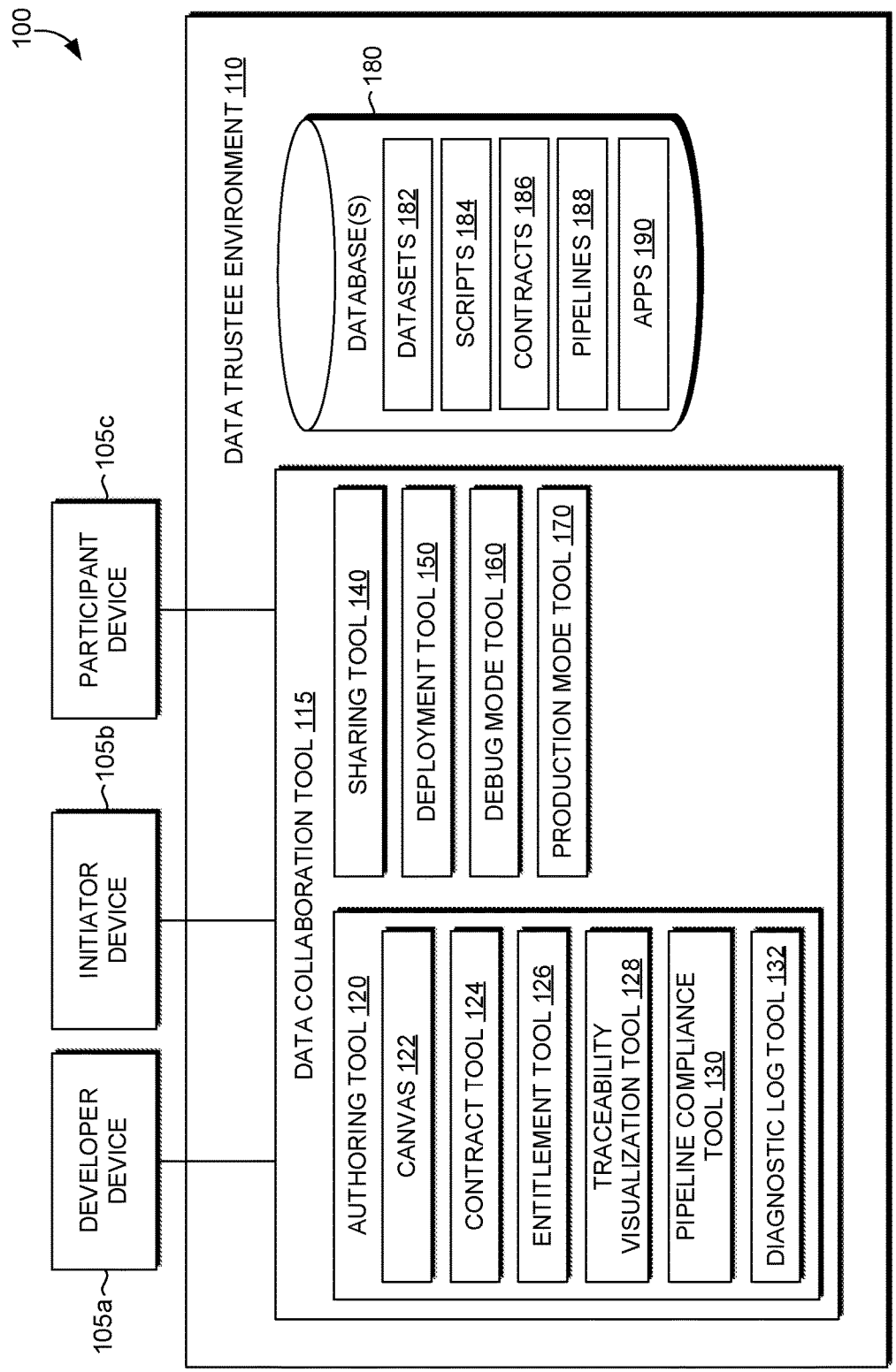
FIG. 1 is a block diagram of an example development and debugging environment, in accordance with certain implementations described herein.

There are many benefits from sharing data. For example, sharing data often leads to more complete datasets, encourages collaborative efforts, and produces better intelligence (e.g., understanding or knowledge of an event or circumstance, or information, relationships, and facts about different types of entities). Researchers benefit from more data being available. Further, sharing can stimulate interest in research and can incentivize the production of higher data quality. Generally, sharing can result in synergies and efficiencies in research and development.

However, there are also many concerns and obstacles to sharing data. As a practical matter, different industries vary in ability and willingness to share data. Issues with data privacy and confidentiality are fundamental to many industries such as health care and banking. In many cases, laws, regulations, and consumer demands place restrictions on the ability to share data (e.g., the right be forgotten, right to revoke consent for having your data used in data analytics). Furthermore, the act of observing, collecting, deriving, and analyzing datasets is often an expensive and labor-intensive exercise, and many have concerns that sharing data would give away a competitive advantage. Even when there is sufficient motivation to share data, issues with control and access to shared data are often an obstacle to sharing. In effect, the obstacles often prevent data sharing and the opportunities for progress that come with it. As such, there is a need for data sharing techniques that facilitate development of collaborative intelligence while ensuring data privacy and facilitating control and access to shared data.

Accordingly, some implementations described in the present disclosure provide techniques for sharing and using shielded assets within a data trustee environment without exposing the shielded assets. At a high level, a data trustee may operate a trustee environment configured to derive collaborative intelligence (e.g., data analytics) for tenants subject to configurable constraints, without exposing underlying raw data or other assets provided by the tenants. By relying on trustee computing to perform data processing, tenants can collaborate to derive data from each other's assets without exposing each other's assets or compromising data privacy. To accomplish this, a data collaboration tool of a data trustee environment may be used to develop one or more data privacy pipelines that may execute within the data trustee environment and through which data may be ingested, fused, derived, and/or sanitized to generate collaborative data. Generally, collaborative data or collaborate intelligence refers to data that has been derived from input data from any number of sources (e.g., different users or tenants). The input data may be processed in the data trustee environment by any number of computational steps of a data privacy pipeline that executes in the data trustee environment to generate the collaborative data. Once configured, a data privacy pipeline can be thought of as a data processing template or pattern that can be triggered and spun up in the data trustee environment by an authorized participant. As such, a data privacy pipeline may generate collaborative data using data or other assets provided by one or more tenants, and provide agreed-upon access to the collaborative data without sharing the underlying raw data or other assets with the tenants.

In prior applications, each party to a data privacy pipeline was a participant in its creation, or a party could contribute an asset (e.g., data or a script) by granting an entitlement to use that asset in the data trustee environment. However, some parties would likely prefer to trust an expert in data sharing to set up a data privacy pipeline on their behalf. In some cases, parties may not even be aware that certain collaborations could add value. Imagine some expert in medical research data that has the knowledge and experience to design a collaboration and approach potential collaborators, explaining where each party would plug in to create valuable collaborative data. It would be useful for that expert to develop and share a data privacy pipeline, without necessarily granting that expert access to a deployed pipeline or any input or output data.

Data Collaboration App. As such, some implementations described in the present disclosure provide techniques for developing and facilitating a data collaboration. In some implementations, a data collaboration tool of a data trustee environment bundles or packages a collection of data privacy pipelines and/or contracts into a data collaboration app (or program) or other logical unit with shared parameters. For example, the data collaboration tool may include a development or authoring mode in which a data collaboration app may be defined on one or more interfaces such as a canvas capable of representing multiple contracts, multiple pipelines, and traceability from the contracts to corresponding assets that are governed by the contracts and used in the pipelines. In some implementations, instead of requiring participants to a data privacy pipeline (e.g., data collaborators) to build their own pipelines, the data collaboration tool allows some other developer to create a data collaboration app with one or more placeholder elements, such that the data collaboration app may serve as a reusable template. As such, the developer may share the template data collaboration app with an initiator and/or other participants (e.g., using a sharing feature of the data collaboration tool, an app store that supports data collaboration apps). Sharing the template data collaboration app may duplicate or clone the template app and create an instance of the template app in the recipient's workspace in the data collaboration tool. A recipient initiator may then initiate a collaboration and invite participants into the app, the participants may fill in placeholders, and the data collaboration app may be signed and deployed by the participants, without granting access to the developer.

In some implementations, the data collaboration tool provides a canvas on which one or more contracts, pipelines, their interrelationships, and/or placeholder elements may be defined, arranged, and/or visually represented. In some implementations, during authoring, the data collaboration tool may allow an author to incorporate (e.g., add a reference or pointer to) assets of the author, assets that have been granted to the author by some contract (e.g., an entitlement), and/or placeholder elements for (e.g., references to) assets of another into a contract or pipeline of the app. In an example implementation, as long as an author's account in the data collaboration tool includes a contract that grants the author approval to use a particular asset of another in a data trustee environment, the data collaboration tool allows the author to incorporate (e.g., add a pointer to) that asset into his or her pipelines (e.g., on the canvas) in the tool. Note that although an app or pipeline is defined to operate over tenant assets, in an example implementation, apps and pipelines do not store the tenant assets themselves, but rather, pointers to the tenant assets (e.g., their storage locations in the data trustee environment). In other words, viewing an app or pipeline under development in the data collaboration tool will not expose the contents of the assets to the collaborators. Once a completed app or pipeline is triggered, the data collaboration tool may use the pointers to ingest the assets into the data trustee environment for the purposes of executing the app or pipeline, without exposing the assets.

In some implementations, the canvas (and/or some other interface(s) of the data collaboration tool) visually represents multiple contracts and/or multiple pipelines that are bundled into a data collaboration app. Generally, pipelines may be governed by any number of contracts. Since contracts may represent mutually agreed partners, governed assets, and/or entitlements (e.g., permissions to use assets, constraints applied upon access, policies applied on downstream use), there are often multiple ways in which governing contracts may be designed to accomplish similar technical objectives (e.g., 100 contracts with 1 entitlement each vs. 1 contract with 100 entitlements). However, it may be desirable to separate some partners and/or entitlements into separate contracts for various reasons (e.g., to separate collaborations with different partners for visibility purposes, to separate assets that should be subject to different constraints or policies, to separate collaborations into smaller units to reduce the impact in case a broadly scoped collaboration needs to be revised or renegotiated). Since the data collaboration app may be solving one business problem, it will often be useful to visually represent all contracts and pipelines of the data collaboration app on one canvas, including a visual representation of which contracts (e.g., entitlements) enable which pipeline components. This visual representation of traceability may be thought of as overlaying the governing contracts on top of the pipelines.

The canvas may visually represent the different pipelines (e.g., as data flow diagrams with blocks that represent computational steps); the different contracts (e.g., in a list or legend); pipeline participants (e.g., in a list, icons, bubbles); which participants are party to which contract, which participants contributed which assets, and/or which pipeline elements are enabled by which contract or entitlement (e.g., using a network connected lines, using different colors, shapes, outlines, or shading, and/or other ways); pipeline compliance (e.g., some visual indication of whether a pipeline or one of its elements is or is not enabled based on current contracts or entitlements); and/or other aspects. In an example implementation, the canvas accepts user input creating an element of a pipeline (e.g., an input dataset, a computational script, a model, a placeholder asset), and in response, the data collaboration tool creates an electronic representation of a corresponding contract (or contract template with placeholder participants) with an entitlement that enables that element. The canvas may include a tool that allows an author to edit entitlements and associate them with particular contract instances. Additionally or alternatively, the canvas may accept user input interacting with (e.g., clicking or tapping on) a particular pipeline element, and the canvas may responsively display a representation of any entitlements that enable that element, accept user input creating a new entitlement related to that element, and/or otherwise. In some implementations, a contract governing a particular entitlement automatically inherits the participants (and/or placeholder participants) specified in an entitlement governed by the contract. These are just a few examples, and other user interfaces and/or interface elements may additionally or alternatively be implemented.

In some implementations, a data collaboration tool may accept one or more placeholder elements in lieu of specifying a particular participant or asset. When a data collaboration app is developed with a contract or pipeline with a placeholder element, it may be considered a template data collaboration app. The template data collaboration app may represent any number of template contracts and/or template pipelines packaged or bundled together. A template contract may represent different participants, shielded assets governed by the contact, and/or entitlements that represent permissions, constraints, and/or policies on the use of the shielded assets. A template pipeline may represent input dataset(s), computational steps (e.g., scripts, models), and/or output dataset(s). The template data collaboration app may include any number and type of placeholder elements (e.g., placeholder participants, placeholder datasets, placeholder scripts, placeholder models).

For example, in some cases, instead of identifying a particular participant or asset, the data collaboration tool may accept a placeholder element that represents a participant or asset to be added at some future time. The data collaboration app may treat the placeholder element as a named object. This enables a developer to reference the named object in multiple contracts and/or pipelines in the data collaboration app. In some implementations, the data collaboration app tracks and/or associates all references to the named object in the app. This way, when the named object is replaced, the data collaboration tool may programmatically replace all references to the named object across all contracts and pipelines in the app, without requiring each reference to be updated individually.

The ability to create a placeholder for a participant enables a non-participant developer to create a template data collaboration app on behalf of the participant and share the template data collaboration app with the participant. This way, participants to a data privacy pipeline (e.g., data collaborators) need not develop their data collaboration app or pipeline themselves, and the developer does not need to be a part of the collaboration itself. Instead, a participant who receives a template app or pipeline (e.g., an initiator) may use the data collaboration tool to initiate a collaboration by inviting partners to fill in and/or customize the template app or pipeline. Similarly, placeholder participants allow a developer (whether or not a participant) to design or customize a collaboration that involves a particular participant before inviting that participant. When a developer is finished creating some or all of the relevant contracts, entitlements, and/or pipelines involving a particular participant, the developer may use the data collaboration tool to invite the participant, and in some implementations, the participant sees a ready-made data collaboration app (or template app) in his or her workspace. In some cases, all the participant needs to do is replace an applicable placeholder participant with a representation of themselves and/or replace applicable placeholder datasets, scripts, and/or models with their corresponding asset(s). As such, placeholder elements such as placeholder participants facilitate creation of template data collaboration apps, template contracts, and/or template data privacy pipelines.

In some implementations, the data collaboration tool facilitates sharing a template data collaboration app with a participant and filling in placeholder elements. Generally, a new app, contract, and/or pipeline under development may initially exist in the workspace of the developer. In some implementations, the data collaboration tool places one or more restrictions on sharing a template data collaboration app with an initiator. For example, the data collaboration tool may prevent sharing a template data collaboration app (as opposed inviting a participant, for example) when the template data that collaboration app includes a physical pointer to real (production) data. That is, a template data collaboration app may only be sharable when it uses placeholders instead of physical pointers to real data. As such, in some implementations, when a developer uses the data collaboration tool to share a template app (and/or a template pipeline) with one or more placeholder elements, the data collaboration tool may duplicate or clone the template app and create an instance of the template app in the recipient's workspace in the data collaboration tool. In some implementations, the data collaboration tool permits sharing and/or deploying a particular template app multiple times (e.g., multiple initiators, the same initiator but different partners), whether directly to a particular recipient or through discoverable location such as an app store.

An initiator with whom a template data collaboration app has been shared may fill in placeholder elements (e.g., by replacing placeholder objects with an identification of participants and/or pointers to assets the initiator is responsible for contributing), customize the app, and/or initiate a collaboration with his or her partners (e.g., by inviting the partners into the data collaboration app). The other participants may fill in the placeholders they are responsible for contributing (e.g., by adding pointers to datasets, scripts, models), and the data collaboration app may be signed and deployed by the participants, without granting access to a non-participant developer.

In some implementations, the data collaboration tool implements a permissions model by which the only changes a participant can make is to fill in placeholders. This type of permissions model may obviate the need for signatures. In a prior version of the data collaboration tool, after a contract was signed by some parties, if that contract was subsequently changed (e.g., an entitlement policy or constraint was added or modified), the existing signatures were revoked and the contract needed to be re-signed. On the other hand, if a permissions model disallows changes except for filling in placeholders, these types of changes may not be considered to modify the trust structure of the contract, so the data collaboration tool may not require participant signatures before a completed data collaboration app may be deployed. In another implementation that uses this permissions model but does use signatures, the data collaboration tool may allow a participant to sign the data collaboration app before some other participant has swapped out his or her placeholders (e.g., by inserting a pointer to his or her data). Implementations such as these would streamline data collaboration app development, simplify the user experience, and hide complexity in the app development process from the participants.

In an example use case, assume Contoso manufactures a product for a retailer named Fabrikam, and Fabrikam is the exclusive customer of this product. Assume Contoso has a proprietary model that enables Contoso to enhance the product it creates for Fabrikam, but in order to run the model, Contoso needs data from Fabrikam. Assume Contoso and Fabrikam are interested in two data processing flows, one for training that should run once every month, and one for inferring that should happen every day. Assume, therefore, that Contoso or Fabrikam are interested in two pipelines. In the first pipeline, Contoso will train a model over Fabrikam's data, and in the second pipeline, Contoso will infer using the trained model over Fabrikam's data. Assume Contoso and Fabrikam want two contracts governing the two corresponding pipelines. In this case, certain assets would be used in multiple contracts and pipelines. For example, the output from the training pipeline (a trained model) is used as an input into the inferring pipeline. Both parties Contoso and Fabrikam would appear in both contracts and both pipelines. In this example, a developer may use a data collaboration tool to generate a single data collaboration app that represents each of these common participants and assets with its own named object that persists across all contracts and pipelines in the app.

For example, assume that some expert in analyzing retail and consumer product goods companies, such as an independent software vendor (ISV), is interested in developing a data collaboration app for companies like Contoso and Fabrikam. This expert may know how to take retailer data and consumer product data, bring them together, and add value, optionally using the expert's own scripts and/or data. This expert may also know how to match retailers and consumer goods companies in a way that their data could be used to create valuable insights. Assume the expert is working on behalf of a consumer goods company (e.g., Contoso) that works with multiple retailers (e.g., Fabrikam). Since the consumer goods company may want insights into their relationships with different retailers, the expert may create one app in which the consumer goods company has three (or more) different contracts with corresponding retailers and one pipeline that takes the data from all three of them, puts it together, and generates insights. In this example, the expert may use the data collaboration tool to create a template data collaboration app with template contracts, a template pipeline, and placeholder elements. In some cases, the expert may insert him or herself as one of the participants and/or include a placeholder participant for an unspecified participant, as a placeholder for the consumer goods company. As such, when the expert shares the template data collaboration app with Contoso, Contoso (e.g., an employee) may replace the expert with itself as the participant, or fill in the placeholder participant with itself, and the data collaboration tool may programmatically replace all references to the expert or placeholder participant in the template data collaboration app with Contoso (e.g., a tenant account for Contoso). As such, Contoso may fill in the template app and initiate a collaboration by inviting other participants (e.g., Fabrikam), the other participants may fill in their placeholders, and the resulting data collaboration app may be signed and deployed by the participants, without granting access to the expert.

Now assume the template data collaboration app developed by the ISV would be useful for some other set of partners besides Contoso and Fabrikam. In other words, assume the ISV created some the template data collaboration app as a generic way to assess how a product manufactured by a consumer goods company is selling through one or more retailers. In an example implementation, the ISV may share the template data collaboration app with any number of consumer goods companies or retailers, and each recipient may deploy the app multiple times with separate partners. The ISV may share the template data collaboration app with Starbucks, who deploys the app to evaluate sales of its products through Kroeger. The ISV may also share the template data collaboration app with Dunkin Donuts, who deploys the app to evaluate sales of its products through Walmart. As such, the ISV may facilitate different data collaborations among different sets of partners using the same template data collaboration app, making it much easier for the data collaborators to generate insights from their data since the data collaborators need not take part in the development of the app.

In some implementations, the data collaboration tool monitors the heath of all the signed contracts and deployed pipelines in the app, provides aggregate statistics for all of the constituent parts at the app level, and/or provides an application error notification about any errors in one of the constituent parts (e.g., if one of the constituent contracts gets revoked). By abstracting out lower level details, the data collaboration tool makes it easier for data collaborators to monitor the health of their data collaboration apps.

As such, the techniques described herein provide an enhancement to data privacy pipelines, allowing parties to come together and decide what to compute in a more flexible way than in prior techniques, thereby promoting new and more efficient collaborations than prior techniques. Accordingly, the techniques described herein enable less technical users to take advantage of the data collaboration tool, lowering barriers to entry and promoting data collaboration without comprising data privacy.

Debut Mode. One of the practical realities of building data pipelines (e.g., data privacy pipelines) is that debugging will likely need to occur. To give a simple example, assume a particular computational step is expecting an input dataset with a certain data schema, but there is some kind of mismatch with a specified input dataset (e.g., a typo in a column name, a missing column of data, an incorrectly specified data type). In another example, there may be a bug or some other unexpected behavior in a specified computational script. Computation platforms (e.g., Javascript, Kusto Query Language, SparkQL, Python, C#Linq) typically provide one or more diagnostic logs that facilitate debugging. For example, when SparkQL runs a script, SparkQL may generate a console log and an event log, which can be used for debugging. However, secured tenant data that should not be exposed to collaborators could potentially leak into a diagnostic log generated by a computational step of a shared data privacy pipeline.

As such, some implementations described in the present disclosure are directed to techniques for facilitating debugging without exposing tenant data through diagnostic logs. At a high level, a data collaboration tool may provide a development or authoring mode in which a data pipeline may be defined on one or more interfaces such as a canvas, and a production mode in which agreed upon data pipelines may be triggered and run on real (production) data. In some implementations, to protect against leakage of secured tenant data into diagnostic logs and out of the data trustee environment, the data collaboration tool may deny the participants access to diagnostic logs generated by a computational step running on production data (e.g., during production mode). To facilitate debugging, in some implementations, a debug mode of the data collaboration tool runs over sample data instead of production data. Since debug mode does not use production data, a data privacy pipeline may run in debug mode even if a governing contract has not been signed (and entitlements have not been granted), and/or diagnostic logs generated by a computational step in debug mode may be made available for viewing, exporting, and the like. This way, data privacy pipelines may be tested and debugged on sample data before a contract has been signed, and may be tested and debugged during production if something goes wrong while running a data privacy pipeline governed by a signed contract.

In some implementations, an interface of the data collaboration tool accepts user input specifying sample data for a particular input dataset, and the data collaboration tool may use the sample data during debug mode and the input dataset (production data) during production mode. Recall the data collaboration tool is designed to facilitate data collaboration (e.g., deriving insights from production data from different collaborators) without exposing the production data. There are many reasons why a collaborator might want to shield her or her data, so depending on the type of data involved, a collaborator might choose to provide sample data that does not raise similar privacy or secrecy concerns, like mock (e.g., dummy), random, or expired data. In some implementations, the data collaboration tool accepts an upload or other identification (e.g., storage location) of a sample dataset for each input dataset (e.g., via an interface that accepts an upload or other identification of input datasets), such that each input dataset has sample and production data. In another example, an interface such as a canvas that visually represents a data privacy pipeline (e.g., as a flow diagram with components representing input datasets, computational steps, and/or output datasets) may accept user input identifying a sample dataset through interactions with components of a data privacy pipeline. In an example implementation, interacting with a particular input dataset or computational step may trigger a pop-up window or panel with configurable properties that accept an identification of an applicable sample dataset (e.g., to replace a particular input dataset, to input into a particular computational step) for production mode.

In some implementations, an interface of the data collaboration tool accepts user input enabling an option to save diagnostic log(s) generated by a particular computational step of a data privacy pipeline during debug mode. In an example implementation, interacting with a particular computational step may trigger a properties pop-up window or panel with configurable properties that accept user input enabling an option to save diagnostic log(s) generated by that computational step during debug mode. The interface (and/or some other interface of the data collaboration tool) may accept user input triggering execution of the data privacy pipeline in debug mode. In some implementations, triggering a pipeline in debug mode substitutes sample data for production data, executes the computational steps of the pipeline on the sample data, thereby generating sample transformations, sample outputs, and sample diagnostic logs. In some implementations, a monitoring view provides a notification of encountered exceptions and/or in which computational step they occurred without exposing the contents of the step's script, enabling the script owner to run the script outside of the data collaboration tool to investigate. Additionally or alternatively, (e.g., if an option to save sample diagnostic logs is enabled), the data collaboration tool exports the sample diagnostic logs (e.g., to a specified location, the participant's storage account), and the participant that triggered the pipeline in debug mode may access and investigate the sample diagnostic logs.

In an example use case, a participant to a data privacy pipeline under development (e.g., that has not been signed or deployed yet) may run the pipeline in debug mode to identify potential bugs before deployment. However, it is also possible that an issue arises after the pipeline has been signed and deployed. For example, assume an authorized participant triggers a data privacy pipeline in production mode, and something goes wrong and the participant sees an error message saying the pipeline failed to run. Since sample data is usually a smaller size than production data, running a pipeline in debug mode over sample data may consume less compute resources than in production mode. As such, the participant may run the pipeline in debug mode on sample data to see if the bug reproduces. If it does, the participant may fix the issue, for example, by updating one of the scripts for a computational step in the pipeline. If use of that script was governed by a contract and the script is changed, the signatures on the contract may be revoked, the contract may be re-signed, and the updated pipeline may be redeployed.

As such, data privacy pipelines may be tested and debugged on sample data before a contract has been signed, and may be tested and debugged during production if something goes wrong while running a data privacy pipeline governed by a signed contract. Without this capability, users would need to create separate pipelines to test their scripts, and they would need to upload a sample version of data from each of their collaborators, which would be difficult to manage, from a user perspective, a data perspective, and computationally. As such, debug mode can alleviate various burdens during development and/or production.

Granting Entitlements to Diagnostic Lots. However, running over sample data will not always reproduce every exception that can occur during production. For example, there are some types of exceptions that can happen at runtime that are hard to debug, such as misformed data. Big data is usually stored in a data lake (e.g., files of semi-structured data), so even though an input dataset may be specified in the data collaboration tool with a schema that defines a particular field as a number, a date, or array, there is often nothing enforcing that field type at a file level. It may be possible that a particular column of production data comprising hundreds or thousands of (e.g., partitioned) files is supposed to have a date, but somewhere in one of the files, one of your columns has an entry with the wrong type of data. This type of exception would typically not reproduce on sample data that has the correct data type, so the exception may only show up at runtime, and it may be necessary to use diagnostic logs to identify the exception.

Another type of exception that might occur at runtime but may not reproduce on sample data is a bug that depends on when a script is executed. For example, some datasets may include different files generated on different days. A computational step may include a script that queries the most recent file (or some other selected file that depends on when the script is run), so the script may run on one day, but produce an exception on the next day because the production data in a particular file has a bug in it. It may be challenging to identify which file of potentially thousands of files has the bug, so it may be necessary to use diagnostic logs to identify the exception.

Generally, if there is a data issue in production data but not in its sample data, it may be necessary to debug in production mode. As such, there is a need to debug in production mode in a way that prevents leakage of production data into diagnostic logs and out of the data trustee environment.

As such, some implementations described in the present disclosure are directed to techniques for facilitating debugging in production mode without exposing diagnostic logs. In some implementations, a data collaboration tool of a data trustee environment treats diagnostic logs or other log data generated by a data privacy pipeline (or entitlement, or governing contract, etc.) in production mode as a virtual data asset owned by the participants to the data privacy pipeline (or entitlement, governing contract, etc.), or by specified designated owner(s). The data collaboration tool may allow one of the constructive or designated owners to generate production log data, save or store it in a protected or secured manner (e.g., in secured storage the data trustee environment, encrypted and exported), and/or operate on the production log data to derive insights without exposing the contents of the production log data. For example, one of the participants to a particular data privacy pipeline may define a particular diagnostic log as a named virtual data asset, define an entitlement that permits the participants to use the virtual data asset in a data privacy pipeline in the data trustee environment, and build a debugging pipeline that analyzes the log. As such, the participant may trigger the particular data privacy pipeline in production mode to generate and store the diagnostic log in the data trustee environment, and trigger the debugging pipeline to derive insights from the diagnostic log without exposing the diagnostic log.

In an example implementation, the data collaboration tool assumes that diagnostic logs generated by a data privacy pipeline during production mode are jointly owned by all the participants to the data privacy pipeline and/or all the participants to the contract(s) that governs a corresponding asset of the data privacy pipeline. As such, the data collaboration tool may accept user input from one of the participants defining a diagnostic log of a particular computational step as a named virtual data asset, and an enforcement mechanism of the data collaboration tool considers the diagnostic log to be owned by all of the participants. As a result, the data collaboration tool may allow any of the participants to define new entitlements to the diagnostic log, which allows them to operate on the diagnostic log within the data trustee environment, for example, by performing some analysis or query processing on the diagnostic log in the data trustee environment. Once the data privacy pipeline is run in production mode and the diagnostic log is saved into the data trustee environment, the data collaboration tool may treat the diagnostic log as joint data, such that the enforcement mechanism may only permit operations on the diagnostic log that the participants have contractually agreed upon (e.g., running certain scripts, named queries, other operations). In some implementations, the data collaboration tool effectively treats diagnostic logs the same way it treats other joint data, enabling participants to build and run debugging pipelines on diagnostic logs, subject to any agreed upon constraints on access and/or policies on downstream use.

There are many possible operations that may be helpful in debugging a diagnostic log while not exposing the contents of the log. For example, participants to a data privacy pipeline (or data collaboration app) may agree that some predefined diagnostic script (or named query) may be run on production diagnostic logs. The diagnostic script may have been written by an engineer or debugging expert employed or engaged by one of the participants, a developer of a data privacy pipeline, a developer of the data collaboration tool, and/or others. The content of the script may be specifically designed to avoid exposing potentially sensitive data. For example, the script may only run specific predefined queries that use pattern matching to identify known log structures that define errors. In cases where a particular log might include some freeform developer comments, the script may be configured to ignore those comments or corresponding sections of the log. When the script is executed on a production diagnostic log in the data trustee environment (e.g., in a debugging pipeline), the script may generate some transformation (e.g., producing insights), the data collaboration tool may export the result of the transformation (e.g., to a specified location, the participant's storage account), and the participant that triggered the debugging pipeline may access and investigate the result.

In an example technique for configuring the use and analysis of diagnostic logs in a data trustee environment, an interface of the data collaboration tool accepts user input enabling an option to save production diagnostics log(s) generated by one or more computational steps of a data privacy pipeline. For example, an interface (e.g., with configurable contract parameters, a visual representation of a data privacy pipeline such as flow diagram with components representing input datasets, computational steps, and/or output datasets) may accept user input identifying a particular contract and/or a particular script governed by the contract, enabling an option to save diagnostics log(s) generated by the script, assigning the diagnostics log(s) a name or identification, defining an entitlement (e.g., for all participants) to use diagnostics log(s) in the data trustee environment, and/or defining constraints on access or policies on downstream use in the data trustee environment.

In some cases, diagnostic logs generated by different computational steps may be defined with different constraints and/or policies. For example, an upstream computational step in a particular pipeline may have access to personally identifiable information, so a diagnostic log generated by that step may include sensitive information, and may therefore be governed by strict constraints and/or policies. However, the pipeline may include a downstream aggregation or sanitation step that removes the personally identifiable information, so diagnostic logs generated by subsequent computational steps may not be subject to the same, or even any, constraints and/or policies. In some cases, constraints and/or policies for a diagnostic log generated by a particular computational step may be inherited from constraints and/or policies on the computational step.

In some implementations, where entitlements to diagnostic logs were not setup prior to signing a governing contract, data privacy pipeline, and/or data collaboration app, adding an entitlement to a diagnostic log to an existing contract or pipeline may invalidate existing signatures and require re-signing by the parties. Alternatively, to avoid renegotiating a runtime contract (pipeline, and/or data collaboration app), new entitlements to diagnostic logs are set up in a separate contract, so entitlements to diagnostic logs may be configured and agreed upon without impacting an existing contract, pipeline, or data collaboration app. In yet another example. when diagnostic logs are considered to be jointly owned by all participants to a contract (pipeline, and/or data collaboration app), because each participant is a joint owner of the diagnostic logs, the participant may grant him or herself an entitlement to use the diagnostic logs without the need for agreement from the other participants. These are just a few examples, and other implementations are possible within the scope of the present disclosure.

As such, an enforcement mechanism of the data collaboration tool may allow participants who have been granted an entitlement to a diagnostic log to incorporate (e.g., a pointer to) the diagnostic log into a new or existing debugging pipeline or contract (e.g., granting someone else like a debugging expert an entitlement to use the diagnostic log in the data trustee environment). Once the diagnostic log has been generated, the debugging pipeline may be triggered and the participant who triggered the debugging pipeline may evaluate any insights and try to fix any exceptions.

Accordingly, the data collaboration tool may facilitate debugging in production mode by granting entitlements to diagnostic logs. Generally, eyes-off secure data collaboration is an increasing desirable feature in the new world of data. The ability to debug is a basic capability for any development environment, and the ability to debug at runtime is often critical for production environments. As such, the techniques described herein will enable collaborators to debug, or choose who is permitted to debug, any issues that may arise while deploying data privacy pipelines, thereby enabling production time debugging over data coming from other tenants and/or collaborative data, without exposing that data.

Example Development and Debugging Environment

FIG. 1 is a block diagram of an example development and debugging environment 100 suitable for use in implementing aspects of the invention. Generally, development and debugging environment 100 facilitates development and/or debugging of collaborative intelligence contracts, data privacy pipelines, and/or data collaboration apps. Any or all of the components of development and debugging environment 100 may be implemented with any number and type of computing device, or some portion thereof. For example, in an implementation, developer device 105a, initiator device 105b, and/or participant device 105c are each a computing device such as computing device 2600, as described below with reference to FIG. 26. Further, in some implementations, data trustee environment 110 is implemented at least in part in a distributed computing environment such as distributed computing environment 2500 (discussed below with respect to FIG. 25) comprising a plurality of such computing devices. In various implementations, the computing devices represented by FIG. 1 may be any combination of a personal computer (PC), a laptop computer, a workstation, a server, a mobile computing device, a PDA, a cell phone, and/or the like.

Any or all of the computing devices include computer storage media that stores information including data, data structures, computer instructions (e.g., software program instructions, routines, or services), and/or models (e.g., 3D models, machine learning models) used in some implementations of the technologies described herein. Additionally or alternatively, any or all of the computing devices include or are coupled to any number of data stores (e.g., using local and/or cloud storage), and/or any data or components described herein may be stored on any suitable data store(s) and any suitable device(s).

The components of development and debugging environment 100 and/or data trustee environment 110 may communicate with each other via one or more networks, which may include, without limitation, one or more local area networks (LANs) and/or wide area networks (WANs). Such networking environments are commonplace in offices, enterprise-wide computer networks, intranets, and the Internet.

In FIG. 1, data trustee environment 110 includes data collaboration tool 115, which serves as a development platform (e.g., a data collaboration development and/or management platform) for authoring and deploying collaborative intelligence contracts, data privacy pipelines, and/or data collaboration apps. In some implementations, data collaboration tool 115 and/or any of the elements illustrated in FIG. 1 are implemented as, incorporated into, or integrated into an application(s), such as a web application, a stand-alone application, a mobile application, and/or the like. For example, in some implementations, the application(s) comprises a web application that runs in a web browser and/or is hosted at least partially server-side. Some implementations additionally or alternatively integrate any of the functionality described herein into an operating system (e.g., as a service), a server (e.g., a remote server), a distributed computing environment (e.g., as a cloud service), and/or otherwise. Furthermore, the arrangement illustrated in FIG. 1 is meant as example, and the functions described herein may be distributed across any number and/or type(s) of devices. Furthermore, the features of the implementation illustrated in FIG. 1 (and the features of the implementations illustrated in the other figures) can work together or apart from one another.

To begin with a high-level overview of an example implementation and workflow, assume a developer using developer device 105a wants to develop a data collaboration app (or a collaborative intelligence contract or data privacy pipeline) on behalf of some other collaborators. In that case, the developer uses developer device 105a to access authoring tool 120 of data collaboration tool 115 and build a template data collaboration app (e.g., with one or more placeholder elements). The developer then uses sharing tool 140 of data collaboration tool 115 to share the template data collaboration app with one of the collaborators (e.g., identifying the recipient account by email address). That recipient uses initiator device 105b to access the template data collaboration app through his or her account in the data collaboration tool 115, fill in placeholder elements in the template using authoring tool 120, and invite other participants into the data collaboration app using data collaboration tool 115. An invited participant uses participant device 105c to access the data collaboration app through data collaboration tool 115 and fill in placeholder elements using authoring tool 120. In some implementations that require participant approval or agreement before deployment, the initiator and other participants use deployment tool 150 of data collaboration tool 115 to approve the data collaboration app, and deployment tool 150 deploys the data collaboration app in data trustee environment 110, for example, by saving the data collaboration app in an immutable form (e.g., as one of apps 190) and enabling the participants to trigger a constituent data privacy pipeline (e.g., one of pipelines 188) pursuant to a constituent contract (e.g., one of contracts 186) using production mode tool 170.

In the implementation illustrated in FIG. 1, data trustee environment 110 is shown with database(s) 180 that store a digitized representation of contracts 186 that govern the use of datasets 182, scripts 184, and/or pipelines 188. In some implementations, contracts 186 and/or pipelines 188 are bundled into corresponding apps 190. Database(s) 180 are also shown storing datasets 182 and scripts 184 and other assets used in pipelines 188. Generally, participants to a contract, pipeline, or app may upload a particular dataset, script, or other asset to their own storage accounts. Participants may contribute an asset to a shared app, pipeline, or contract using authoring tool 120 to identify the asset, and the authoring tool 120 may add some reference (e.g., a pointer) to the asset (e.g., in a storage account) into the app, pipeline, or contract without adding the content of the asset and/or without exposing the content of the asset.

In some implementations, data collaboration tool 115 manages different accounts and provides storage space in data trustee environment 110 for assets of the account (e.g., assets owned or uploaded by an account, assets for which the account has been granted certain rights). In an example implementation, data trustee environment 110 and/or data collaboration tool 115 do not expose the assets in a particular storage account to other accounts, but someone using the first account may grant an entitlement (governed by one of contracts 186) for a second account to use an asset of the first account. Depending on how that entitlement is configured, the second account may or may not be able to view the contents of the asset using data collaboration tool 115.

However, as a result of the entitlement, data collaboration tool 115 may allow someone using the second account to use authoring tool 120 to incorporate (e.g., a reference to) the asset as a component in one of the pipelines of the second account. In some implementations, when a pipeline is triggered by production mode tool 170, the assets used or referenced by the pipeline are ingested into a constrained environment of data trustee environment 110 (e.g., which may include a portion of database(s) 180) for processing, ingested assets are not exposed, and/or ingested assets are deleted from the constrained environment once the pipeline has finished processing.

Returning to data collaboration tool 115, in the implementation illustrated in FIG. 1, data collaboration tool 115 includes authoring tool 120, sharing tool 140, deployment tool 150, debug mode tool 160, and production mode tool 170. At a high level, authoring tool 120 provides one or more interfaces that accept user input authoring collaborative intelligence contracts (e.g., contracts 186), data privacy pipelines (e.g., pipelines 188), and/or data collaboration apps (e.g., apps 190). Sharing tool 140 accepts user input sharing a template contract, template pipeline, and/or template data collaboration app with another account, and clones the shared template into a recipient's account. Deployment tool 150 accepts user input managing participant signatures and/or deploying a contract, pipeline, and/or app. During development and/or after deployment, debug mode tool 160 runs a pipeline over sample data instead of production data for debugging purposes. Production mode tool 170 accepts user input triggering a deployed pipeline to derive collaborate intelligence (e.g., a constrained environment of) in data trustee environment 110.

In some implementations, authoring tool 120 provides one or more graphical interfaces with various interaction elements that allow a user to design, arrange, configure, specify, and/or otherwise develop collaborative intelligence contracts (e.g., contracts 186), data privacy pipelines (e.g., pipelines 188), and/or data collaboration apps (e.g., apps 190). In some implementations data collaboration tool 115 bundles or packages a collection of data privacy pipelines and/or collaborative intelligence contracts (governing entitlements to use assets) into a data collaboration app or other logical unit with shared parameters. The example authoring tool 120 of FIG. 1 includes canvas 122, contract tool 124, entitlement tool 126, traceability visualization tool 128, pipeline compliance tool 130, and diagnostic log tool 132.

In some implementations, canvas 122 visually represents, and accepts user input designing, arranging, configuring, specifying, and/or otherwise developing, one or more contracts, pipelines, and/or apps under development. In an example implementation, canvas 122 visually represents any number of contracts and/or pipelines in a particular data collaboration app (e.g., whether under development and/or deployed). In some implementations, when canvas 122 receives user input creating a new element in a pipeline (e.g., a block representing an input dataset, a computational script, a model, a placeholder asset), in response, contract tool 124 creates an electronic representation of a corresponding contract (or contract template with placeholder participants) with an entitlement that enables that new element. Additionally or alternatively, entitlement tool 126 may create entitlements, edit entitlements, and/or associate entitlements with particular contract instances based on user input. In some implementations that bundle contracts and pipelines into a data collaboration app, traceability visualization tool 128 causes presentation (e.g., on canvas 122) of a visual representation of traceability from the contracts to corresponding assets in the pipelines (e.g., which participants are party to which contract, which pipeline elements are enabled by which contract or entitlement), and pipeline compliance tool 130 causes presentation (e.g., on canvas 122) of a visual representation of whether a pipeline or one of its elements is or is not enabled based on current contracts or entitlements in the data collaboration app. Diagnostic log tool 132 accepts user input toggling an option to name or save diagnostic logs generated by computational steps during production mode, and/or grant entitlements to the diagnostic logs.

In some implementations, a developer uses authoring tool 120 to develop a template data collaboration app, data privacy pipeline, and/or contract on behalf of some other collaborator or collaborators. As such, in some implementations, data collaboration tool 115 includes sharing tool 140 that allows the developer to share the template app, pipeline, and/or contract with another recipient account, and sharing tool 140 copies the template app, pipeline, and/or contract into the recipient's account in data collaboration tool 115. In some situations where the developer will not be a participant to a deployed app, pipeline, and/or contract, the developer specifies an anonymous placeholder participant as a placeholder for a recipient, and the recipient may use authoring tool to replace the placeholder participant with a representation of the recipient. In another example, the developer specifies him or herself as a participant, which inserts a reference to the developer, and the recipient replaces the reference to the developer with a reference to the recipient. In some implementations, deployment tool 150 provides various user interfaces that accept user input inviting collaborators into a particular contract, pipeline, and/or app. In an example implementation, inviting a collaborator does not create a copy of the shared contract, pipeline, and/or app, but rather, adds an authorized collaborator into the shared contract, pipeline, and/or app. In some implementations, deployment tool 150 manages signatures, approvals, and/or version controlling (e.g., deploying) of a shared contract, pipeline, and/or app that has signed, approved, or otherwise completed. Accordingly, deployment tool 150 may allow one of the collaborators to use production mode tool 170 to trigger a deployed pipeline and/or app to derive collaborate intelligence in data trustee environment 110.

Figure 2:
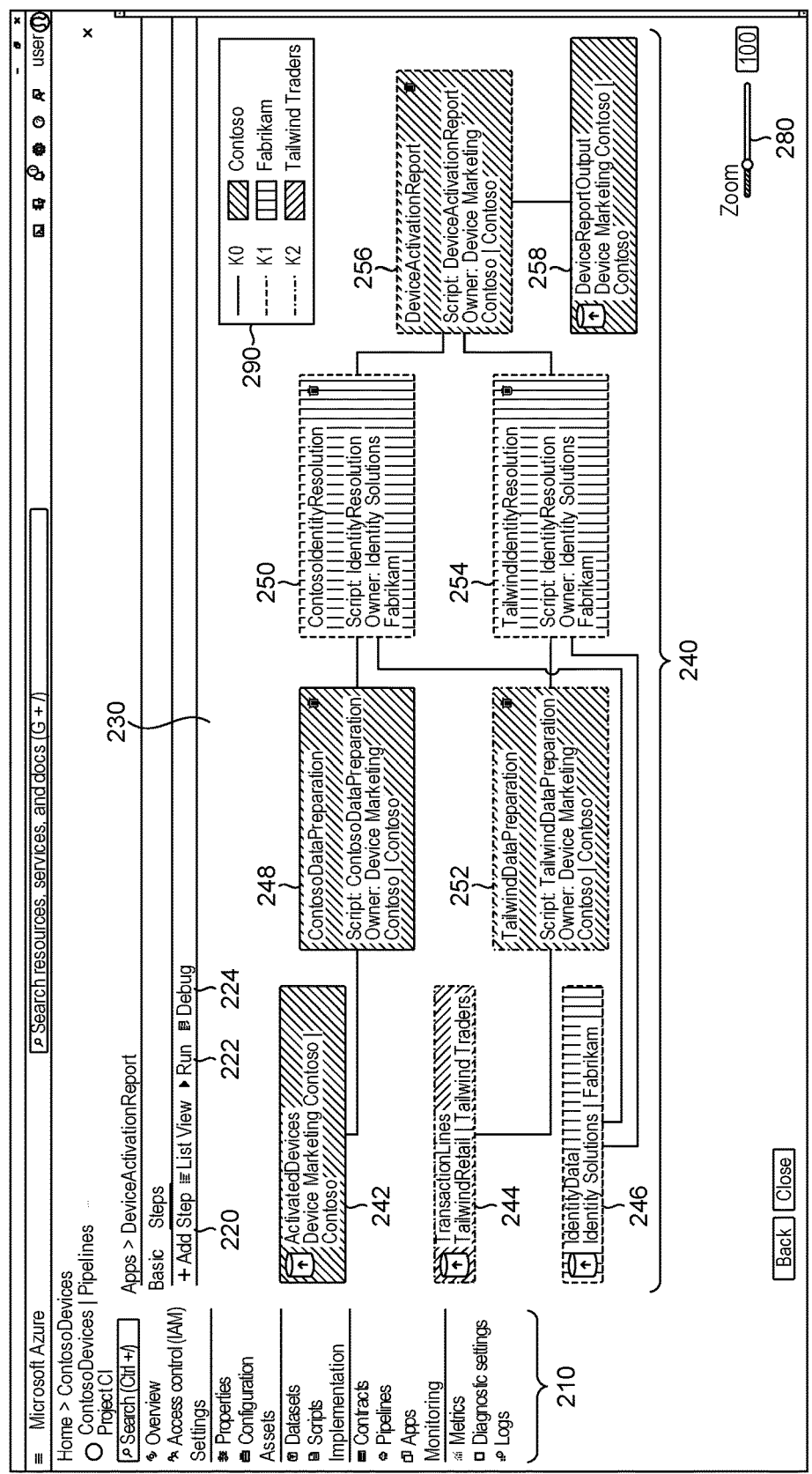
FIG. 2 is an illustration of an example user interface for developing a data collaboration app, in accordance with certain implementations described herein.

FIG. 2 is an illustration of an example user interface 200 for developing a data collaboration app, in accordance with implementations described herein. In this example, the data collaboration app includes three contracts K0-K2 and three participants (Contoso, Fabrikam, and Tailwind Traders) listed in legend 290, and pipeline 240. Assume a representative of Contoso uses a Contoso account to access data collaboration tool 115 and/or authoring tool 120 of FIG. 1. User interface 200 of FIG. 2 is an example interface that data collaboration tool 115 and/or authoring tool 120 may display on the representative's device.

User interface 200 includes panel 210 that includes links to various interfaces for uploading or specifying Contoso assets (e.g., datasets or scripts); managing or creating contracts, pipelines, or apps; monitoring app or pipeline performance metrics; and/or the like. In some implementations, selecting the contracts link in panel 210 opens an interface that represents Contoso's contracts (e.g., whether under development or deployed), and provides controls for viewing or configuring parameters of a selected contact (e.g., adding or removing participants, governed assets, entitlements, constraints on access, policies on downstream use; approving or revoking an approval). In some implementations, selecting the pipelines or apps link in panel 210 opens an interface that represents Contoso's pipelines or apps (e.g., whether under development or deployed), and provides controls for viewing or configuring parameters of a selected pipeline or app. Assume Contoso's representative selected the apps link from panel 210, and selected an app called DeviceActivationReport from a list of apps, and in response user interface 200 is displayed. User interface 200 is an example interface for developing, editing, or otherwise configuring the DeviceActivationReport app. Although aspects of user interface 200 are described with respect to configuring an app, some or all the features of user interface 200 may additionally or alternatively be used to configure a particular pipeline independent of an app.

User interface 200 includes an electronic canvas, canvas 230 (e.g., which may correspond to canvas 122 of FIG. 1). Canvas 230 visually represents pipeline 240 of the DeviceActivationReport app. DeviceActivationReport app and/or pipeline 240 may have been developed (e.g., as a template) by some non-participant developer and shared with Contoso (e.g., using sharing tool 140 of FIG. 1), or it may have been developed by a Contoso representative (e.g., by adding and configuring individual steps using add step button 220). Generally, the electronic canvas may include some controls for zooming in or out (e.g., zoom bar 280) or scrolling across the canvas.

In some implementations like that shown in FIG. 1, canvas 230 represents pipeline 240 as a flow diagram with different elements representing different input datasets (e.g., ActivatedDevices dataset 242, TransactionLines dataset 244, IdentityData 246), computational steps (e.g., ContosoDataPreparation script 248, ContosoIdentityResolution script 250, TailwindDataPreparation script 252, TailwindIdentityResolution script 254, DeviceActivationReport script 256), and output datasets (e.g., DeviceReportOutput 258). As illustrated in legend 290, in this example, there are three participants to pipeline 240 (Contoso, Fabrikam, and Tailwind Traders) and three governing contracts (K0, K1, K2). As illustrated in legend 290, canvas 230 illustrates which assets are governed by which contract using different outline or border styles. For example, contract K1 (e.g., between Contoso and Fabrikam) governs Contoso's use of Fabrikam's IdentityData 246, and contract K2 (e.g., between Contoso and Tailwind Traders) governs Contoso's use of Tailwind Traders TransactionLines dataset 244). In this example, K0 represents Contoso's right to use its own assets (e.g., Contoso's ActivatedDevices dataset 242). In addition to showing which assets are governed by which contract, canvas 230 represents which participants have contributed which assets (e.g., via different patterns). This is meant as an example of how user interface 200 and/or canvas 230 may visually represent traceability between contracts and pipelines in an app, and other ways to do so are contemplated within the scope of the present disclosure.

In some implementations like the one shown in FIG. 2, canvas 230 displays elements of pipeline 240 with connections between elements representing data flow of pipeline 240. Further, canvas 230 may display a particular element (e.g., a block) with various information about element or the asset represented by the element, such as the name of the asset, the name of its owner (or contributor), connected data source(s) or data sink(s) in the pipeline 240, the contract (or entitlement) governing use of the asset, whether the asset has or has not been enabled by a particular contract (or entitlement), and/or other information. In some implementations, interacting with (e.g., clicking or tapping on) a particular element opens up a panel, window, menu, or other interface element for viewing and/or configuring that element (e.g., associating a corresponding asset with a particular contract or entitlement, specifying parameters of a governing contract or entitlement, specifying a sample dataset to use during debug mode, specifying a production dataset to use during production mode, specifying whether, where, and under what name to save diagnostic logs generated by a computational step during production mode).

By way of illustration, assume the DeviceActivationReport app represented by user interface 200 is a collaboration involving three parties: Contoso, Fabrikam, and Tailwind Traders. Assume further that pipeline 240 of the DeviceActivationReport app has been developed by or on behalf of Contoso, and Contoso is (or will be) authorized to trigger pipeline 240. In development or authoring mode, Contoso may only be permitted to add into to pipeline 240 assets it owns or otherwise has rights to, including assets provided by Fabrikam or Tailwind Traders for which Contoso has been granted an entitlement by a contract bundled with the DeviceActivationReport app (e.g., K1 and K2). Consider FIGS. 3 and 4, which show an example configuration of example entitlements granting Contoso permission to use certain Fabrikam or Tailwind Traders assets.

For example, FIG. 3 illustrates an example user interface 300 for viewing and/or configuring an entitlement from contract K1 for Contoso to use Fabrikam's IdentityData 246 subject to running Fabrikam's IdentityResolution script (e.g., ContosoIdentityResolution script 250), and for Contoso to use the output generated by any instance of Fabrikam's IdentityResolution script (e.g., ContosoIdentityResolution script 250, TailwindIdentityResolution script 254) subject to running Contoso's DeviceActivationReport script 256. (Note pipeline 240 is configured to combine Fabrikam's IdentityData 246 with Contoso's ActivatedDevices dataset 242 in one location and with Tailwind Traders' TransactionLines dataset 244 in another location. As such, the two instances of Fabrikam's IdentityResolution script in pipeline 240 are named based on the other party's data it is configured to run over. That is, ContosoIdentityResolution script 250 is configured in pipeline 240 to run over Fabrikam's and Contoso's data, and TailwindIdentityResolution script 254 is configured in pipeline 240 to run over Fabrikam's and Tailwind Traders' data.)

Depending on the implementation, a developer of DeviceActivationReport app (e.g., a representative of Contoso) may access user interface 300 in different ways. For example, in some implementations, interacting with the contracts link (or an entitlements link) in panel 210 of FIG. 2 cause display of a list or other representation of contracts or entitlements bundled with the DeviceActivationReport app (and/or otherwise associated with the user's account), and a particular contract or entitlement is selectable to cause display of a pop-up window, panel, or other interface element that displays or accepts input specifying or editing properties of the selected contract or entitlement. In another example, interacting with a contract (or entitlement) represented in legend 290 of FIG. 2 causes display of a pop-up window, panel, or other interface element for displaying, specifying, or editing properties of the selected contract (and/or its constituent entitlements). In yet another example, interacting with one of the blocks of pipeline 240 of FIG. 2 causes display of a pop-up window, panel, or other interface element for displaying, specifying, or editing properties of an asset represented by the block (e.g., properties of a contract and/or entitlement governing the right to use the asset). In an example implementation, user interface 300 is displayed in response to a user input identifying a contract (e.g., K1) or entitlement governing the use of Fabrikam's IdentityData 246.

User interface 300 illustrates two logical components of an entitlement to Fabrikam's IdentityData 246: entitlement 310 granted by Fabikam to Contoso to use Fabrikam's IdentityData 246 subject to constraint 315 requiring execution of Fabrikam's IdentityResolution script over Fabrikam's IdentityData 246, and entitlement 320 granted by Fabikam to Contoso to use the output generated by Fabrikam's IdentityResolution script (entitled Enriched), subject to constraint 325 requiring execution of Contoso's DeviceActivationReport script 256 on the Enriched output. In some implementations, constraints are specified and enforced on access of an asset by a triggered pipeline, while policies are specified and enforced on downstream operations in a triggered pipeline. As such, entitlement 310 specifies constraint 315, which is applicable upon a pipeline accessing Fabrikam's IdentityData 246. Accordingly, pipeline 240 of FIG. 2 includes an instance of Fabrikam's IdentityResolution script for each use of Fabrikam's IdentityData 246 (e.g., ContosoIdentityResolution script and TailwindIdentityResolution script 254). As a result, pipeline 240 of FIG. 2 is compliant with entitlement 310 of FIG. 3.

In the implementation illustrated in FIG. 3, entitlement 310 defines a policy on pipeline operations that are downstream of Fabrikam's IdentityData 246 by naming the output generated by Fabrikam's IdentityResolution script (Enriched), defining an entitlement to use the Enriched output, and defining constraint 325 on the Enriched output. More specifically, constraint 325 requires execution of Contoso's DeviceActivationReport script 256 on the Enriched output. Accordingly, pipeline 240 of FIG. 2 includes an instance of Contoso's DeviceActivationReport script 256 that will run over the outputs generated by each instance of Fabrikam's IdentityData 246 (e.g., ContosoIdentityResolution script and TailwindIdentityResolution script 254). As a result, pipeline 240 of FIG. 2 is compliant with entitlement 320 of FIG. 3.

Generally, user interface 300 shows various properties of entitlements 310 and 320. In some implementations, some or all of the properties are selectable (e.g., by right click, double click, interacting with a corresponding interaction element that is not illustrated in FIG. 3) to change the property (e.g., through interaction with a pop-up menu). In another example, some other interface(s) may be used to configure entitlements 310 and 320, and user interface 300 displays their properties as read-only. In some cases, if the applicable app, contact, entitlement, and/or pipeline has been agreed upon and/or deployed, the properties are subject to version control, changes are restricted, a warning is presented that changes will invalidate existing signatures, and/or changes invalidate the existing signatures, requiring re-approval by the participants.

Figure 4:
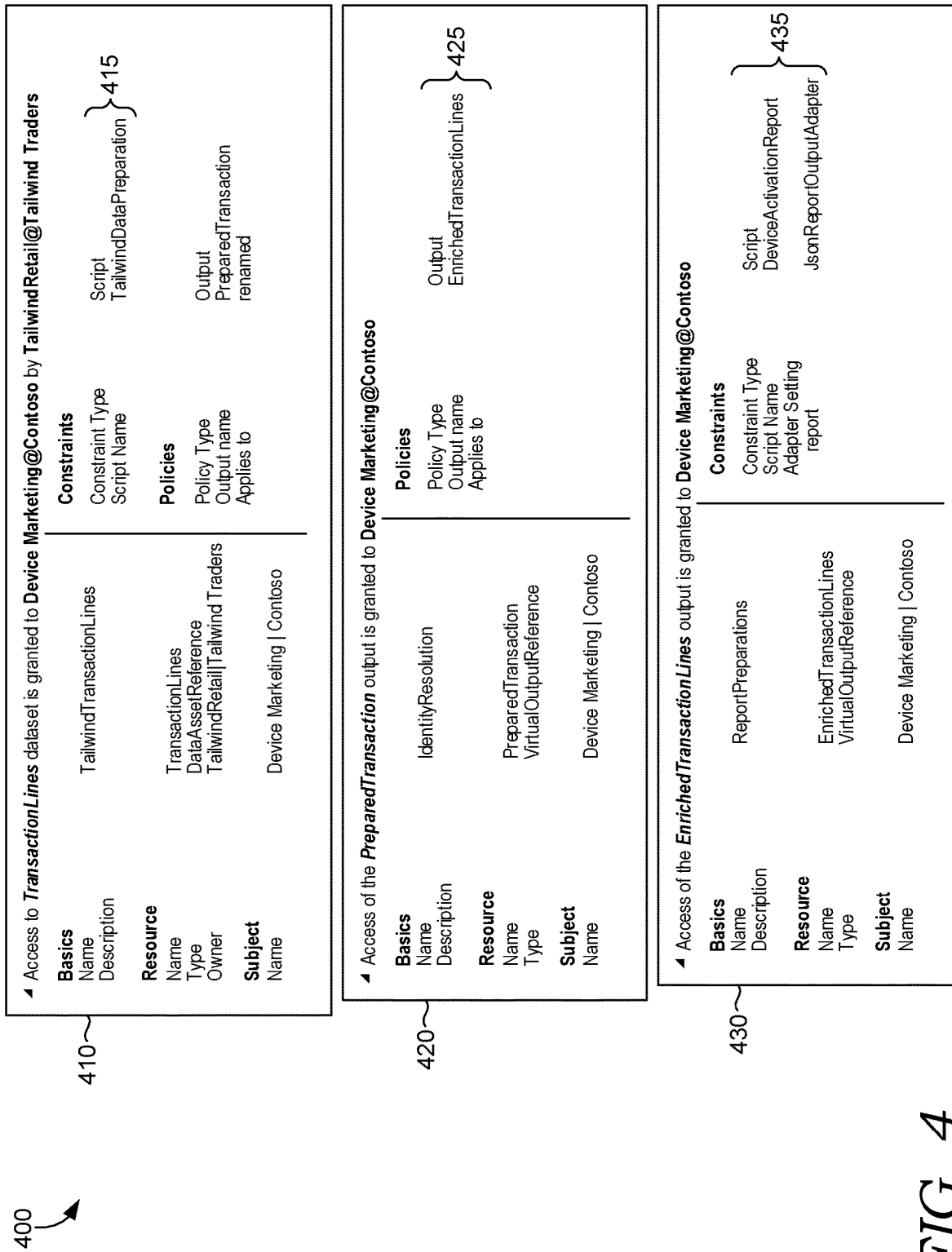

FIG. 4 illustrates an example user interface 400 for viewing and/or configuring an entitlement from contract K2 for Contoso to use Tailwind Traders' TransactionLines dataset 244, subject to running Contoso's TailwindDataPreparation script 252, and for Contoso to use the output generated by TailwindDataPreparation script 252 (named PreparedTransaction) subject to running Contoso's DeviceActivationReport script 256 downstream. User interface 400 illustrates three logical components of an entitlement to Tailwind Traders' TransactionLines dataset 244: entitlement 410 granted by Tailwind Traders to Contoso to use Tailwind Traders' TransactionLines dataset 244 subject to constraint 415 requiring execution of Contoso's TailwindDataPreparation script 252 over Tailwind Traders' TransactionLines dataset 244; entitlement 420 granted by Tailwind Traders to Contoso defining output policy 425 on Contoso's downstream use of the output of TailwindDataPreparation script 252 (named EnrichedTransactionLines); and entitlement 430 and granting Contoso the right to use the output generated by TailwindDataPreparation script 252 (entitled EnrichedTransactionLines), subject to constraint 435 requiring execution of Contoso's DeviceActivationReport script 256 on the EnrichedTransactionLines output.

In the implementation illustrated in FIG. 4, entitlement 410 defines constraint 415, which requires that a pipeline that uses Tailwind Traders' TransactionLines dataset 244 must run Contoso's TailwindDataPreparation script 252 upon accessing Tailwind Traders' TransactionLines dataset 244. Accordingly, pipeline 240 of FIG. 2 specifies an instance of Contoso's TailwindDataPreparation script 252 running on Tailwind Traders' TransactionLines dataset 244. As a result, pipeline 240 of FIG. 2 is compliant with entitlement 410 of FIG. 3.

Entitlement 410 includes an output policy naming the output of Contoso's TailwindDataPreparation script 252 PreparedTransaction, and entitlement 420 includes an output policy naming downstream connections EnrichedTransactionLines. As a result, in pipeline 240 of FIG. 2, the output of TailwindDataPreparation script 252 is named PreparedTransaction, and the output of Fabrikam's TailwindIdentityResolution script 254 is named EnrichedTransactionLines. Note that entitlement 310 names the output of Fabrikam's TailwindIdentityResolution script 254 Enriched, and entitlement 420 names the output of Fabrikam's TailwindIdentityResolution script 254 EnrichedTransactionLines. As such, that particular connection or node in pipeline 240 may carry two names, enabling the data collaboration tool to track and enforce different constraints (e.g., from different contracts) on the same pipeline connection or node. For example, entitlement 430 defines constraint 435, which requires that a pipeline that runs Contoso's TailwindDataPreparation script 252 over Tailwind Traders' TransactionLines dataset 244 must run Contoso's DeviceActivationReport script 256 downstream. Accordingly, pipeline 240 of FIG. 2 specifies an instance of Contoso's DeviceActivationReport script 256 downstream of Contoso's TailwindDataPreparation script 252. As a result, pipeline 240 of FIG. 2 is compliant with entitlement 430 of FIG. 3.

Figure 5:
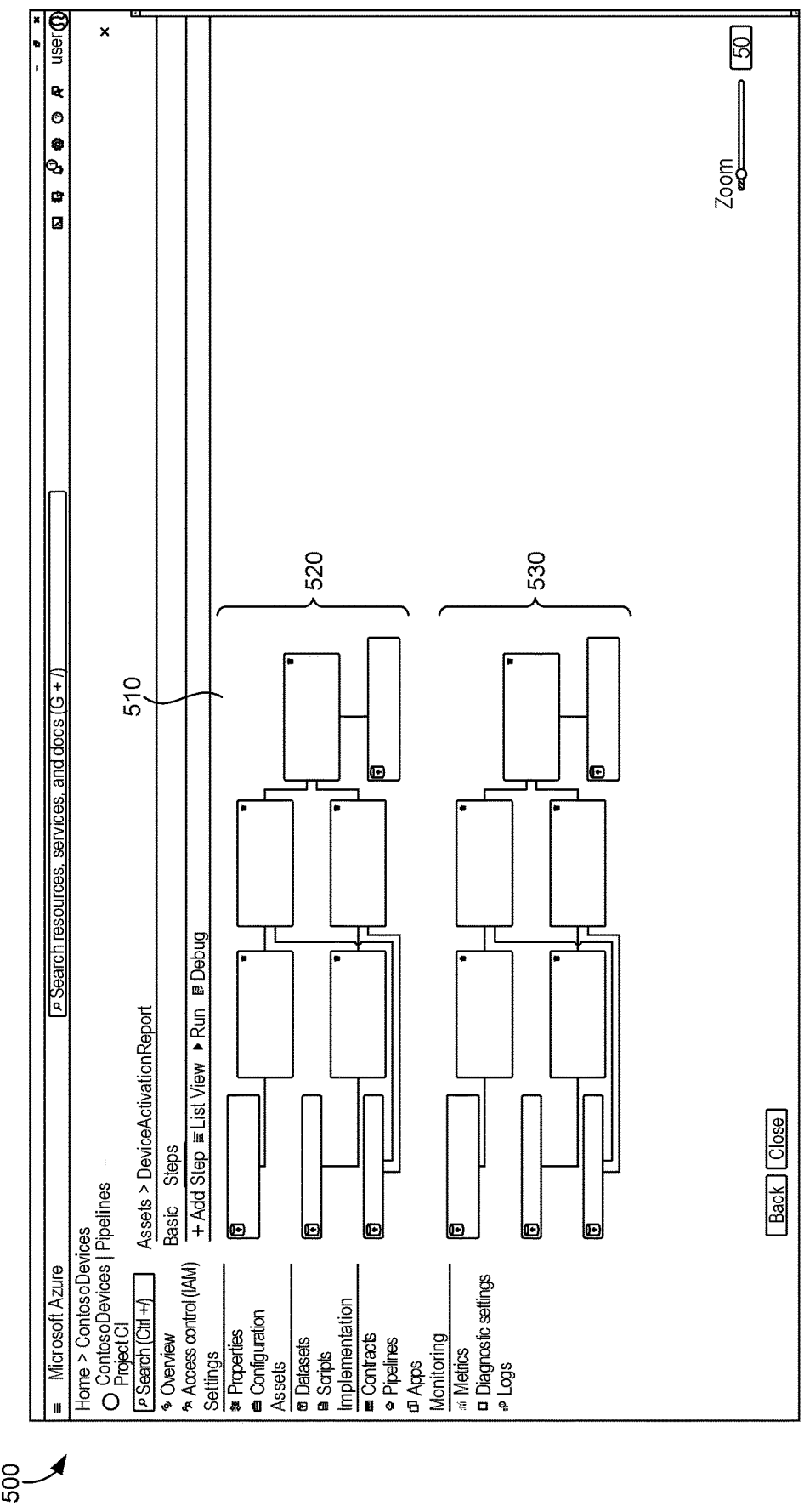
FIG. 5 is an illustration of an example user interface for developing a data collaboration app with multiple data privacy pipelines, in accordance with certain implementations described herein.

Returning for a moment to FIG. 2, note that FIG. 2 illustrates an example DeviceActivationReport app with a single pipeline (pipeline 240). In some implementations, however, multiple pipelines are bundled into a particular app, and multiple pipelines may be represented on the same electronic canvas. FIG. 5 is an illustration of such an example. More specifically, in FIG. 5, example user interface 500 includes canvas 510 with pipelines 520 and 530 bundled together into an example DeviceActivationReport app. Note FIG. 5 illustrates a simplified version of potential pipelines for ease of illustration. Generally, canvas 510 (or some other user interface) may represent any number of bundled pipelines, governing contracts, and/or governing entitlements on one canvas, thereby simplifying the user experience and streamlining data collaboration app development.

Returning now to FIG. 2, user interface 200 includes run button 222 and debug button 224. In some implementations, run button 222 triggers a deployed pipeline in production mode (e.g., using production mode tool 170 of FIG. 1), and/or debug button 224 triggers a pipeline in debug mode (e.g., using debug mode tool 160 of FIG. 1). These buttons are just example interface elements that may be used to trigger execution of a particular pipeline or pipelines (e.g., pipeline 240 of FIG. 2, pipelines 520 and 530 of FIG.) in production and/or debug mode. In an example implementation of a debug mode, a triggered pipeline is run over sample data instead of production data. Since this type of debug mode does not use production data, a pipeline may run in debug mode even if a governing contract has not been signed (and entitlements have not been granted). Generally a user interface may accept user input specifying sample data to use in lieu of a particular input dataset (production data) or as an input into a particular computational step, and the sample data may be used during debug mode and the production data during production mode.

Figure 6:
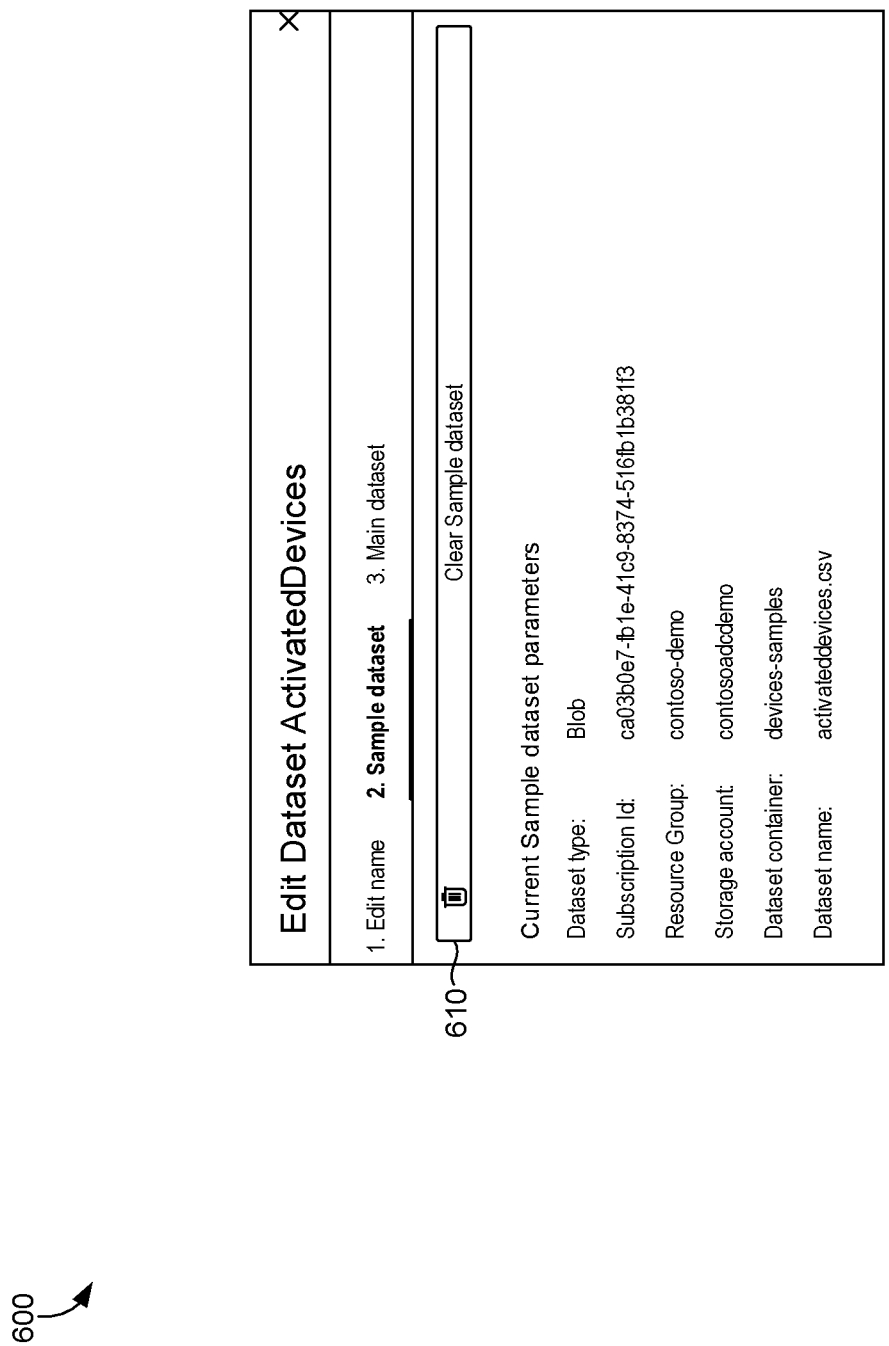
FIG. 6 is an illustration of an example user interface for designating a sample dataset associated with a particular production dataset, in accordance with certain implementations described herein.

In an example implementation, selecting the datasets link in panel 210 of FIG. 2 opens an interface that represents available datasets for a particular account, or datasets associated with a particular data collaboration app, and provides controls for designating, uploading, removing, or replacing a production and/or sample dataset. For example, the user interface may provide an interaction element that prompts a user to add a new dataset, upload a new dataset, or otherwise specify parameters of a new dataset (e.g., specifying placeholder elements such as a placeholder schema that defines attributes or properties of the dataset, replacing placeholder elements with a corresponding dataset). In some cases, the user interface may visually represent a list or collection of available datasets, and selection of a particular dataset may open an interface that represents parameters of the dataset and/or parameters of a sample dataset associated with the dataset. Additionally or alternatively, selecting a particular dataset represented on canvas 230 or in pipeline 240 of FIG. 2 (e.g., as a block representing an input dataset in a pipeline) opens an interface that represents and/or accepts user input specifying parameters of the dataset and/or parameters of a sample dataset associated with the dataset. FIG. 6 is an illustration of example user interface 600 for designating a sample dataset associated with a particular production dataset, in accordance with implementations described herein. For example, user interface 600 includes separate tabs (numbered 2 and 3) for viewing and/or editing parameters of a sample dataset and corresponding production dataset, respectively. User interface 600 includes button 610 that serves to clear (e.g., delete, disassociate) the currently specified sample dataset, which may serve to replace button 610 with another button that allows the user to add a new sample dataset. As such, a user may specify a sample dataset for each production dataset used by a pipeline or data collaboration app.

In some implementations, although diagnostic logs generated during production mode are not exposed, diagnostic logs generated during a debug mode may be. As such, some implementations provide a user interface that accepts user input enabling an option to save diagnostic log(s) generated by a particular computational step of a data privacy pipeline during a debug mode. In an example implementation, selecting a particular computational step represented on canvas 230 or in pipeline 240 of FIG. 2 (e.g., as a block representing a computational step in a pipeline) may open an interface that represents and/or accepts user input specifying parameters of the computational step (e.g., identifying or providing an executable script, specifying placeholder computation that identifies parameters such as an input or output schema for input or output data from the computational step, replacing a placeholder computation with a corresponding computational step or a reference to a script, identifying or associating the computational step with a governing contract or entitlement, enabling an option to save diagnostic log(s) generated by that computational step).

Figure 7:
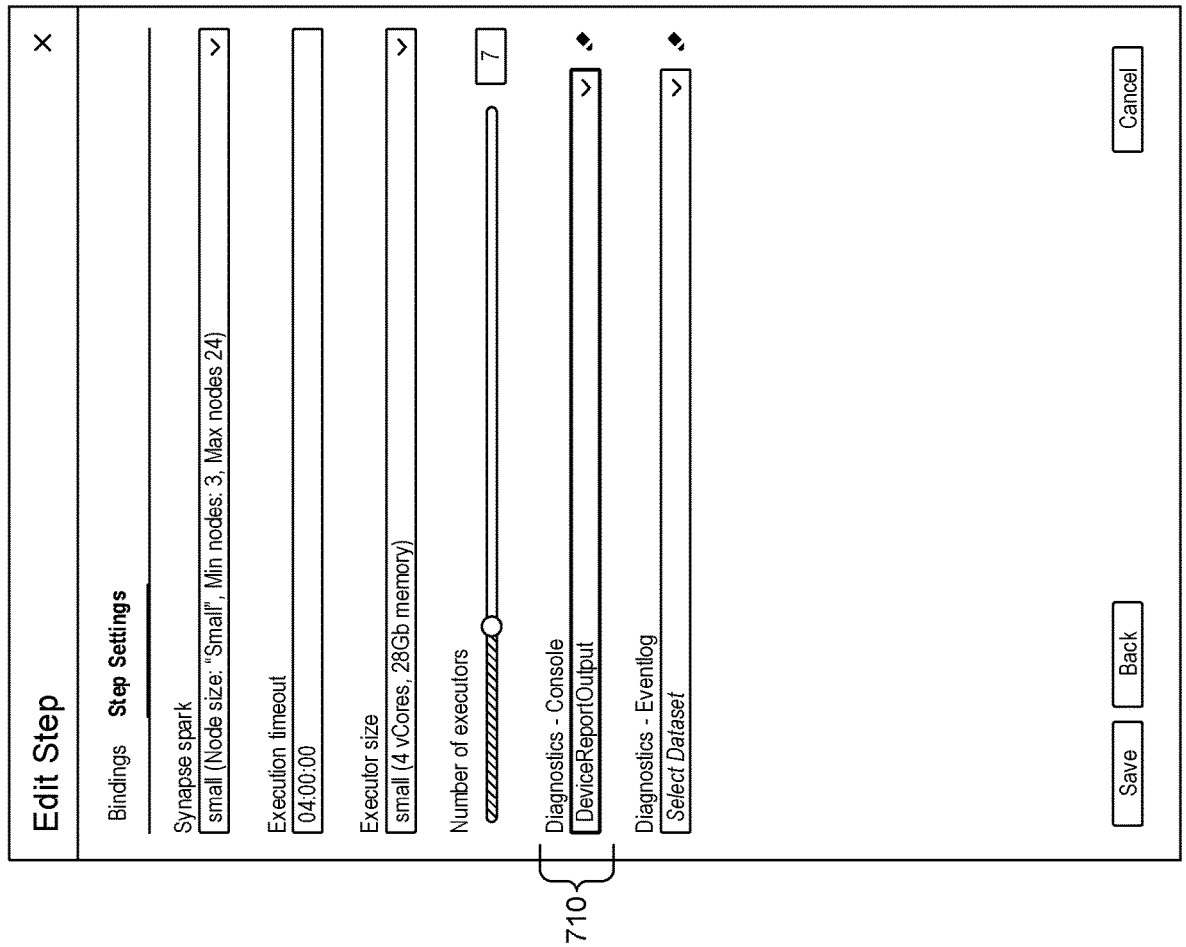
FIG. 7 is an illustration of an example user interface for designating a diagnostic log generated by a computational step as a named dataset, in accordance with certain implementations described herein.

For example, FIG. 7 is an illustration of example user interface 700 for designating a diagnostic log generated by a computational step as a named dataset, in accordance with implementations described herein. More specifically, user interface 700 accepts user input editing various parameters of a selected computational step (in this example, a Spark computation). In this example, user interface 700 displays various configurable step settings including node configuration, timeout duration, executor size, number of executors, and diagnostic log settings. In this example, since this is a Spark computation, there are two possible diagnostic logs: console and eventlog. Accordingly, user interface 700 accepts user input assigning either or both diagnostic logs to a corresponding named dataset. For example, setting 710 includes a drop down menu that has been used to assign the console diagnostic log to a virtual dataset called DeviceReportOutput. Note the DeviceReportOutput dataset may be empty until the pipeline containing this computational step is executed. In some implementations, assigning a particular diagnostic log to a named dataset effectively toggles an option to save the diagnostic log. In some implementations, setting 710 (or some other setting on user interface 700 or elsewhere) accepts user input specifying a storage location to save a particular diagnostic log, and may include separate settings for saving a sample log generated in debug mode and for saving a production log generated in production mode. In some implementations, a user may be permitted to enable, designate, generate, and/or export diagnostic logs generated during debug mode, and may be permitted to enable, designate, and/or generate diagnostic logs generated during production mode without exporting or exposing their contents, as explained in more detail below.

Figure 8:
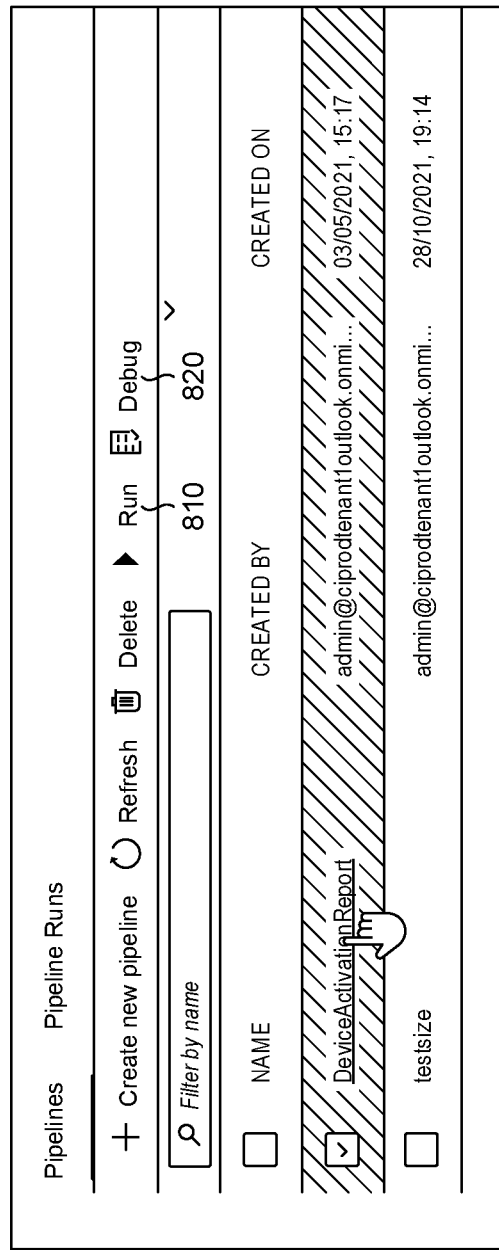
FIG. 8 is an illustration of an example user interface for triggering execution of a data privacy pipeline in debug or production mode, in accordance with certain implementations described herein.

In some implementations, a user interface that accepts user input triggering execution of a data privacy pipeline may be provided. In an example implementation, selecting the pipelines or apps link in panel 210 of FIG. 2 opens an interface that represents available pipelines or apps for a particular account, and provides controls for creating, configuring, or triggering a particular pipeline or app. For example, FIG. 8 is an illustration of an example user interface 800 for triggering execution of a data privacy pipeline in debug or production mode, in accordance with implementations described herein. In this example, user interface 800 presents a list of selectable data privacy pipelines. In this example, a cursor is shown selecting a pipeline called DeviceActionReport. Once selected, selection of debug button 820 may trigger execution of the DeviceActionReport in debug mode, substituting specified sample data for production data, executing the computational steps of the DeviceActionReport pipeline on the sample data, thereby generating sample transformations, sample outputs, and sample diagnostic logs.

In some implementations, although diagnostic logs generated during production mode are not exposed, they may nevertheless be generated and stored in some secured location (e.g., in a data trustee environment), and authorized participants may run a debugging pipeline on these secured diagnostic logs without exposing the contents of the diagnostic logs. In an example implementation, a user interface that accepts user input enabling an option to save diagnostic logs (e.g., such as user interface 700 of FIG. 7) and/or that accepts user input granting an entitlement to the diagnostic logs may be provided. In an example implementation involving granting an entitlement to a diagnostic log, selecting the contracts link in panel 210 of FIG. 2 may open an interface that represents participants to a selected contract (e.g., including placeholder participants), assets governed by the selected contract, and/or entitlements specifying permissions to use the assets. The interface may include an interface element with an option to add or configure an entitlement in the selected contract, and selection of the option may open an interface that accepts user input specifying parameters of an entitlement. In another example, selecting a particular asset represented on canvas 230 or in pipeline 240 of FIG. 2 (e.g., as a block representing the asset in a pipeline) may open an interface that represents and/or accepts user input specifying parameters of an entitlement governing the use of that asset.

For example, FIG. 9 is an illustration of an example user interface 900 for adding an entitlement that permits the use of diagnostic logs generated by a particular computational step, in accordance with implementations described herein. In an example implementation, user interface 900 accepts user input specifying various parameters for the entitlement, such as name 910, description 920, entitlement asset 930 to be governed by the entitlement, and partner 940 who will receive the entitlement. In this example, an entitlement named "logs" (name 910) is defined granting Contoso (partner 940) an entitlement to a script (entitlement asset 930) called ContosoDataPreparation (e.g., ContosoDataPreparation script 248 of FIG. 2). In this example, user interface 900 includes constraints tab 950 and policies tab 960. Although not depicted, constraints tab 950 may accept user input specifying one or more constraints applicable upon a pipeline accessing the ContosoDataPreparation script (entitlement asset 930). In this example, user interface 900 is illustrated with policies tab 960 active, enabling a user to designate an output generated by the ContosoDataPreparation script (policy type field 970) and assign it a name ("DiagnosticOutput" entered into field 980) to define it as a virtual data asset. In this example, saving these settings may serve to create a virtual data asset named DiagnosticOutput, enabling a user to grant entitlements to this DiagnosticOutput. Note in this example, Contoso may be granting an entitlement to itself (and/or its other partners) in order to create a virtual data asset that Contoso will be able to incorporate into its pipelines (e.g., by referencing the virtual data asset). Note the virtual data asset DiagnosticOutput may be empty until a pipeline containing the ContosoDataPreparation script is executed.

Figure 10A:
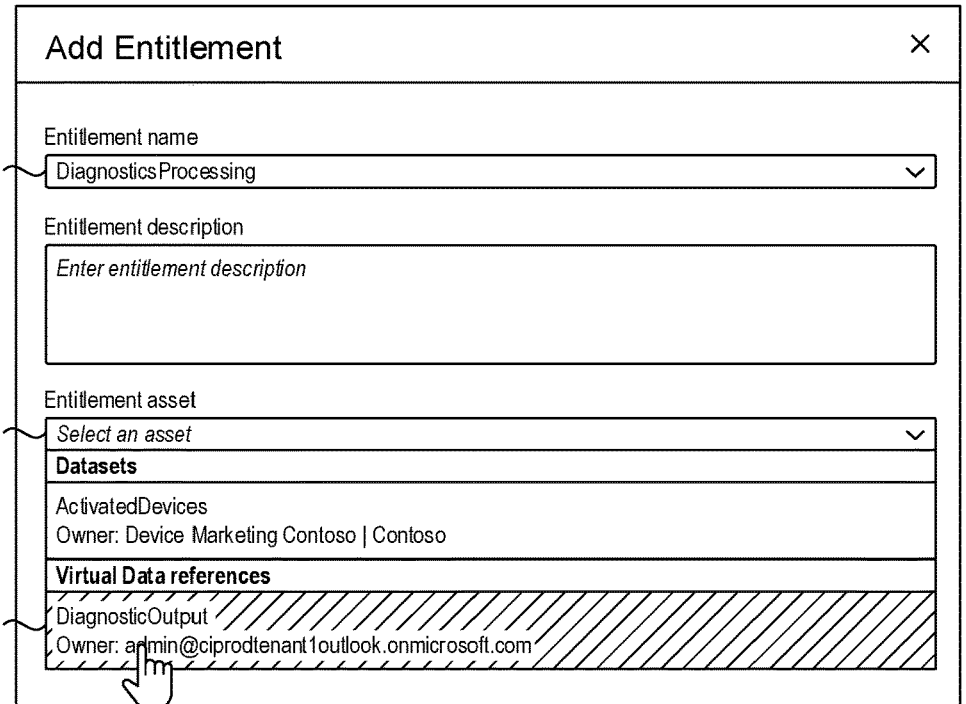
FIGS. 10A and 10B are illustrations of an example user interface for specifying constraints or policies on the use of diagnostic logs generated by a particular computational step, in accordance with certain implementations described herein.
Figure 10B:
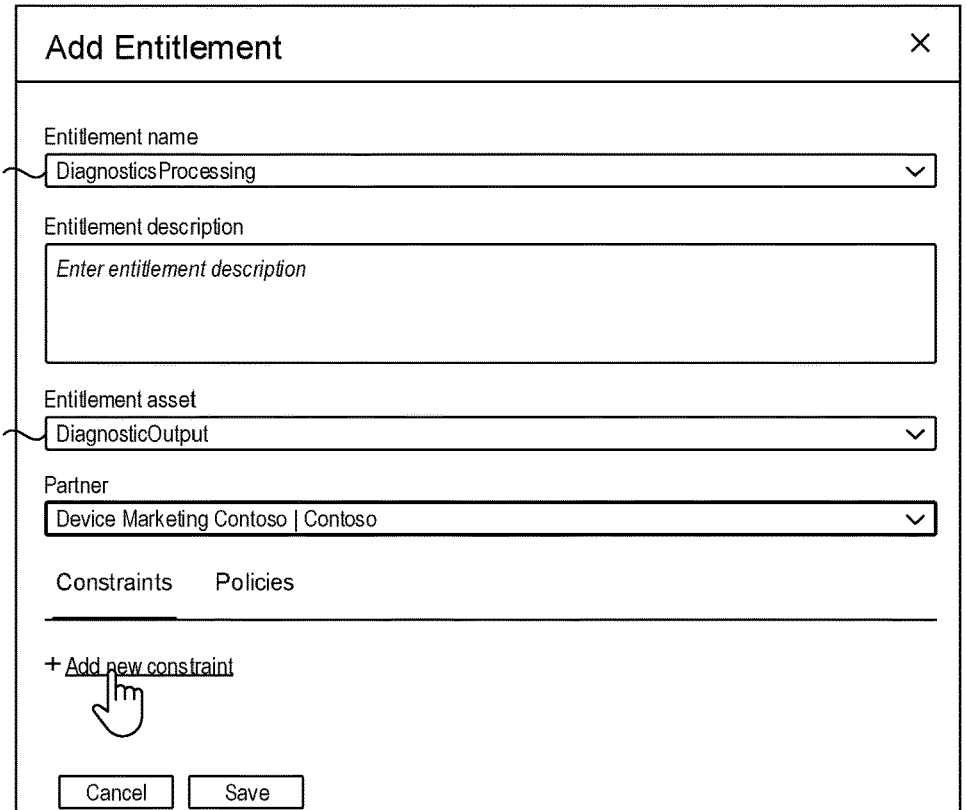

In some implementations, defining a diagnostic log to be generated by particular computational step as a virtual dataset and/or giving it a name enables an authorized participant to define one or more constraints on access or policies on downstream use. FIGS. 10A and 10B are illustrations of example user interface 1000 for specifying constraints or policies on the use of diagnostic logs generated by a particular computational step, in accordance with implementations described herein. For example, in FIG. 10A, user interface 1000 accepts user input specifying various parameters for a new entitlement, such as name 1010 (DiagnosticProcessing) and entitlement asset 1020 to be governed by the entitlement. In this example, selecting the drop-down menu for entitlement asset 1020 displays a list of available assets, which now includes the virtual data asset DiagnosticOutput 1030 defined above. Selecting the virtual data asset DiagnosticOutput 1030 may update user interface 1000 as illustrated in FIG. 10B, enabling entry of any desired constraints or policies on the use of the virtual data asset DiagnosticOutput 1030.

Figure 11:
FIG. 11 is an illustration of an example user interface for designating a diagnostic log generated by a computational step as a named dataset, in accordance with certain implementations described herein.

In another example implementation, a user interface that automatically configures an entitlement to diagnostic logs may be provided. For example, FIG. 11 is an illustration of an example user interface 1100 for designating a diagnostic log generated by a computational step as a named dataset, in accordance with implementations described herein. In this example, user interface 1100 includes setting 1110 that includes a drop down menu that has been used to assign the console diagnostic log to a virtual dataset called SuperSecretHiddenDataset. In some implementations, saving these settings automatically creates an entitlement (whether in an existing contract or a new one) authorizing the use of SuperSecretHiddenDataset in a data trustee environment. For example, a new contract may be created with an entitlement for any participant to the contract governing the script represented by user interface 1100, or any participant to a pipeline that includes the script. Embodiments such as these may consider diagnostic logs generated by a particular computational step to inherit ownership or entitlement rights from those specified for a corresponding script, pipeline, or contract. As such, an entitlement to use diagnostic logs may be configured based on inherited rights.

Continuing with this example, assume a user saves the settings shown in user interface 1100, and triggers a pipeline that includes the script represented by user interface 1100 (e.g., using run button 810 of FIG. 8). In an example implementation, execution of the pipeline serves to generate enabled diagnostic logs, including the one assigned to the virtual dataset SuperSecretHiddenDataset. FIG. 12 is an illustration of an example user interface 1200 listing available datasets in a particular workspace, in accordance with implementations described herein. As illustrated in FIG. 12, user interface 1200 lists SuperSecretHiddenDataset, which will now include the generated production diagnostic log. However, in this example, the contents of the log itself are not visible.

Figure 13:
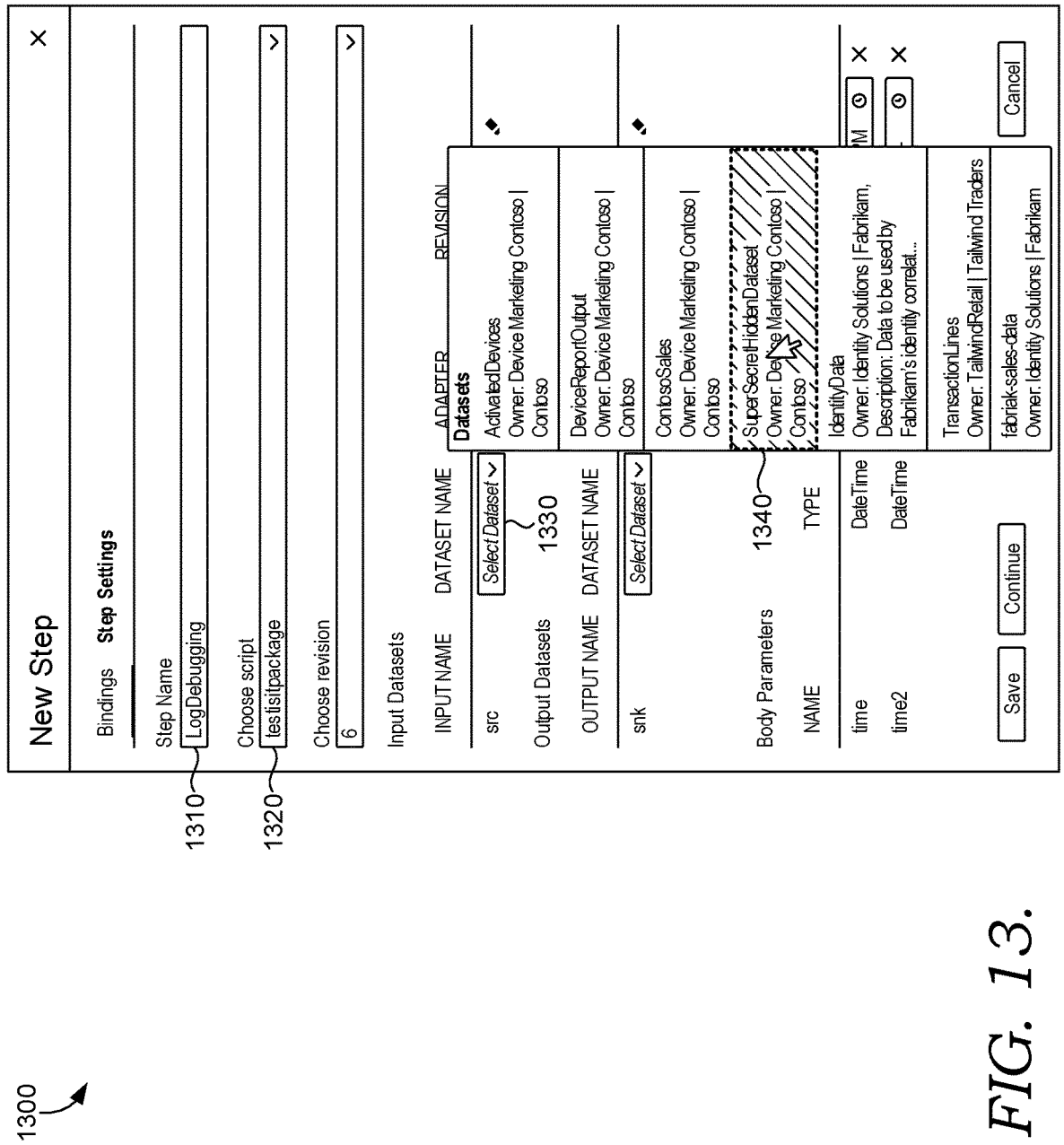
FIG. 13 is an illustration of an example user interface for adding a computational step to analyze shielded log data, in accordance with certain implementations described herein.

In order to analyze the contents of the log, an authorized participant may create a pipeline that uses the SuperSecretHiddenDataset, and then the participant may trigger that pipeline to execute in a data trustee environment. Any suitable interface for developing a data privacy pipeline or data collaboration app may be used, such as user interface 200 of FIG. 2. In an example implementation, a computational step is added to a new pipeline or app (e.g., on an electronic canvas using add step button 220 of FIG. 2), which opens an interface that displays and/or accepts user input specifying various step properties, such as step name, identification of a computation (e.g., a script or model) to execute during the computational step, identification of one or more input datasets into the computational step, identification of one or more output datasets to be generated by the computational step, and/or others. For example, FIG. 13 is an illustration of an example user interface 1300 for adding a computational step to analyze shielded log data, in accordance with implementations described herein. In this example, a step named "LogDebugging" (name 1310) is defined associated with a script named "testisitpackage" (script 1320). In this example, user interface 900 includes dropdown menu 1330 for selecting an input dataset into the computational step. In this example, the user may select the SuperSecretHiddenDataset 1340, assign an output dataset where the insights generated by the testisitpackage script will be stored, save the computational step, and/or otherwise configure a debugging pipeline. Once the user has finished configuring the debugging pipeline, he or she may trigger the pipeline in production mode (e.g., using run button 810 of FIG. 8) to generate and store an exposable log analysis in the specified output dataset, without exposing the contents of the log itself. As such, the user may debug issues that arise during production by analyzing production diagnostic logs without exposing potentially sensitive information that may have leaked into the production diagnostic logs.

Example Flow Diagrams

With reference now to FIGS. 14-23, flow diagrams are provided illustrating various methods. Each block of the methods 1400-2300 and any other methods described herein comprise a computing process performed using any combination of hardware, firmware, and/or software. For instance, in some implementations, various functions are carried out by a processor executing instructions stored in memory. In some cases, the methods are embodied as computer-usable instructions stored on computer storage media. In some implementations, the methods are provided by a standalone application, a service or hosted service (standalone or in combination with another hosted service), or a plug-in to another product, to name a few.

Figure 14:
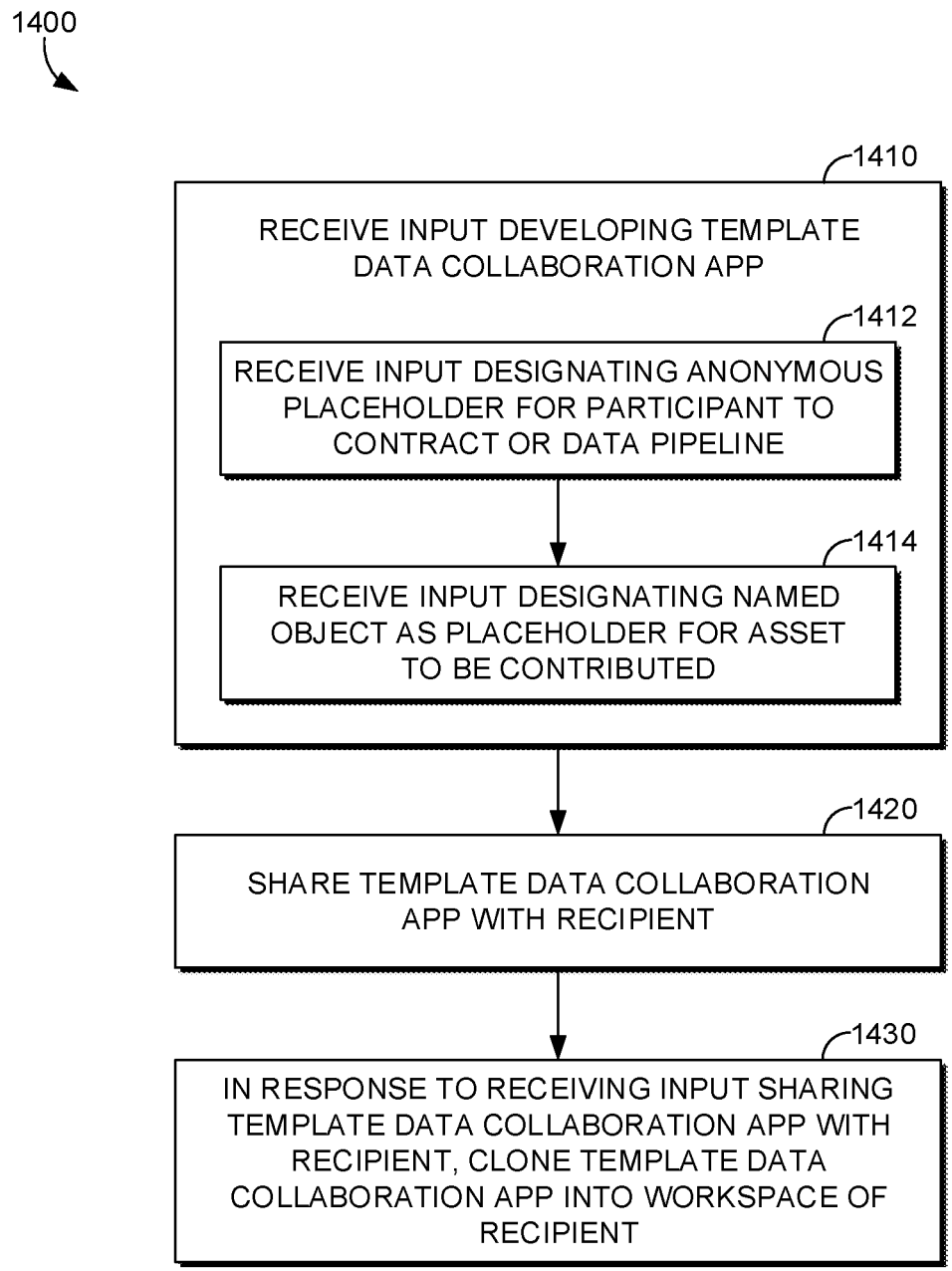
FIG. 14 is a flow diagram showing an example method of sharing a template data collaboration app, in accordance with certain implementations described herein.

FIG. 14 illustrates a method 1400 of sharing a template data collaboration app, in accordance with implementations described herein. Initially at block 1410, input developing a template data collaboration app is received. Blocks 1412-1414 illustrate an example technique for receiving input developing a template data collaboration app. At block 1412, input is received designating an anonymous placeholder for a participant to a contract or a data pipeline. For example, the input may be received through an interface provided by authoring tool 120 of FIG. 1, and data collaboration tool 115 of FIG. 1 may create a corresponding named object that represents the participant in the data collaboration app, without identifying the participant. This enables a developer to reference the named object in multiple contracts and/or pipelines in the template data collaboration app without identifying the participant. At block 1414, input is received designating a named object as a placeholder for an asset to be contributed. For example, the input may be received through an interface provided by authoring tool 120 of FIG. 1, and data collaboration tool 115 of FIG. 1 may create the named object that represents the asset in the data collaboration app, without referencing the actual asset (e.g., without adding a pointer to its storage location). This enables a developer to reference a placeholder for the asset in multiple contracts and/or pipelines in the template data collaboration app without referencing the actual asset. Accordingly, the developer may create a template data collaboration app comprising any number of pipelines and/or governing contracts, before inviting any or all of the participants.

At block 1420, input sharing the template data collaboration app with a recipient is received. At block 1430, in response to receiving the input sharing the template data collaboration app with the recipient, the template data collaboration app is cloned into a workspace of the recipient. For example, sharing tool 140 of FIG. 1 may provide a user interface that accepts such an input (e.g., identifying the recipient account by email address) and may clone the template data collaboration app into the recipient's workspace in data collaboration tool 115. In another example, the template data collaboration app may be hosted in some discoverable location like an app store, and the recipient requests to download the template data collaboration app from the app store, triggering a download or transfer into the recipient's workspace.

Figure 15:
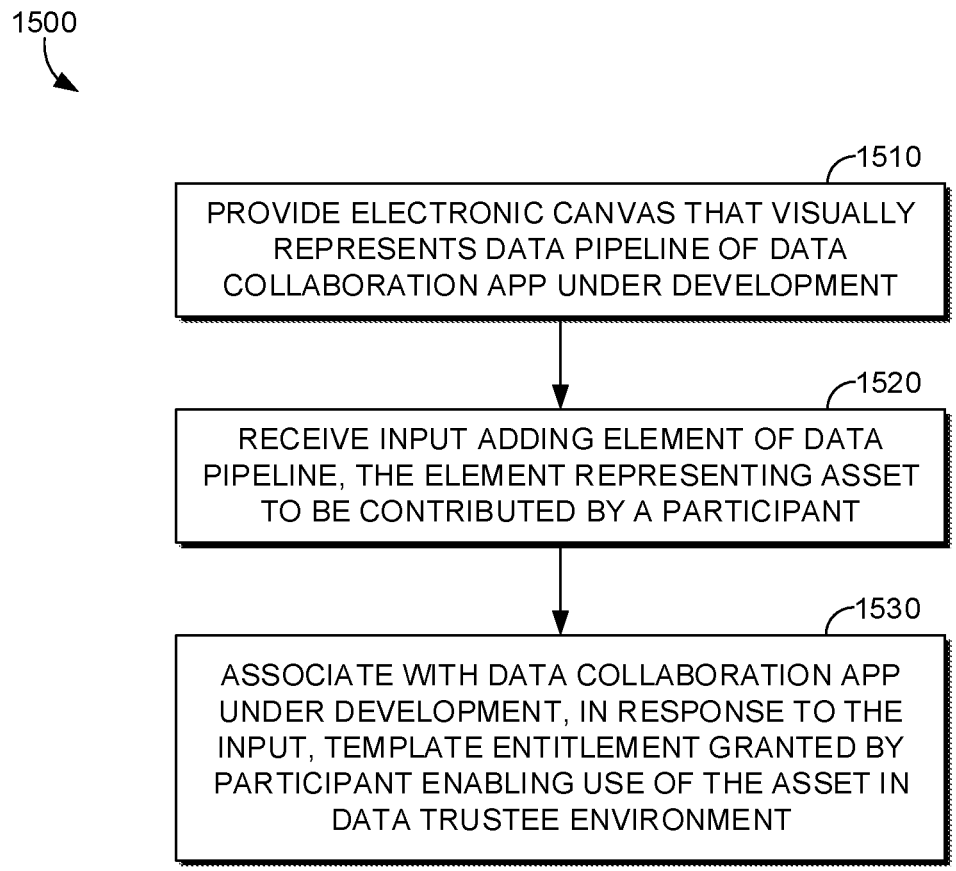
FIG. 15 is a flow diagram showing an example method of developing a template data collaboration app using an electronic canvas, in accordance with certain implementations described herein.

FIG. 15 illustrates a method 1500 of developing a template data collaboration app using an electronic canvas, in accordance with implementations described herein. Initially at block 1510, an electronic canvas is provided that visually represents a data pipeline of a data collaboration app under development. For example, the electronic canvas may correspond to canvas 122, the data pipeline may correspond to one of pipelines 188, and the data collaboration app under development may correspond to one of apps 190 of FIG. 1. In another example, the electronic canvas may correspond to canvas 230, the data pipeline may correspond to data pipeline 240, and the data collaboration app under development may correspond to the DeviceActionReport app represented by FIG. 2. Visually representing a pipeline under development serves to streamline data collaboration app development, helping the developer (or a participant) to better understand the pipeline.

At block 1520, input is received adding an element of the data pipeline, where the element represents an asset to be contributed by a participant. The asset may be a dataset, script, or model, and the element may be a placeholder that represents the asset without identifying it (e.g., without adding a pointer to its storage location). In an example implementation, a developer may use add step button 220 of FIG. 2 to configure or otherwise identify a particular script or model. In another example, user interface 200 may provide an interaction element that prompts a developer to add a new dataset, upload a new dataset, or otherwise specify parameters of a new dataset.

At block 1530, in response to the input, a template entitlement granted by the participant enabling use of the asset in a data trustee environment is associated with the data collaboration app under development. For example, data collaboration tool 115 of FIG. 1 may automatically create or associate an electronic representation of a corresponding contract (or contract template with placeholder participants) with an entitlement that enables (authorizes) the use of the asset in the data trustee environment. In prior versions of the data collaboration tool, entitlements for assets needed to be created, configured, and mapped to assets manually. As such, implementations that automatically create or associate an entitlement with an added asset, or otherwise simplify the user experience, serve to streamline data collaboration app development.

Figure 16:
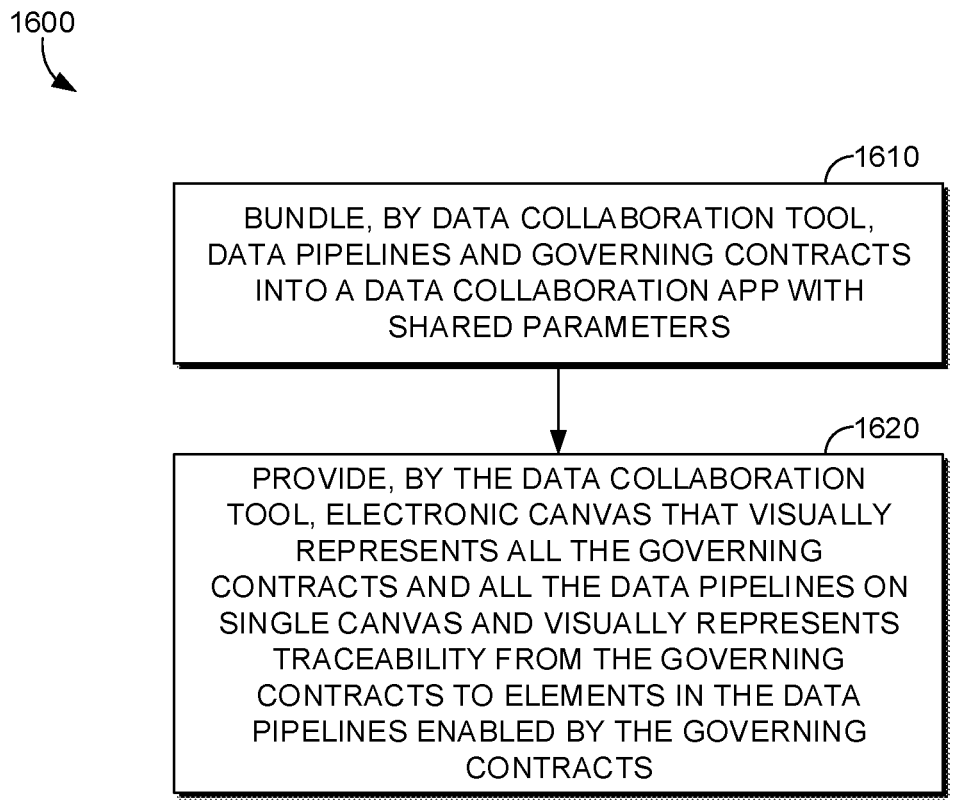
FIG. 16 is a flow diagram showing an example method of providing access to a data collaboration app using an electronic canvas, in accordance with certain implementations described herein.

FIG. 16 illustrates a method 1600 of providing access to a data collaboration app using an electronic canvas, in accordance with implementations described herein. Initially at block 1610, a data collaboration tool bundles data pipelines and governing contracts into a data collaboration app with shared parameters. For example, the data collaboration tool may correspond with data collaboration tool 115 of FIG. 1. Bundling pipelines and contracts into a data collaboration app facilitates the separation of data collaboration app development (and therefore data collaboration development) from consumption or use of a given data collaboration app, and facilitates abstraction or hiding of complexity or lower level implementation detail from the end user, making it easier for data collaborators to find and use a relevant data collaboration app.

At block 1620, the data collaboration tool provides an electronic canvas that visually represents all the governing contracts and all the data pipelines on single canvas and visually represents traceability from the governing contracts to elements in the data pipelines enabled by the governing contracts. For example, the electronic canvas may correspond to canvas 122, the data pipelines may correspond to pipelines 188, and the governing contracts may correspond to contracts 186 of FIG. 1. In another example, the electronic canvas may correspond to canvas 510, the data pipelines may correspond to data pipelines 520 and 530 of FIG. 5. Visually representing all governing contracts and data pipelines on a single canvas and/or visually representing traceability from the governing contracts to elements in the data pipelines enabled by the governing contracts serves to streamline data collaboration app development, helping the developer (or a participant) to better understand the various elements of the pipelines and their relationships with the governing contracts.

Figure 17:
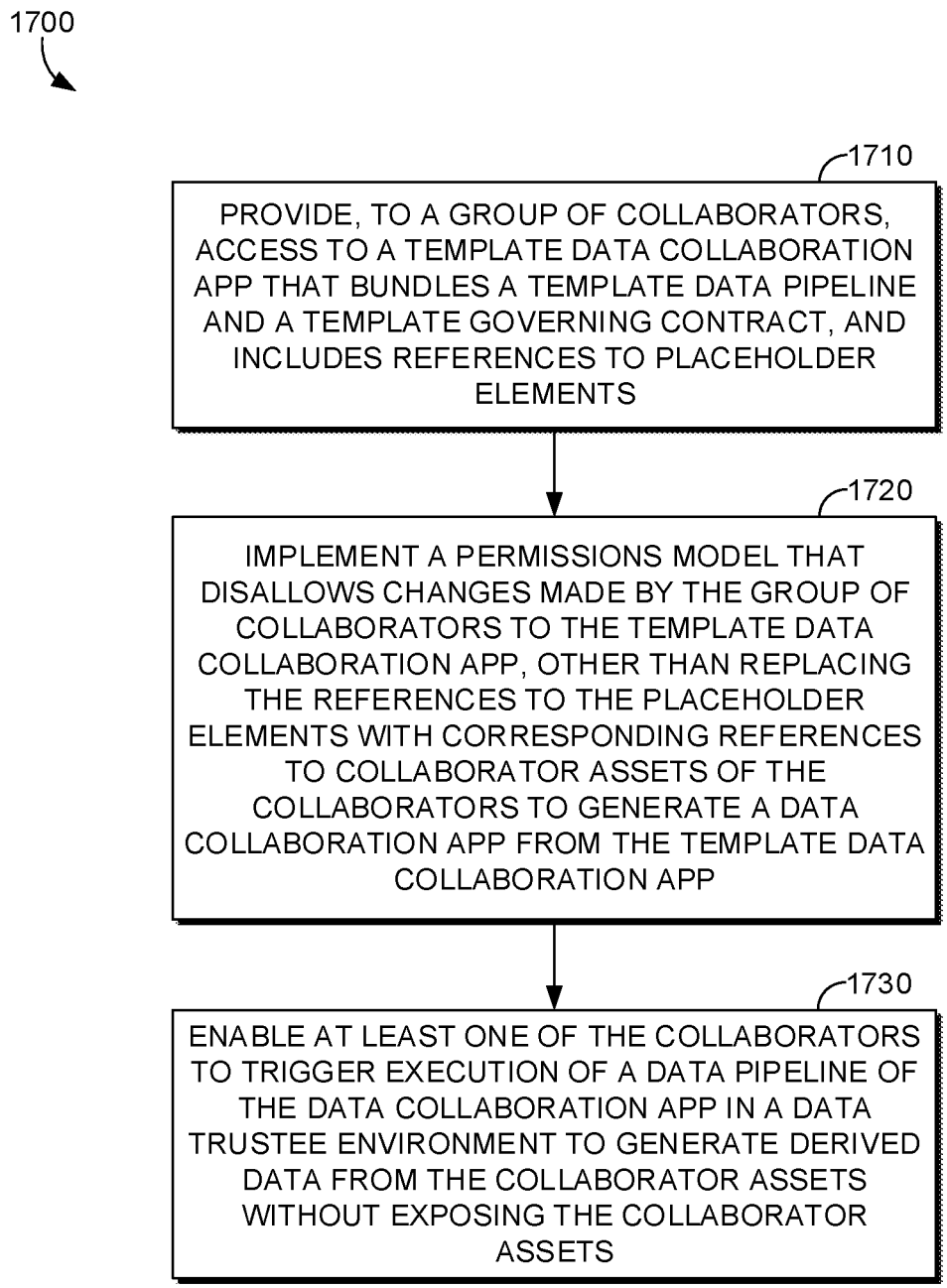
FIG. 17 is a flow diagram showing an example method of generating a data collaboration app from a template data collaboration app based on replacing references to placeholder elements, in accordance with certain implementations described herein.

FIG. 17 illustrates a method 1700 of generating a data collaboration app from a template data collaboration app based on replacing references to placeholder elements, in accordance with implementations described herein. Initially at block 1710, a group of collaborators is provided access to a template data collaboration app that bundles a template data pipeline and a template governing contract, and includes references to placeholder elements. For example, data collaboration tool 115 of FIG. 1 may provide different accounts with their own workspaces, and a particular collaborator may initiate a collaboration using an interface of deployment tool 150 to invite the other collaborators into a template data collaboration app that is available to the particular collaborator.

At block 1720, a permissions model is implemented that disallows changes made by the group of collaborators to the template data collaboration app, other than replacing the references to the placeholder elements with corresponding references to collaborator assets of the collaborators to generate a data collaboration app from the template data collaboration app. For example, authoring tool 120 and/or deployment tool 150 of FIG. 1 may implement such a permissions model. If a permissions model disallows changes except for filling in placeholders, these types of changes may not be considered to modify the trust structure of the contract, so authoring tool 120 and/or deployment tool 150 may not require participant signatures before a completed data collaboration app may be deployed. In other words, this type of permissions model can obviate the need for signatures, which streamlines data collaboration app development, simplifies the user experience, and hides complexity in the app development process from the participants.

At block 1730, at least one of the collaborators is enabled to trigger execution of a data pipeline of the data collaboration app in a data trustee environment to generate derived data from the collaborator assets without exposing the collaborator assets. For example, deployment tool 150 of FIG. 1 may determine that all placeholders have been filled in, responsively apply version controlling (e.g., deploying) to the data collaboration app, and therefore allow one of the collaborators to use production mode tool 170 to trigger the data collaboration app (or a constitute pipeline) to derive collaborate intelligence in a data trustee environment.

Figure 18:
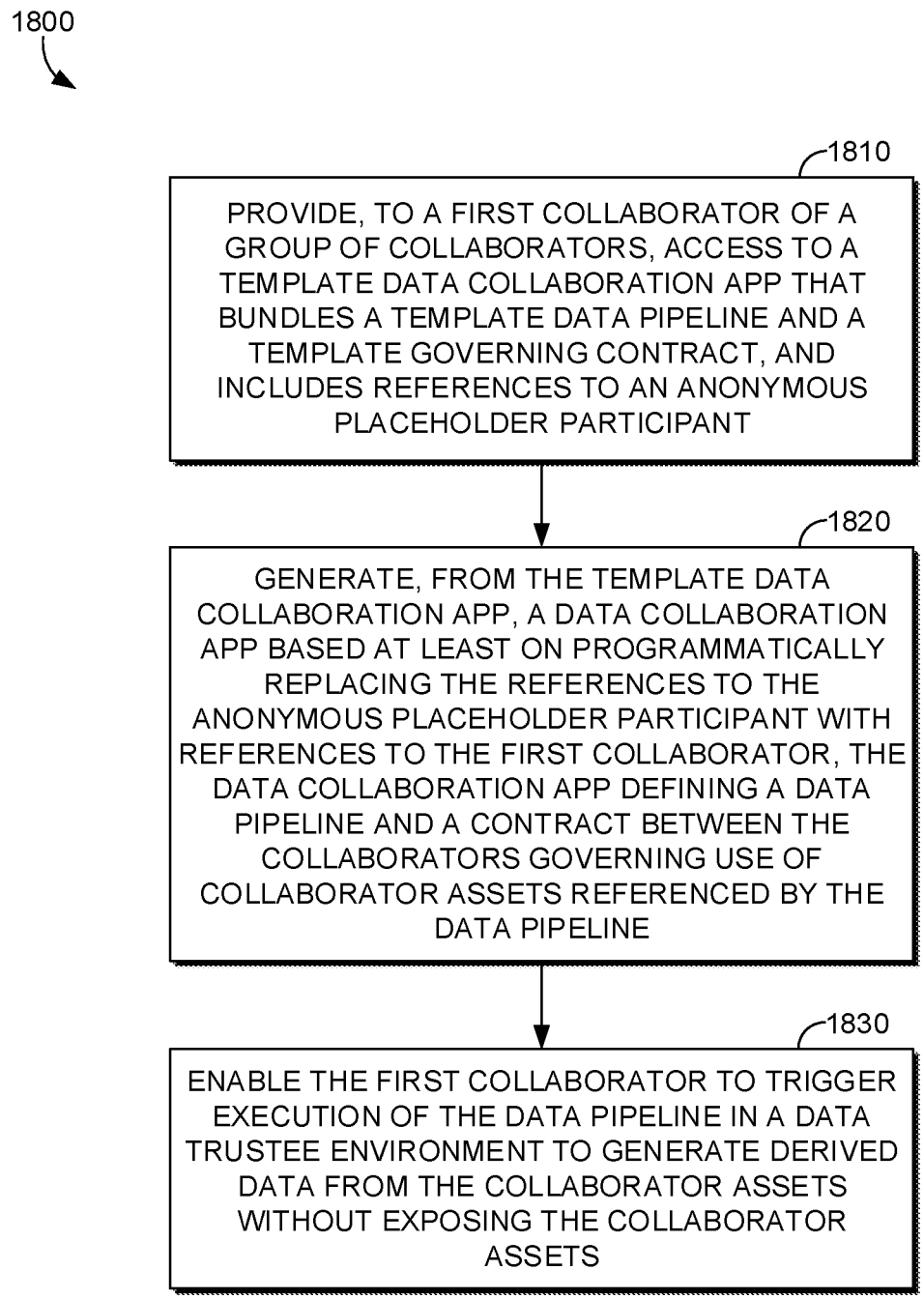
FIG. 18 is a flow diagram showing an example method of generating a data collaboration app from a template data collaboration app based on programmatically replacing references to an anonymous placeholder participant, in accordance with certain implementations described herein.

FIG. 18 illustrates a method 1800 of generating a data collaboration app from a template data collaboration app based on programmatically replacing references to an anonymous placeholder participant, in accordance with implementations described herein. Initially at block 1810, a first collaborator of a group of collaborators is provided access to a template data collaboration app that bundles a template data pipeline and a template governing contract, and includes references to an anonymous placeholder participant. For example, data collaboration tool 115 of FIG. 1 may provide different accounts with their own workspaces, and a particular collaborator may initiate a collaboration using an interface of deployment tool 150 to invite the other collaborators into a template data collaboration app that is available to the particular collaborator.

At block 1820, a data collaboration app generated from the template data collaboration app based at least on programmatically replacing the references to the anonymous placeholder participant with references to the first collaborator, essentially converting the template data collaboration app into a completed data collaboration app that defines a data pipeline and a contract between the collaborators governing use of collaborator assets referenced by the data pipeline. For example, an input replacing the anonymous placeholder participant with a particular participant (e.g., represented by a name, email address, account number, etc.) may be received through an interface provided by authoring tool 120 of FIG. 1, and data collaboration tool 115 of FIG. 1 may programmatically replace all references to the anonymous placeholder participant across all contracts and pipelines in the template data collaboration app, without requiring each reference to be updated individually, thereby streamlining data collaboration app development and simplifying the user experience.

At block 1830, the first collaborator is enabled to trigger execution of the data pipeline in a data trustee environment to generate derived data from the collaborator assets without exposing the collaborator assets. For example, deployment tool 150 of FIG. 1 may manage signatures or approvals, apply version controlling (e.g., deploying) to the data collaboration app, and allow one of the collaborators to use production mode tool 170 to trigger the data collaboration app (or a constitute pipeline) to derive collaborate intelligence in a data trustee environment.

Figure 19:
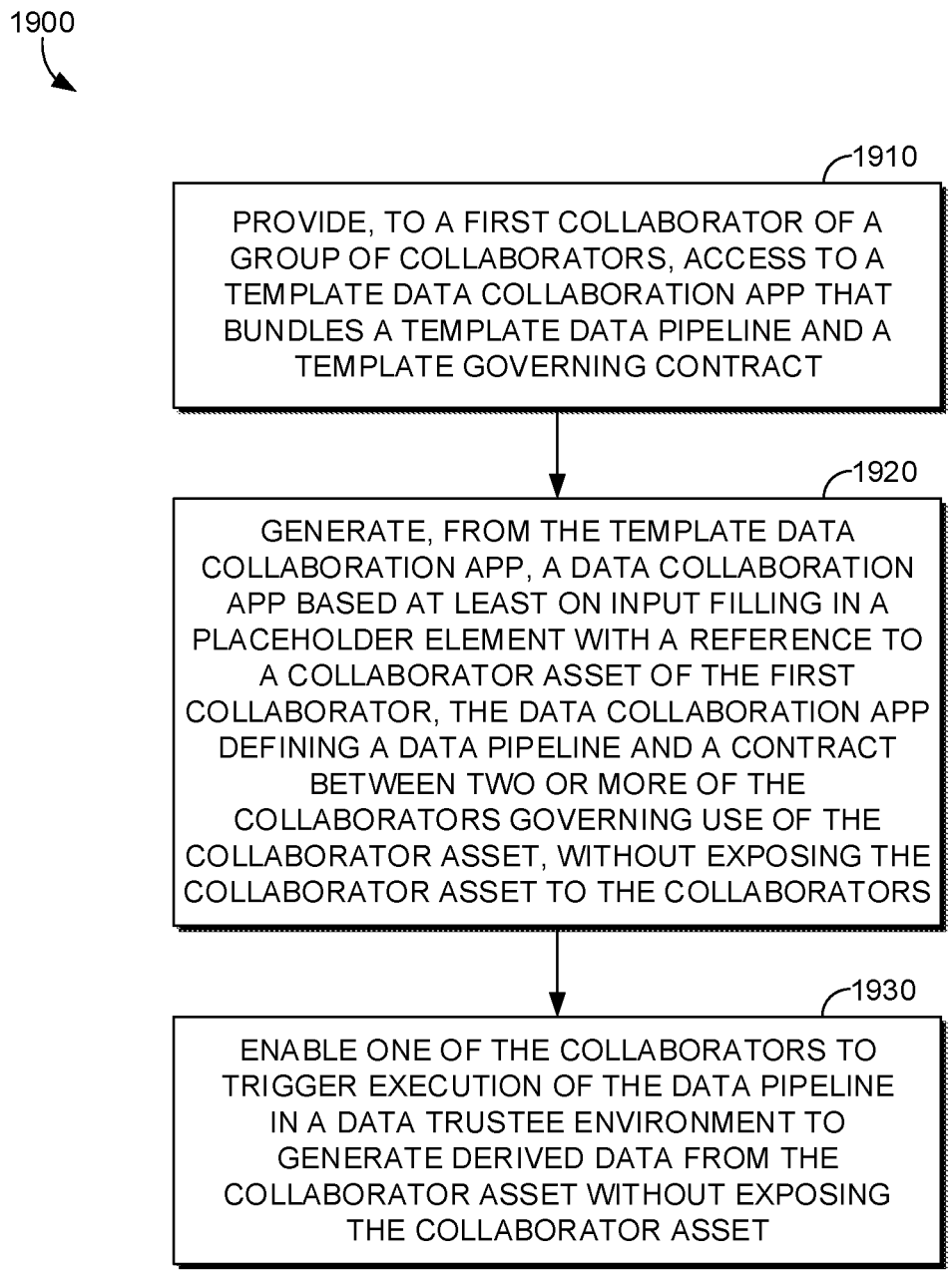
FIG. 19 is a flow diagram showing an example method of generating a data collaboration app from a template data collaboration app based on filling in a placeholder element with a reference to a collaborator asset, in accordance with certain implementations described herein.

FIG. 19 illustrates a method 1900 of generating a data collaboration app from a template data collaboration app based on filling in a placeholder element with a reference to a collaborator asset, in accordance with implementations described herein. Initially at block 1910, a first collaborator of a group of collaborators is provided access to a template data collaboration app that bundles a template data pipeline and a template governing contract.

At block 1920, a data collaboration app generated from the template data collaboration app based at least on input filling in a placeholder element with a reference to a collaborator asset of the first collaborator, essentially converting the template data collaboration app into a completed data collaboration app that defines a data pipeline and a contract between two or more of the collaborators governing use of the collaborator asset, without exposing the collaborator asset to the collaborators. For example, an input replacing the placeholder element with a reference to a collaborator asset (e.g., a pointer to its storage location) may be received through an interface provided by authoring tool 120 of FIG. 1, and data collaboration tool 115 of FIG. 1 may programmatically replace all references to the placeholder element across all contracts and pipelines in the template data collaboration app with corresponding references to the collaborator asset, without requiring each reference to be updated individually, thereby streamlining data collaboration app development and simplifying the user experience.

At block 1930, one of the collaborators is enabled to trigger execution of the data pipeline in a data trustee environment to generate derived data from the collaborator asset without exposing the collaborator asset. For example, deployment tool 150 of FIG. 1 may manage signatures or approvals, apply version controlling (e.g., deploying) to the data collaboration app, and allow one of the collaborators to use production mode tool 170 to trigger the data collaboration app (or a constitute pipeline) to derive collaborate intelligence in a data trustee environment.

Figure 20:
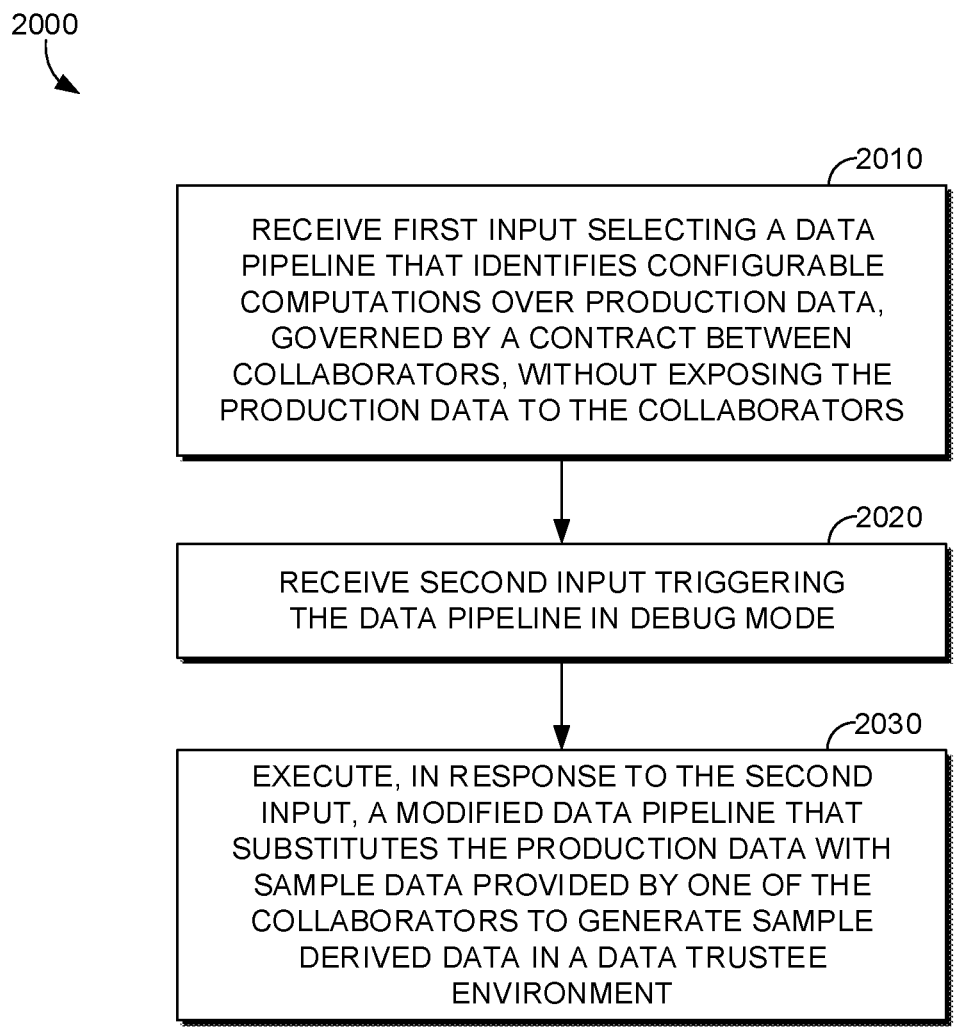
FIG. 20 is a flow diagram showing an example method of triggering a data pipeline in debug mode, in accordance with certain implementations described herein.

FIG. 20 illustrates a method 2000 of triggering a data pipeline in debug mode, in accordance with implementations described herein. Initially at block 2010, first input is received selecting a data pipeline that identifies configurable computations over production data, governed by a contract between collaborators, without exposing the production data to the collaborators. For example, user interface 800 of FIG. 8 may be used to select the data pipeline from a list or other representation of data pipelines.

At block 2020, second input is received triggering the data pipeline in debug mode. For example, once a data pipeline selected from user interface 800, selection of debug button 820 of FIG. 8 may trigger execution of the selected data pipeline in debug mode. In another example, selection of data pipeline from user interface 800 may trigger a detailed view or flow diagram representing of the selected pipeline, such as user interface 200 of FIG. 2. In this example, debug button 224 may be selected to trigger the selected pipeline in debug mode.

At block 2030, in response to the second input, a modified data pipeline is executed that substitutes the production data with sample data provided by one of the collaborators to generate sample derived data in a data trustee environment. For example, debug mode tool 160 of FIG. 1 runs a selected data pipeline over sample data instead of production data for debugging purposes. This way, data privacy pipelines may be tested and debugged on sample data before a contract has been signed, and may be tested and debugged during production if something goes wrong while running a data pipeline governed by a signed contract, without exposing production data. Furthermore, since sample data is usually a smaller size than production data, running a pipeline in debug mode over sample data will often consume less compute resources than in production mode.

Figure 21:
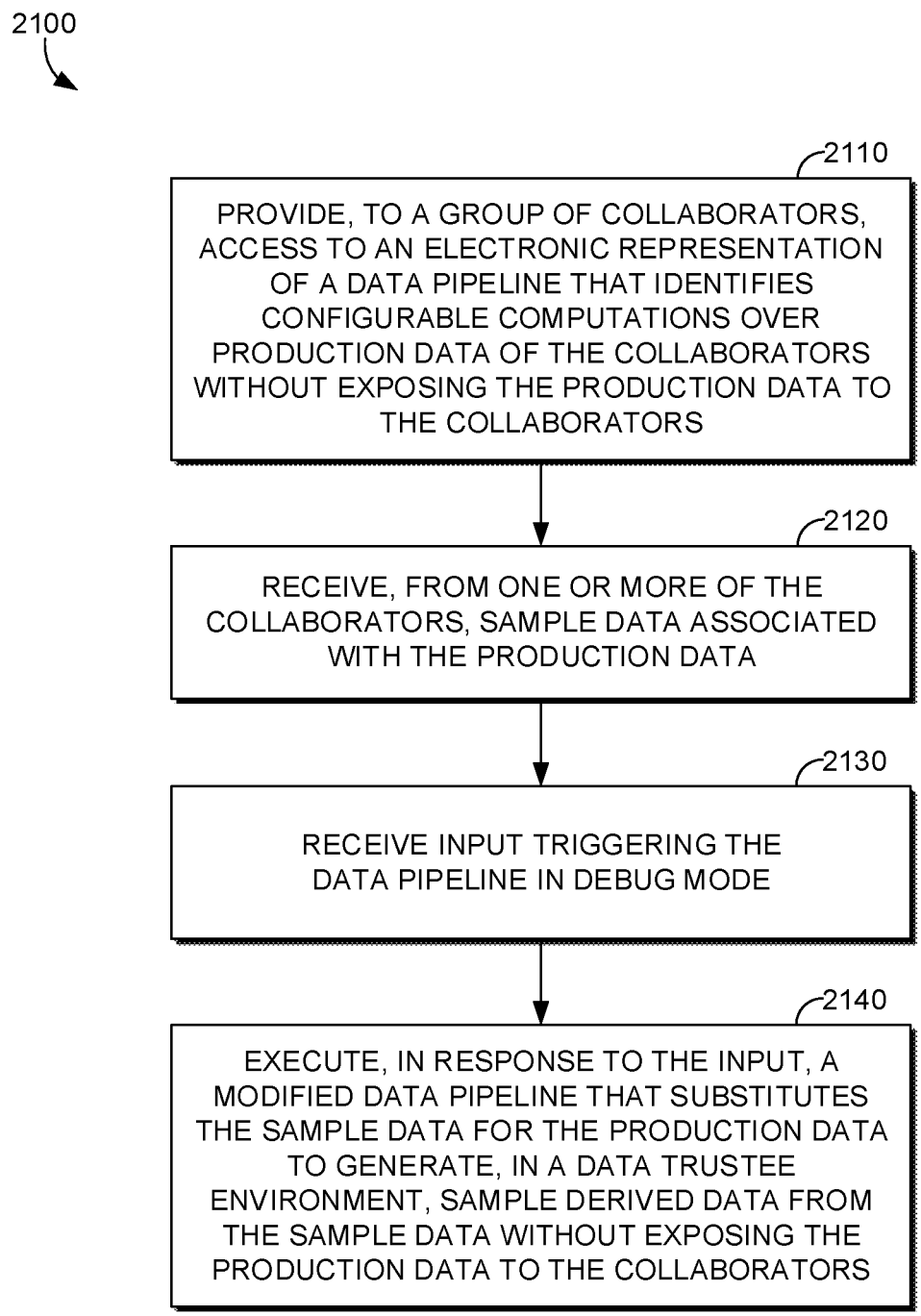
FIG. 21 is a flow diagram showing an example method of triggering a data pipeline in debug mode using sample data received from one or more collaborators, in accordance with certain implementations described herein.

FIG. 21 illustrates a method 2100 of triggering a data pipeline in debug mode using sample data received from one or more collaborators, in accordance with implementations described herein. Initially at block 2110, a group of collaborators is provided access to an electronic representation of a data pipeline that identifies configurable computations over production data of the collaborators without exposing the production data to the collaborators. For example, data collaboration tool 115 of FIG. 1 may provide different accounts with their own workspaces, and a particular collaborator may initiate a collaboration using an interface of deployment tool 150 to invite the other collaborators into a template data collaboration app that is available to the particular collaborator.

At block 2120, sample data associated with the production data is received from one or more of the collaborators. For example, user interface 600 of FIG. 6 may be used to view or edit a sample dataset associated with a particular production dataset. In this example, a desired sample dataset may be specified for each production data, which allows the collaborator contributing a particular sample dataset to provide, designate, or otherwise specify a sample data that effectively represents his or her data.

At block 2130, input is received triggering the data pipeline in debug mode, and at block 2140, in response to the input, a modified data pipeline is executed that substitutes the sample data for the production data to generate, in a data trustee environment, sample derived data from the sample data without exposing the production data to the collaborators. For example, debug mode tool 160 of FIG. 1 runs a selected data pipeline over sample data instead of production data for debugging purposes. This way, data privacy pipelines may be tested and debugged on sample data before a contract has been signed, and may be tested and debugged during production if something goes wrong while running a data pipeline governed by a signed contract, without exposing production data. Furthermore, since sample data is usually a smaller size than production data, running a pipeline in debug mode over sample data will often consume less compute resources than in production mode.

Figure 22:
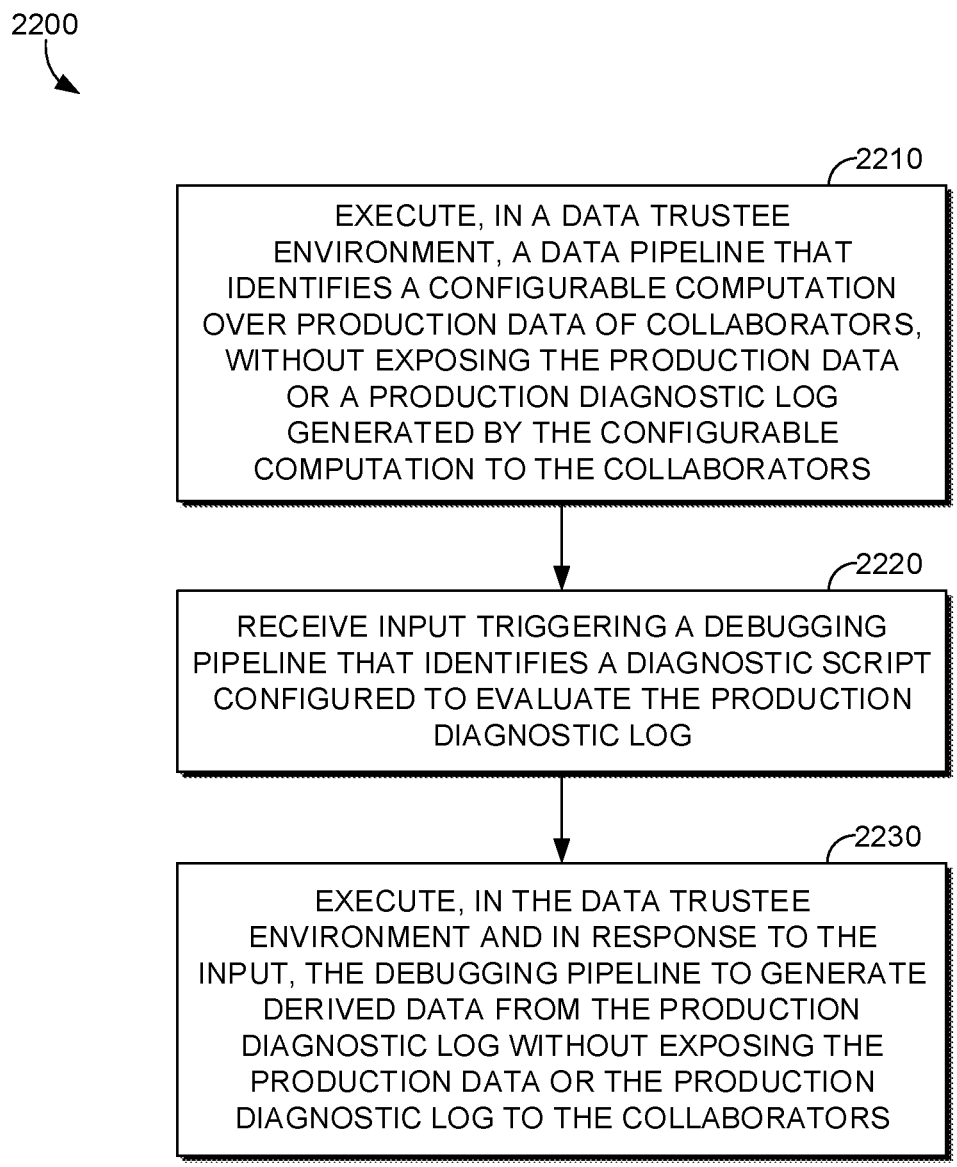
FIG. 22 is a flow diagram showing an example method of executing a debugging pipeline to generate derived data from a production diagnostic log, in accordance with certain implementations described herein.

FIG. 22 illustrates a method 2200 of executing a debugging pipeline to generate derived data from a production diagnostic log, in accordance with implementations described herein. Initially at block 2210, a data pipeline that identifies a configurable computation over production data of collaborators is executed in a data trustee environment, without exposing the production data or a production diagnostic log generated by the configurable computation to the collaborators. For example, diagnostic log tool 132 of FIG. 1 accepts user input toggling an option to name or save diagnostic logs generated by computational steps during production mode, and production mode tool 170 of FIG. 1 accepts user input triggering a deployed pipeline to derive collaborate intelligence (e.g., a constrained environment of) in data trustee environment 110. In this example, since the option to name or save a particular diagnostic log in production mode (e.g. a production diagnostic log) was enabled, the production diagnostic log is saved to some secured storage location without exposing its contents (e.g., storing in secured storage the data trustee environment, saving or exporting an encrypted version). Saving a production diagnostic log without exposing it enables production time debugging over data coming from other tenants and/or collaborative data, without exposing that data.

For example, at block 2220, input is received triggering a debugging pipeline that identifies a diagnostic script configured to evaluate the production diagnostic log. In an example implementation, an authorized participant creates a pipeline that references (e.g., is configured to operate over) the production diagnostic log. Any suitable interface for developing a data privacy pipeline or data collaboration app may be used, such as user interface 200 of FIG. 2. In an example implementation, a computational step is added to a new pipeline or app (e.g., on an electronic canvas using add step button 220 of FIG. 2), which opens an interface such as user interface 1300 of FIG. 13 that displays and/or accepts user input specifying various step properties, such as a designated diagnostic script to run. The participant may trigger that pipeline to execute in a data trustee environment in production mode, for example, using run button 222 of FIG. 2.

At block 2230, in response to the input, the debugging pipeline is executed in the data trustee environment to generate derived data from the production diagnostic log without exposing the production data or the production diagnostic log to the collaborators. Running a debugging pipeline in the data trustee environment over the production diagnostic log enables a collaborator to debug issues that may arise while deploying data pipelines in production mode, thereby enabling production time debugging over data coming from other tenants and/or collaborative data, without exposing that data.

Figure 23:
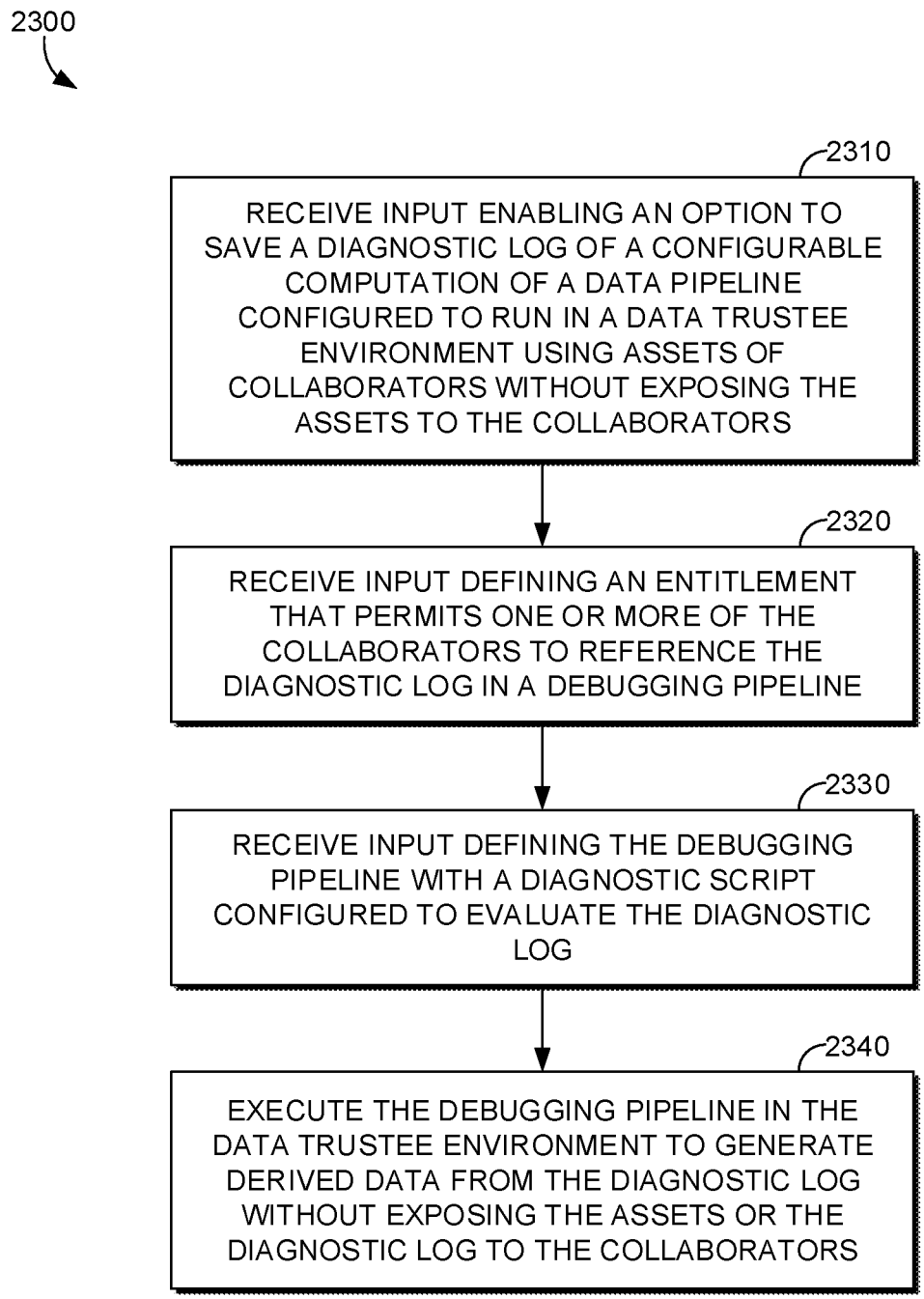
FIG. 23 is a flow diagram showing an example method of defining a debugging pipeline with a diagnostic script configured to evaluate a diagnostic log, in accordance with certain implementations described herein.

FIG. 23 illustrates a method 2300 of defining a debugging pipeline with a diagnostic script configured to evaluate a diagnostic log, in accordance with implementations described herein. Initially at block 2310, input is received enabling an option to save a diagnostic log of a configurable computation of a data pipeline configured to run in a data trustee environment using assets of collaborators without exposing the assets to the collaborators. In an example implementation, diagnostic log tool 132 of FIG. 1 accepts user input toggling an option to name (and therefore save) diagnostic logs generated by computational steps during production mode. In some implementations, defining a diagnostic log to be generated by particular computational step as a virtual dataset and/or giving it a name enables an authorized participant to define one or more constraints on access or policies on downstream use.

More specifically, at block 2320, input is received defining an entitlement that permits one or more of the collaborators to reference the diagnostic log in a debugging pipeline. For example, user interface 1000 of FIGS. 10A-10B may accept user input specifying various parameters for a new entitlement governing use of the diagnostic log. In some implementations, creating an entitlement to the diagnostic log allows a beneficiary to reference the diagnostic log in a data pipeline configured to the data trustee environment, and therefore to build a debugging pipeline that analyzes the log.

At block 2330, input is received defining the debugging pipeline with a diagnostic script configured to evaluate the diagnostic log. Any suitable interface for developing a data pipeline or data collaboration app may be used, such as user interface 200 of FIG. 2. In an example implementation, a computational step is added to a new pipeline or app (e.g., on an electronic canvas using add step button 220 of FIG. 2), which opens an interface such as user interface 1300 of FIG. 13 that displays and/or accepts user input specifying various step properties, such as a designated diagnostic script to run.

At block 2340, the debugging pipeline is executed in the data trustee environment to generate derived data from the diagnostic log without exposing the assets or the diagnostic log to the collaborators. For example, an authorized participant may trigger the debugging pipeline to execute in a data trustee environment in production mode using run button 222 of FIG. 2. Running a debugging pipeline in the data trustee environment over the production diagnostic log enables a collaborator to debug issues that may arise while deploying data pipelines in production mode, thereby enabling production time debugging over data coming from other tenants and/or collaborative data, without exposing that data.

OTHER EMBODIMENTS

As described herein, various implementations may be employed to develop or facilitate a data collaboration. In some implementations, a computing system is provided comprising one or more computer storage media storing computer-useable instructions that, when used by one or more computing devices, cause the one or more computing devices to perform operations. The operations include receiving first input selecting a data pipeline that identifies configurable computations over production data, governed by a contract between collaborators, without exposing the production data to the collaborators. The operations include receiving second input triggering the data pipeline in debug mode. The operations include executing, in response to the second input, a modified data pipeline that substitutes the production data with sample data provided by one of the collaborators to generate sample derived data in a data trustee environment. As such, the data pipeline may be tested and debugged on sample data before the contract has been signed, and may be tested and debugged during production if something goes wrong while running the data pipeline after the contract is signed, without exposing production data. Furthermore, since sample data is usually a smaller size than production data, running the data pipeline in debug mode over sample data will often consume less compute resources than in production mode.

In any combination of the elements listed above, the contract has not been signed by all the collaborators and the data pipeline is under development, and the operations include permitting the collaborators to trigger the data pipeline under development in debug mode without exposing the production data.

In any combination of the elements listed above, the second input is from a first collaborator of the collaborators, and the operations include exposing the sample derived data to the first collaborator without exposing the production data.

In any combination of the elements listed above, the production data includes multiple production datasets contributed by corresponding collaborators, and the sample data includes multiple sample datasets provided the corresponding collaborators via an interface of a data collaboration tool of the data trustee environment.

In any combination of the elements listed above, the sample data includes mock, random, or expired data.

In any combination of the elements listed above, the data pipeline references the production data using one or more pointers without exposing the production data.

In any combination of the elements listed above, the operations include permitting the collaborators to access diagnostic logs generated by the configurable computations over the sample data during the debug mode.

In any combination of the elements listed above, the operations include disallowing the collaborators to access diagnostic logs generated by the configurable computations over the production data in a production mode.

In some implementations, one or more computer storage media, excluding signals per se, having computer-executable instructions embodied thereon that when executed by at least one computer processor, cause the at least one computer processor to perform operations. The operations include providing, to a group of collaborators, access to an electronic representation of a data pipeline that identifies configurable computations over production data of the collaborators without exposing the production data to the collaborators. The operations include receiving, from one or more of the collaborators, sample data associated with the production data. The operations include receiving input triggering the data pipeline in debug mode. The operations include executing, in response to the input, a modified data pipeline that substitutes the sample data for the production data to generate, in a data trustee environment, sample derived data from the sample data without exposing the production data to the collaborators. As such, a desired sample dataset may be specified for each production data, which allows the collaborator contributing a particular sample dataset to provide, designate, or otherwise specify a sample data that effectively represents his or her data. Moreover, the data pipeline may be tested and debugged on sample data before a governing contract is signed, and may be tested and debugged during production if something goes wrong while running the data pipeline after the governing contract is signed, without exposing production data. Furthermore, since sample data is usually a smaller size than production data, running the data pipeline in debug mode over sample data will often consume less compute resources than in production mode.

In any combination of the elements listed above, the data pipeline is under development, and the operations include permitting the collaborators to trigger the data pipeline under development in debug mode without exposing the production data.

In any combination of the elements listed above, the input is from a first collaborator of the collaborators, and the operations include exposing the sample derived data to the first collaborator without exposing the production data.

In any combination of the elements listed above, the production data includes multiple production datasets contributed by corresponding collaborators, and the sample data includes multiple sample datasets provided the corresponding collaborators via an interface of a data collaboration tool of the data trustee environment.

In any combination of the elements listed above, the sample data includes mock, random, or expired data.

In any combination of the elements listed above, the data pipeline references the production data using one or more pointers without exposing the production data.

In any combination of the elements listed above, the operations include permitting the collaborators to access diagnostic logs generated by the configurable computations over the sample data during the debug mode.

In any combination of the elements listed above, the operations include disallowing the collaborators to access diagnostic logs generated by the configurable computations over the production data in a production mode.

In some implementations, a method is provided. The method includes receiving first input selecting a data pipeline that identifies configurable computations over production data, governed by a contract between collaborators, without exposing the production data to the collaborators. The method includes receiving second input triggering the data pipeline in debug mode. The method includes executing, in response to the second input, a modified data pipeline that substitutes the production data with sample data provided by one of the collaborators to generate sample derived data in a data trustee environment. As such, the data pipeline may be tested and debugged on sample data before the contract has been signed, and may be tested and debugged during production if something goes wrong while running the data pipeline after the contract is signed, without exposing production data. Furthermore, since sample data is usually a smaller size than production data, running the data pipeline in debug mode over sample data will often consume less compute resources than in production mode.

In any combination of the elements listed above, the contract has not been signed by all the collaborators and the data pipeline is under development, and the method includes permitting the collaborators to trigger the data pipeline under development in debug mode without exposing the production data.

In any combination of the elements listed above, the second input is from a first collaborator of the collaborators, and the method includes exposing the sample derived data to the first collaborator without exposing the production data.

In any combination of the elements listed above, the method includes permitting the collaborators to access diagnostic logs generated by the configurable computations over the sample data during the debug mode.

In some implementations, a computing system is provided comprising one or more computer storage media storing computer-useable instructions that, when used by one or more computing devices, cause the one or more computing devices to perform operations. The operations include executing, in a data trustee environment, a data pipeline that identifies a configurable computation over production data of collaborators, without exposing the production data or a production diagnostic log generated by the configurable computation to the collaborators. The operations include receiving input triggering a debugging pipeline that identifies a diagnostic script configured to evaluate the production diagnostic log. The operations include executing, in the data trustee environment and in response to the input, the debugging pipeline to generate derived data from the production diagnostic log without exposing the production data or the production diagnostic log to the collaborators. Running a debugging pipeline in the data trustee environment over the production diagnostic log enables a collaborator to debug issues that may arise while deploying data pipelines in production mode, thereby enabling production time debugging over data coming from other tenants and/or collaborative data, without exposing that data.

In any combination of the elements listed above, a data collaboration tool of the data trustee environment includes a representation of the production diagnostic log in a workspace of each collaborator and permits each collaborator to reference the production diagnostic log in a corresponding debugging pipeline without exposing the production diagnostic log.

In any combination of the elements listed above, the operations include receiving input from one of the collaborators defining an entitlement that permits one or more of the collaborators to reference the production diagnostic log in a corresponding debugging pipeline without exposing the production diagnostic log.

In any combination of the elements listed above, the diagnostic script is configured to use pattern matching to identify log structures that define errors.

In any combination of the elements listed above, the diagnostic script is configured to ignore freeform comments in the production diagnostic log.

In any combination of the elements listed above, the operations include receiving input enabling an option to save the production diagnostics log in the data trustee environment without exposing the production diagnostics log.

In any combination of the elements listed above, the data pipeline identifies multiple configurable computations, and a data collaboration tool of the data trustee environment provides an option to specify which diagnostic logs generated by which of the multiple configurable computations to save in the data trustee environment, without exposing the diagnostic logs.

In any combination of the elements listed above, the executing of the data pipeline is in response to initial input from a first collaborator of the collaborators, and the input triggering the triggering a debugging pipeline is from the first collaborator.

In some implementations, one or more computer storage media, excluding signals per se, having computer-executable instructions embodied thereon that when executed by at least one computer processor, cause the at least one computer processor to perform operations. The operations include receiving input enabling an option to save a diagnostic log of a configurable computation of a data pipeline configured to run in a data trustee environment using assets of collaborators without exposing the assets to the collaborators. The operations include receiving input defining an entitlement that permits one or more of the collaborators to reference the diagnostic log in a debugging pipeline. The operations include receiving input defining the debugging pipeline with a diagnostic script configured to evaluate the diagnostic log. The operations include executing the debugging pipeline in the data trustee environment to generate derived data from the diagnostic log without exposing the assets or the diagnostic log to the collaborators. Running a debugging pipeline in the data trustee environment over the production diagnostic log enables a collaborator to debug issues that may arise while deploying data pipelines in production mode, thereby enabling production time debugging over data coming from other tenants and/or collaborative data, without exposing that data.

In any combination of the elements listed above, a data collaboration tool of the data trustee environment includes a representation of the diagnostic log in a workspace of each collaborator and permits each collaborator to reference the diagnostic log in a corresponding debugging pipeline without exposing the diagnostic log.

In any combination of the elements listed above, the diagnostic script is configured to use pattern matching to identify log structures that define errors.

In any combination of the elements listed above, the diagnostic script is configured to ignore freeform comments in the production diagnostic log.

In any combination of the elements listed above, the data pipeline identifies multiple configurable computations, and a data collaboration tool of the data trustee environment provides an option to specify which diagnostic logs generated by which of the multiple configurable computations to save in the data trustee environment, without exposing the diagnostic logs.

In some implementations, a method is provided. The method includes executing, in a data trustee environment, a data pipeline that identifies a configurable computation over production data of collaborators, without exposing the production data or a production diagnostic log generated by the configurable computation to the collaborators. The method includes receiving input triggering a debugging pipeline that identifies a diagnostic script configured to evaluate the production diagnostic log. The method includes executing, in the data trustee environment and in response to the input, the debugging pipeline to generate derived data from the production diagnostic log without exposing the production data or the production diagnostic log to the collaborators. Running a debugging pipeline in the data trustee environment over the production diagnostic log enables a collaborator to debug issues that may arise while deploying data pipelines in production mode, thereby enabling production time debugging over data coming from other tenants and/or collaborative data, without exposing that data.

In any combination of the elements listed above, a data collaboration tool of the data trustee environment includes a representation of the production diagnostic log in a workspace of each collaborator and permits each collaborator to reference the production diagnostic log in a corresponding debugging pipeline without exposing the production diagnostic log.

In any combination of the elements listed above, the method includes receiving input from one of the collaborators defining an entitlement that permits one or more of the collaborators to reference the production diagnostic log in a corresponding debugging pipeline without exposing the production diagnostic log.

In any combination of the elements listed above, the diagnostic script is configured to use pattern matching to identify log structures that define errors.

In any combination of the elements listed above, the diagnostic script is configured to ignore freeform comments in the production diagnostic log.

In any combination of the elements listed above, the method includes receiving input enabling an option to save the production diagnostics log in the data trustee environment without exposing the production diagnostics log.

In any combination of the elements listed above, the data pipeline identifies multiple configurable computations, and a data collaboration tool of the data trustee environment provides an option to specify which diagnostic logs generated by which of the multiple configurable computations to save in the data trustee environment, without exposing the diagnostic logs.

In some implementations, a computing system is provided comprising one or more computer storage media storing computer-useable instructions that, when used by one or more computing devices, cause the one or more computing devices to perform operations. The operations include providing, to a first collaborator of a group of collaborators, access to a template data collaboration app that bundles a template data pipeline and a template governing contract, and includes references to an anonymous placeholder participant. The operations include generating, from the template data collaboration app, a data collaboration app based at least on programmatically replacing the references to the anonymous placeholder participant with references to the first collaborator, the data collaboration app defining a data pipeline and a contract between the collaborators governing use of collaborator assets referenced by the data pipeline. The operations include enabling the first collaborator to trigger execution of the data pipeline in a data trustee environment to generate derived data from the collaborator assets without exposing the collaborator assets. Programmatically replacing all references to the anonymous placeholder participant across all contracts and pipelines in the template data collaboration app, without requiring each reference to be updated individually, streamlines data collaboration app development and simplifies the user experience.

In any combination of the elements listed above, the operations include providing an electronic canvas that visually represents the data pipeline as a flow diagram with elements joined by connections that represent data flow through the data pipeline.

In any combination of the elements listed above, the data collaboration app bundles multiple data pipelines including the data pipeline, and the operations include providing an electronic canvas that visually represents the multiple data pipelines.

In any combination of the elements listed above, the data collaboration app bundles multiple contracts including the contract, and the operations include providing an electronic canvas that visually represents traceability between the collaborator assets in the data pipeline and the multiple contracts by visualizing which of the collaborator assets are enabled by which of the multiple contracts.

In any combination of the elements listed above, the operations include providing an electronic canvas that visually represents traceability between the collaborator assets in the data pipeline and the collaborators by visualizing which of the collaborators contributes which of the collaborator assets.

In any combination of the elements listed above, the operations include, in response to receiving an input adding into the template data pipeline a placeholder for an asset associated with the anonymous placeholder participant, generating the template governing contract with a template entitlement granted by the anonymous placeholder participant enabling use of the asset in the data trustee environment.

In any combination of the elements listed above, the operations include, in response to receiving an input from a developer sharing a developer copy of the template data collaboration app with the first collaborator, generating the template data collaboration app from the developer copy.

In any combination of the elements listed above, the operations include disallowing sharing the template data collaboration app based on a determination that the template data collaboration app includes a reference to one of the collaborator assets.

In some implementations, one or more computer storage media, excluding signals per se, having computer-executable instructions embodied thereon that when executed by at least one computer processor, cause the at least one computer processor to perform operations. The operations include providing, to a first collaborator of a group of collaborators, access to a template data collaboration app that bundles a template data pipeline and a template governing contract. The operations include generating, from the template data collaboration app, a data collaboration app based at least on input filling in a placeholder element with a reference to a collaborator asset of the first collaborator, the data collaboration app defining a data pipeline and a contract between two or more of the collaborators governing use of the collaborator asset, without exposing the collaborator asset to the collaborators. The operations include enabling one of the collaborators to trigger execution of the data pipeline in a data trustee environment to generate derived data from the collaborator asset without exposing the collaborator asset. Programmatically replacing all references to the placeholder element across all contracts and pipelines in the template data collaboration app with corresponding references to the collaborator asset, without requiring each reference to be updated individually, streamlines data collaboration app development and simplifies the user experience.

In any combination of the elements listed above, the operations include providing an electronic canvas that visually represents the data pipeline as a flow diagram with elements joined by connections that represent data flow through the data pipeline.

In any combination of the elements listed above, the data collaboration app bundles multiple data pipelines including the data pipeline, and the operations include providing an electronic canvas that visually represents the multiple data pipelines.

In any combination of the elements listed above, the data collaboration app bundles multiple contracts including the contract, and the operations include providing an electronic canvas that visually represents traceability between collaborator assets in the data pipeline and the contracts by visualizing which of the collaborator assets are enabled by which of the multiple contracts.

In any combination of the elements listed above, the operations include providing an electronic canvas that visually represents traceability between collaborator assets in the data pipeline and the collaborators by visualizing which of the collaborators contributes which of the collaborator assets.

In any combination of the elements listed above, the operations include, in response to receiving an input adding into the template data pipeline the placeholder for the collaborator asset, generating the template governing contract with a template entitlement granted by an anonymous placeholder participant enabling use of the collaborator asset in the data trustee environment.

In any combination of the elements listed above, the operations include, in response to receiving an input from a developer sharing a developer copy of the template data collaboration app with the first collaborator, generating the template data collaboration app from the developer copy.

In any combination of the elements listed above, the operations include disallowing sharing of the template data collaboration app based on a determination that the template data collaboration app includes a reference to a dataset of one of the collaborators.

In some implementations, a method is provided. The method includes providing, to a first collaborator of a group of collaborators, access to a template data collaboration app that bundles a template data pipeline and a template governing contract, and includes references to an anonymous placeholder participant. The method includes generating, from the template data collaboration app, a data collaboration app based at least on programmatically replacing the references to the anonymous placeholder participant with references to the first collaborator, the data collaboration app defining a data pipeline and a contract between the collaborators governing use of collaborator assets referenced by the data pipeline. The method includes enabling the first collaborator to trigger execution of the data pipeline in a data trustee environment to generate derived data from the collaborator assets without exposing the collaborator assets. Programmatically replacing all references to the anonymous placeholder participant across all contracts and pipelines in the template data collaboration app, without requiring each reference to be updated individually, streamlines data collaboration app development and simplifies the user experience.

In any combination of the elements listed above, the method includes providing an electronic canvas that visually represents the data pipeline as a flow diagram with elements joined by connections that represent data flow through the data pipeline.

In any combination of the elements listed above, the data collaboration app bundles multiple data pipelines including the data pipeline, and the method includes providing an electronic canvas that visually represents the multiple data pipelines.

In any combination of the elements listed above, the data collaboration app bundles multiple contracts including the contract, and the method includes providing an electronic canvas that visually represents traceability between the collaborator assets in the data pipeline and the multiple contracts by visualizing which of the collaborator assets are enabled by which of the multiple contracts.

Example Collaborative Intelligence Environment

Some implementations involve techniques for deriving collaborative intelligence based on constraint computing and constraint querying. At a high level, a data trustee can operate a trustee environment configured to derive collaborative intelligence for tenants subject to configurable constraints, without exposing underlying raw data provided by the tenants or collaborative data shielded by the trustee environment. As used herein, collaborative data refers to data that has been derived from shared input data (e.g., data from different users). Shared input data can come from any number of sources (e.g., different users), and can be processed to generate intermediate data, which itself can be processed to generate collaborative data. Collaborative data may include an exposable portion that is allowed to be shared and a restricted portion that is not allowed to be shared. Although the restricted portion of the collaborative data may not be shared, it may include an operable portion that may be used to derive collaborative intelligence that may be shared. In some implementations, collaborative intelligence may be derived from exposable data and/or restricted data, and the collaborative intelligence may be provided without exposing the restricted data. For example, configurable constraints may programmatically manage limitations (e.g., allowing some operations, but not others) on certain underlying data (e.g., personally identifiable information, some other sensitive information, or any other designated information that is collected, stored, or used) and how the underlying data can and cannot be accessed, used, stored, or displayed (or variations thereof). Further, the configurable constraints may programmatically support collaborative intelligence operations on accessible data (e.g., deriving aggregate statistics), without displaying the individual data entries that were operated on.

By relying on trustee computing to perform data processing, tenants can derive collaborative intelligence from each other's data without compromising data privacy. To accomplish this, the trustee environment can include one or more data privacy pipelines through which data can be ingested, fused, derived, and/or sanitized to generate collaborative data. A data privacy pipeline can be provided as a distributed computing or cloud computing service (cloud service) implemented in the trustee environment, and can be spun up and spun down as needed. In some implementations, tenants providing data into a data privacy pipeline cannot access the pipeline. Instead, the pipeline outputs collaborative data subject to constraints provided by one or more of the tenants. Depending on the designated constraints, the collaborative data can be output from the trustee environment (e.g., because it has been sanitized according to specified constraints) and/or may be stored in, and shielded by, the trustee environment. Shielded collaborative data can be queried to derive collaborative intelligence subject to the configurable constraints (e.g., without exposing the shielded collaborative data).

Generally, a data privacy pipeline can accept data provided by one or more tenants. Initially, the data privacy pipeline may determine whether input data is joint data pursuant to a contract or other tenant agreement with one or more tenants. Data that is determined to be joint data can be ingested, and data that is determined not to be joint data can be dropped. In this regard, joint data refers to any shared data that is designated for ingestion in generating collaborative data (e.g., a c designated or otherwise identified in a tenant agreement with one more tenants). Ingested data can include data from multiple sources, so the data privacy pipeline may fuse data from multiple sources according to computations and constraints specified in the tenant agreement. For example, constrained data fusion can implement one or more constraints to combine ingested data to form fused joint data in any number of ways, including the use of one or more join operations (e.g., left, right, inner, outer, anti), custom joins (e.g., via imperative scripts), data appends, normalization operations, some combination thereof, and others.

In some implementations, a data privacy pipeline can perform constrained computations to generate derived joint data. Constrained computing can take data from one source (e.g., ingested data, fused joint data) and perform any number of specified computations (e.g., arithmetic operations, aggregation, summarization, filtering, sorting, bounding). A simple example of a constraint computation is a calculation of average age per city, where the computation is only to be performed for a city if the underlying dataset includes entries for at least five people in the city. Additionally or alternatively, a data privacy pipeline can perform data sanitation to generate collaborative data that implements constraints for storage, access, precision, and the like. For example, data sanitation can implement constraints specified in the tenant agreement designating whether collaborative data should be shielded (e.g., stored in the trustee environment), whether collaborative data can be exported, whether exported collaborative data should be restricted (e.g., do not export email, credit card numbers, portions thereof), and the like. As such, a data privacy pipeline can generate collaborative data from data provided by one or more tenants, and provide agreed-upon access to the collaborative data without sharing the underlying raw data with all the tenants.

In some implementations, to enable constraint computing and querying, the use and generation of collaborative data in a trustee environment can be monitored and orchestrated subject to configurable constraints. At a high level, constraints can be provided through a user interface to enable tenants (e.g., customers, businesses, users) to specify desired computations and constraints on the use of and access to their data in the trustee environment, including eligible data sources and how their data may be processed or shared. Any number of various types of constraints may be implemented, including data access constraints, data processing constraints, data aggregation constraints, and data sanitation constraints.

For example, data access constraints can be specified to allow or forbid access (e.g., to a specific user, account, organization). In some implementations, designated constraints can be universal such that the constraints apply to all potential data consumers (e.g., only allow access to average age no matter the data consumer). In some implementations, a designated constraint can be applied to a designated user, account, organization, and the like (e.g., do not allow group A to access salary data, but allow group B to access it). Generally, a tenant may specify constraints defining how the tenant's data can be merged with designated datasets or portions thereof, constraints limiting the schema of data being read from the tenant's data (e.g., specifying horizontal filtering to be applied to a tenant's data), constraints limiting the size of ingested data (e.g., specifying storage limitations, sub-sampling of the tenant's data, vertical filtering to be applied to a tenant's data), constraints limiting the schema of collaborative data that can be output, constraints defining ownership of collaborative data, constraints defining whether collaborative data should be open, encrypted, or shielded (e.g., stored in the trustee environment), and the like.

In some implementations, various types of data processing constraints may be designated, such as constraints designating what operations can be performed (e.g., allowable and restricted computations, binary checks), constraints limiting a comparison precision (e.g., for numeric data, geographic data, date and time data), constraints limiting an accumulation precision (e.g., for geographical data, numerical data, date or time data), constraints limiting location bounding precision (e.g., limiting allowable geofencing determinations to specific grids, minimum geographic divisions such as neighborhood, county, city, state, or country, and the like), and other precision and/or data processing requirements.

Additionally or alternatively, one or more data aggregation constraints can be specified, such as constraints requiring a minimum aggregation amount (e.g., at least N rows or distinct field values), constraints requiring some statistical distribution condition to be valid (e.g., minimum standard deviation), constraints defining allowed aggregation functions (e.g., allow min, max, average, but not percentiles), to name a few examples.

In some implementations, one or more data sanitation constraints can be specified, such as constraints requiring sanitation of personally identifiable information (e.g., remove e-mails, names, IDs, credit card numbers), constraints requiring lower precision sanitation (e.g., lower the numeric, data and time, and/or geographical precision), constraints requiring sanitization of values coming from specific fields (which may entail tracking transformations applied in a data privacy pipeline), constraints requiring custom sanitations (e.g., requiring execution of one or more custom and/or third party sanitation scripts), constraints requiring data masking (e.g., output certain data such as phone numbers, credit cards, dates, but mask a portion of the number), and the like.

Additionally or alternatively to the constraints listed above, one or more constraints can be specified limiting a number of allowable queries and/or data accesses per unit time (e.g., minute, hour, day). Such a constraint can operate to reduce the risk of brute-force attempts to reverse engineer shielded data by asking a set of slightly different questions within a relatively small time window. In general, one or more custom constraints can be specified such as a constraint requiring that some designated property match some designated criteria. These and other types of constraints are contemplated within the present disclosure.

In some implementations, a constraint manager can monitor and orchestrate data flow, generation, and access, subject to the designated constraints. For example, the constraint manager can communicate with various components in the trustee environment (e.g., a data privacy pipeline) to implement the constraints, which may be maintained in a contract database accessible to the constraint manager. In some implementations, components can issue requests to the constraint manager for permission to execute a particular command, function call, or other executable unit of logic. The constraint manager can evaluate the request and grant or deny permission. In some cases, permission may be granted subject to one or more conditions corresponding to one or more of the constraints. By way of nonlimiting example, some possible conditions that can be implemented include requiring operations that shift, filter, or reshape data (e.g., application of comparison constraints such as only allowing a merge with certain precision), requiring substitution of one or more executable units of logic (e.g., commands or operations) with one or more constrained executable units of logic (e.g., replace average with constrained average), and the like.

Generally, a constraint can be checked, validated, or otherwise enforced at any time or step (e.g., in association with any portion of a data privacy pipeline, constrained querying). Accordingly, corresponding functionality enforcing a constraint can be applied at any step, or multiple steps. In some implementations, enforcement of certain constraints can be allocated to certain portions of a data privacy pipeline (e.g., data access constraints get applied during ingestion, processing and aggregation constraints get applied during data fusion and/or constrained computation, sanitation constraints get applied during data sanitation). In another example, a particular data access constraint (e.g., only pass data for patients who participated in at least five different studies) may be applied during data fusion. These are meant merely as examples, and any suitable constraint enforcement regime may be implemented within the present disclosure.

Enforcement of a constraint (e.g., precision or aggregation constraints) on a particular executable unit of logic (e.g., for a designated computation, a requested operation) can result in any number of scenarios. In one example, a particular executable unit of logic can be rejected entirely. In another example, a particular executable unit of logic can be allowed, but the result is filtered (e.g., no value is returned for a particular row or entry of data). In yet another example, a particular executable unit of logic can be allowed, but the result is changed (e.g., precision reduced, a question is answered with false). These and other variations may be implemented.

As constraints are applied to generate collaborative data, any combination of schema, constraints, and/or attribution metadata can be associated with the collaborative data, intermediate data used to arrive at the collaborative data, or otherwise. Generally, constraints can be enforced across multiple steps and computations. As such, in some implementations, applicable and/or satisfied constraints for each step can be tracked and/or associated with data produced by a given step. Taking aggregation constraints as an example, once an aggregation constraint has been fulfilled during a particular step, subsequent steps no longer need to consider this constraint. In another example where different constraints have been specified for different datasets to be merged, a merging operation may only need to apply the stricter constraint. Generally, an appropriate allocation or combination of constraints can be applied and/or tracked as data flows through a data privacy pipeline. This tracking can facilitate validating whether a particular constraint has been applied to particular data. Accordingly, as constraints are applied and data is generated, corresponding schema, applicable or satisfied constraints, and/or attribution metadata indicating ownership or providence can be associated with a dataset, or a corresponding entry, row, field, or other element of data. In some implementations, any intermediate data used in arriving at collaborative data (e.g., ingested data, fused joint data, derived joint data) may be deleted, and collaborative data may be stored in the trustee environment and/or provided as an output, depending on an applicable constraint.

In some implementations, constraint querying can be applied to allow data consumers to query collaborative data in a trustee environment subject to configurable constraints. At a high level, constraint querying can operate as a search engine that allows data consumers to access or derive collaborative intelligence from collaborative data without exposing underlying raw data provided by the tenants or collaborative data shielded by the trustee environment. Constraints can be applied in response to a query in any number of ways, including reformatting a query prior to execution, applying constraints after executing a query, constraining eligible queries for execution, applying access constraints prior to execution, and others.

By way of nonlimiting example, an issued query can be validated against a specified aggregation constraint by ensuring that the query contains at least one aggregation element and ensuring that the aggregation element(s) are consistent the aggregation constraint. In another example, an execution plan corresponding to the issued query can be executed, and the results can be validated against the aggregation constraint and/or the aggregation element(s) of the query (e.g., confirming the results correspond to a requested number of distinct rows, fields, statistical distribution). In some implementations, a constraint can be enforced on a corresponding element of a query by modifying the element based on the constraint (e.g., to limit a corresponding number of distinct rows, fields, statistical distribution), by executing the modified element prior to the other elements of the query, some combination thereof, or otherwise.

By way of background, queries are generally not executable code. In order to execute a query, it is normally converted into an execution plan that is executable. In some implementations, in order to enforce constraints on a received query, the query can be parsed into a corresponding execution tree comprising a hierarchical arrangement of executable units of logic that, when executed, implement the query. Applicable constraints can be accessed, and the executable units of logic can be validated against the constraints. In some implementations, if one or more of the executable units of logic is not allowed, the query can effectively be reformatted by altering one or more of the executable units of logic based on one or more constraints. More specifically, the execution tree corresponding to the query can be reformatted into a constrained execution tree by traversing the execution tree and replacing executable units of logic inconsistent with a particular constraint with custom executable units of logic that are consistent with the constraint. Additionally or alternatively, one or more executable units of logic may be added to the constrained execution tree to enforce constraints (e.g., precision constraints) on the output. These are simply meant as examples, and any suitable technique for generating a constrained execution tree can be implemented.

Generally, an executable unit of logic of an execution tree can be validated against a corresponding constraint context comprising an applicable accessed constraint and runtime information such as information identifying the requesting data consumer issuing the query, information identifying an applicable tenant agreement, information identifying target collaborative data on which to operate, and the like. Validation of an executable unit of logic can involve validation of a constituent command or operation, one or more constituent parameters, and/or consideration of other parts of the execution tree. Validation of an executable unit of logic can result in a number of possible results. For example, an executable unit of logic can be allowed (e.g., the executable unit of logic can be copied into a constrained execution tree), an executable unit of logic can be disallowed (e.g., the query can be disallowed in its entirety), or an executable unit of logic can be allowed but with changes (e.g., copying a corresponding constrained executable unit of logic into the constrained execution tree). In some implementations, the resulting constrained execution tree is translated into a language used by the trustee environment. The resulting execution tree can be executed (e.g., by traversing and executing the hierarchy of executable units of logic of the tree), and the results can be returned to the requesting data consumer.

Figure 24:
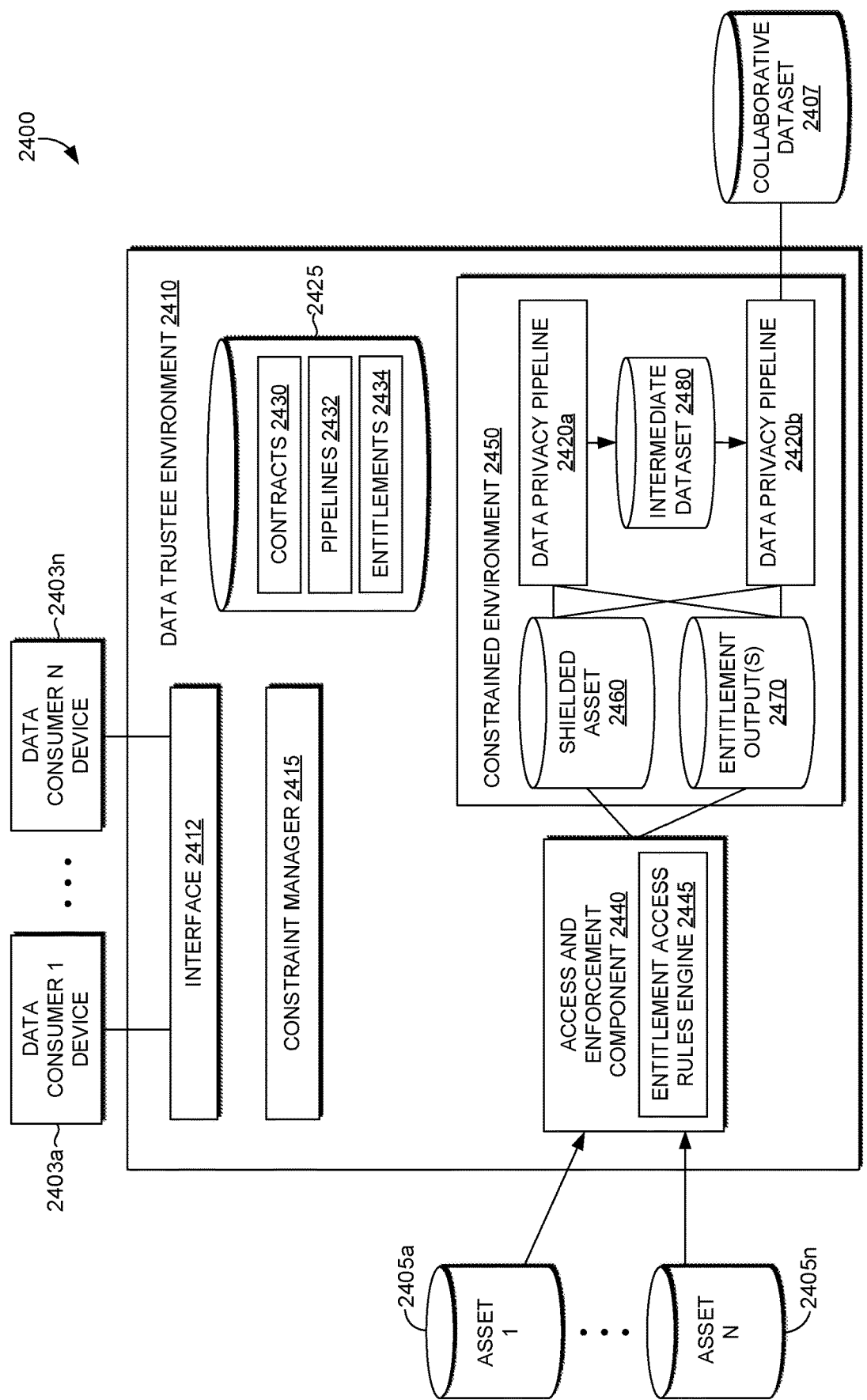
FIG. 24 is a block diagram of example collaborative intelligence environment, in accordance with certain implementations described herein.

FIG. 24 is a block diagram of example collaborative intelligence environment 2400 suitable for use in implementing aspects of the invention. Generally, collaborative intelligence environment 2400 is suitable for generation of collaborative intelligence, and, among other things, facilitates constraint computing and constraint querying. Collaborative intelligence environment 2400 or a portion thereof (e.g., data trustee environment 2410) may, but need not, be implemented in a distributed computing environment such as distributed computing environment 2500, discussed below with respect to FIG. 25. Any or all of the components of collaborative intelligence environment 2400 can be implemented as any kind of computing device, or some portion thereof. For example, in an implementation, data consumer devices 2403a through 2403n can each be a computing device such as computing device 2600, as described below with reference to FIG. 26. Further, data trustee environment 2410 may be implemented using one or more such computing devices. In implementations, these devices can be any combination of a personal computer (PC), a laptop computer, a workstation, a server, a mobile computing device, a PDA, a cell phone, or the like. The components of collaborative intelligence environment 2400 may communicate with each other via one or more networks, which may include, without limitation, one or more local area networks (LANs) and/or wide area networks (WANs). Such networking environments are commonplace in offices, enterprise-wide computer networks, intranets, and the Internet.

At a high level, collaborative intelligence environment 2400 may include a constrained environment (e.g. data trustee environment 2410, or portion thereof, such as constrained environment 2450) within with designated shielded assets are required to exist or execute. Generally, data trustee environment 2410 and/or constrained environment 2450 may be capable of deriving collaborative data using shielded assets (e.g., data, scripts, data privacy pipelines) provided by data owners or other authorized providers (e.g., tenants) subject to configurable constraints, without exposing the shielded assets. Any number of tenants can input or otherwise configure any number of assets (e.g., assets 2405a through 2405n) into data trustee environment 2410 and/or constrained environment 2450 and designate one or more constraints and/or policies governing their use. Data trustee environment 2410 and/or constrained environment 2450 can derive collaborative data (e.g., collaborative dataset 2407) based on the one or more constraints and/or policies.

As used herein, a constrained environment may refer to a secured, executable environment run by some sort of trusted party within which designated shielded assets can be accessed and/or used, while enforcing designated constraints and policies. The constrained environment may be capable of executing constrained computations to generate collaborative data using shielded assets (e.g., data, scripts, data privacy pipelines), without exposing the shielded assets, intermediate datasets, or other restricted data to unauthorized parties. For example, to avoid exposing restricted data, the constrained environment may be inaccessible to any tenants or data consumers (e.g., the constrained environment may have no network access). Any number of data consumers (e.g., operating one of data consumer devices 2403a through 2403n) may issue requests to trigger a pipeline or other computation that accesses and/or uses a shielded asset that is required to exist or execute within a constrained environment. Prior to triggering the requested pipeline or other computation, an enforcement mechanism may operate (e.g., via access and enforcement component 2440) to verify whether the data consumer's triggering of the requested pipeline or computation would satisfy the entitlements (i.e., constraints/policies defined by the entitlements). If approved, the constrained environment may execute the requested pipeline or computation. In some implementations, the constrained environment may temporarily store shielded assets, spin up a triggered data privacy pipeline or other applicable computations, generate any applicable intermediate datasets (e.g., intermediate dataset 2480), export collaborative data when authorized, and/or spin down any pipelines or other computations that were spun up (e.g., by deleting cached data such as intermediate datasets used in arriving at collaborative data, temporarily stored shielded assets), and/or the like. In some implementations, a constrained environment may be provided as part of a data trustee environment (e.g., constrained environment 2450 of data trustee environment), but this need not be the case. Although implementations are described herein with respect to constrained environment 2450, the configuration in FIG. 24 is not meant to limiting, and other configurations may be implemented within the scope of the present disclosure.

In the implementation illustrated in FIG. 24, data trustee environment 2410 may receive various requests to access shielded assets governed by a collaborative intelligence contract (e.g., via interface 2412). For example, a data consumer (e.g., operating one of data consumer devices 2403a through 2403n) may issue a request to trigger a pipeline that uses a shielded asset, a request to access a shielded asset through a governing entitlement, or some other type of request. In some implementations, tenants may store assets that are designated for use as shielded assets in data trustee environment 2410 (e.g., in storage allocated to the tenant). When a shielded asset is designated for use by a particular collaborative intelligence contract (e.g., a data privacy pipeline or entitlement), a digitized record associated with the contract, pipeline, and/or entitlement may include a reference or otherwise identify the location of the shielded asset. As such, when request to trigger a pipeline or computation received, any associated shielded assets may be identified (e.g., by constraint manager 2415 looking up shielded assets associated with an invoked contract 2430, pipeline 2432, and/or entitlement 2434), and access and enforcement component 2440 may determine whether to access each shielded asset associated with the request. In implementations where a requested shielded asset is governed by an entitlement (e.g., one of entitlements 2434), access and enforcement component 2440 may trigger entitlement access rules engine 2445 to determine whether a valid access path to the shielded asset exists through one of the contracts 2430. If access to a shielded asset is granted, access and enforcement component 2440 may ingest the shielded asset into a secured, constrained, and/or sandboxed portion of data trustee environment 2410, such as constrained environment 2450.

In some implementations, digitized representations of collaborative intelligence contracts 2430, data privacy pipelines 2432, and/or entitlements 2434 may be maintained in a contract database 2425 accessible to constraint manager 2415. For example, a contractual agreement to share data may be stored using one or more data structures in a manner that digitally represents, references, or otherwise identifies the contract (e.g., a unique identifier), authorized participants and data consumers, access rights, shielded assets, computational steps, ownership/export permission, and/or the like. Thus, a digitized collaborative intelligence contract 2430 may designate and/or parameterize access to any number of shielded assets may only be used within a constrained environment. Example shielded assets include datasets, computational steps, pipelines, jobs, queries, audit events, and the like.

In some cases, a digitized contract 2430 may identify an associated data privacy pipeline 2432 and/or vice versa. In one example, a digitized contract between participants may define an associated data privacy pipeline that has been agreed upon among the participants. In this case, the digitized contract and associated data privacy pipeline may be associated with one another. In another example, a first data privacy pipeline defined by a first contract may be built upon in some manner (e.g., building off an intermediate dataset generated by an intermediate step of the data privacy pipeline, building off data generated by a final or output step of the data privacy pipeline), and used in a second data privacy pipeline that uses shielded assets governed by a second contract. Thus, some data privacy pipelines may be based on and traceable to multiple contracts. As such, each digitized contract that governs access to a shielded asset used in a multi-contract pipeline may be associated with the multi-contract pipeline. Since pipelines may be created based on many contracts, it should be understood that a digitized contract and a data privacy pipeline may be distinct entities, in certain implementations. A digitized contract 2430 and/or an associated pipeline 2432 may digitally represent an authorized access path through computational steps of the pipeline (e.g., via a graph with nodes and edges), and may digitally represent associated constraints and an indication of whether a particular constraint has been satisfied (e.g., via node or edge properties).

In some cases, a digitized contract 2430 may identify an associated entitlement 2434 to a shielded asset. In one example, a digitized contract between participants may define an associated entitlement, from a grantor, granting a beneficiary access to a shielded asset (e.g., dataset or script owned by the grantor, a data privacy pipeline where the grantor is an authorized participant, an intermediate dataset to be generated by an intermediate step of a data privacy pipeline where the grantor is an authorized participant). In some cases, an entitlement defined by a particular contract may be built upon in some manner, for example, by using an entitlement output in a pipeline that uses shielded assets for which access is governed by some other contract, and/or by using an entitlement output in a pipeline that uses an entitlement output from some other entitlement governed by some other contract. Thus, a particular pipeline may be based on multiple entitlements and/or multiple contracts, and any of these digitized entities may be associated with and traceable to one another. For example, each digitized contract that governs an entitlement to a shielded asset may be associated with and traceable to any pipeline that uses the entitlement or shielded asset. In another example, each entitlement may be associated with and traceable to each digitized contract that governs access to a shielded asset used by the entitlement (e.g., an entitlement to an intermediate dataset or a completed output from a multi-contract pipeline). Since entitlements may be granted on shielded assets governed by multiple contracts, it should be understood that a digitized contract 2430 and a digitized entitlement 2434 may be distinct entities, in certain implementations. In some implementations, a digitized entitlement 2434 may identify associated executable constraints to be applied upon accessing a shielded asset. Additionally or alternatively, a digitized entitlement 2434 may identify associated executable policies to be carried with an entitlement output and applied during downstream use. Some policies may be satisfied and extinguished upon execution (e.g., an aggregation script), while others may be carried and applied downstream.

Generally, a digitized contract 2430, an associated entitlement 2434, and/or an associated pipeline 2432 may be associated with a digital representation of an authorized access path through the entitlement 2434 and/or the associated pipeline 2432 (e.g., via a graph with nodes and edges), and may be associated with a digital representation of associated constraints, policies, and/or an indication of whether a particular constraint or policy has been satisfied (e.g., via node or edge properties).

In the implementation illustrated in FIG. 24, when data trustee environment receives a request to trigger a data privacy pipeline or some other computation (e.g., via interface 2412), access and enforcement component 2440 may determine whether to grant access to each shielded asset associated with the request. In some implementations, any number of tenants (e.g., of data trustee environment 2410) can designate any number of shielded assets for use by any number of data privacy pipelines and/or entitlements. In some cases, an asset designated by a tenant for use as a shielded asset may be stored in a portion of data trustee environment 2410 allocated to the tenant for the tenant's use. In some cases, an asset designated by a tenant for use as a shielded asset may be stored outside data trustee environment at a designated location that is accessible to the data trustee environment. In any event, upon receiving a request that would require access to a shielded asset (e.g., a request to trigger a data privacy pipeline that uses the shielded asset, a request to access the shielded asset through an entitlement), access and enforcement component 2440 may evaluate the access request and determine whether to grant access, as explained in more detail below. Any suitable access control technique or tool may be used (e.g., role based access control, access control lists, data governance tools) such that access can be evaluated on the basis of any suitable identity (e.g., user identity, role, group, some other attribute). If access is granted, the requested asset(s) may be ingested into a secured, constrained, and/or sandboxed portion of data trustee environment 2410, such as constrained environment 2450, where it may be used as a shielded asset.

Access and enforcement component 2440 may determine whether to grant access to each shielded asset associated with the request in any suitable manner. For example, an incoming request to trigger a particular data privacy pipeline may include an identification that can be used to look up associated parameters in contract database 2425, including any associated contracts, entitlements, and/or other related data privacy pipelines (e.g., which may be part of the triggered pipeline), any of which may be used to look up associated shielded assets that would be required in order to execute the requested pipeline. The determination whether to grant access to each shielded asset may depend on whether a requested pipeline includes any entitlements. For example, if a participant to a data privacy pipeline without any entitlements requests to trigger the pipeline, access to any shielded assets used by the data privacy pipeline may have already been agreed upon by the participants. As such, access and enforcement component 2440 may determine that participants to a data privacy pipeline without any entitlements are authorized to access the associated shielded assets and export the resulting dataset (e.g., collaborative dataset 2407). In implementations where an associated shielded asset is governed by an entitlement (e.g., one of entitlements 2434), access and enforcement component 2440 may trigger entitlement access rules engine 2445 to determine whether a valid access path to the shielded asset exists through one of the contracts 2430, as described in more detail below. Additionally or alternatively, access and enforcement component 2440 may determine whether any requested outputs that rely on or otherwise derive from an entitlement (e.g., a request to generate and export collaborative data out of constrained environment 2450 and/or data trustee environment 2410) are consistent with any designated data ownership rights and/or permissions to export. If access and enforcement component 2440 determines that a requesting data consumer is authorized to access the associated shielded assets and export the requested dataset, access and enforcement component 2440 may trigger constrained environment 2450 to execute the requested pipeline or other computation.

If access is granted, access and enforcement component 2440 may trigger constrained environment 2450 to ingest any associated shielded assets 2460 and/or generate any entitlement outputs 2470. For example, constrained environment 2450 may access any assets associated with a request (e.g., from a tenant's account storage) and/or may ingest and temporarily store them (or a requested portion thereof) in constrained environment 2450 as shielded assets 2460. In some scenarios, any of shielded assets 2460 may be used as an entitlement output. Additionally or alternatively, in implementations where an entitlement specifies some entitlement constraints that require some additional processing (e.g., sanitation constraints), constrained environment 2450 may apply the entitlement constraints to generate entitlement outputs 2470 from ingested shielded assets 2460 and/or may temporarily store them in constrained environment 2450. As such, constrained environment may spin up a triggered data privacy pipeline (e.g., data privacy pipelines 2420a and 2420b) or other applicable computations, generate any applicable intermediate datasets (e.g., intermediate dataset 2480), export collaborative data (e.g., collaborative dataset 2407) when authorized, and/or spin down any pipelines or other computations that were spun up (e.g., by deleting cached data such as intermediate datasets used in arriving at collaborative data, temporarily stored shielded assets), and/or the like.

Upon receiving a request to trigger a particular pipeline, entitlement access rules engine 2445 may access all root entities of the pipeline that require an entitlement, load all contracts and/or corresponding pipelines that reference one of the root entities, and search for one valid access path through the loaded contracts/pipelines. To accomplish this, entitlement access rules engine 2445 may advance through the steps of each pipeline, verifying any applicable constraints and policies on each step. If only one contract allows access to a particular root entity through a single access path, entitlement access rules engine 2445 may designate the access path for use. If multiple contracts and/or multiple access paths allow access to a particular root entity, entitlement access rules engine 2445 may apply configured and/or pre-defined conflict rules to choose which contract and access path to designate for use. If all root entities have a valid access path, entitlement access rules engine 2445 may authorize the request and trigger constrained environment 2450 to execute the requested pipeline using the identified access path for each root entity.

As such, using implementations described herein, users can efficiently and effectively share data through a data trustee that allows them derive collaborative intelligence, while ensuring data privacy and providing configurable control and access to shared data. Related techniques are described in U.S. patent application Ser. No. 17/009,414, filed on Sep. 1, 2020, entitled "Chaining, Triggering, and Enforcing Entitlements," U.S. patent application Ser. No. 16/736,399, filed on Jan. 7, 2020, entitled "Multi-Participant and Cross-Environment Pipelines," U.S. patent application Ser. No. 16/665,916, filed on Oct. 28, 2019, entitled "User Interface for Building a Data Privacy Pipeline and Contractual Agreement to Share Data," and U.S. patent application Ser. No. 16/388,696, filed on Apr. 18, 2019, entitled "Data Privacy Pipeline Providing Collaborative Intelligence And Constraint Computing," the contents of each of which are incorporated by reference herein in their entirety.

Example Distributed Computing Environment

Figure 25:
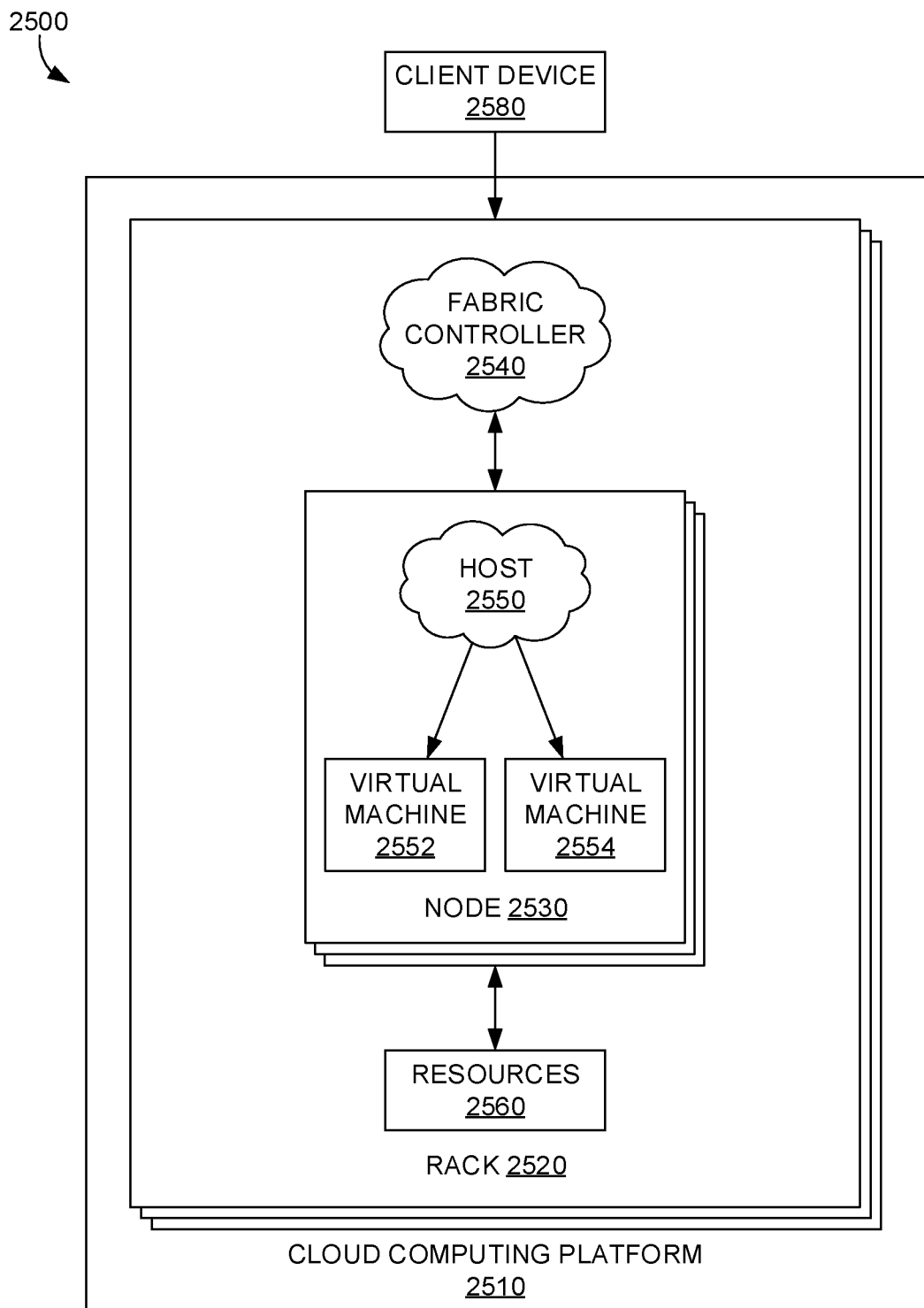
FIG. 25 is a block diagram of an example distributed computing environment suitable for use in implementing certain implementations described herein.

Referring now to FIG. 25, FIG. 25 illustrates an example distributed computing environment 2500 in which implementations described in the present disclosure may be employed. In particular, FIG. 25 shows a high level architecture of an example cloud computing platform 2510 that can host a collaborative intelligence environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions, etc.) can be used in addition to or instead of those shown.

Data centers can support distributed computing environment 2500 that includes cloud computing platform 2510, rack 2520, and node 2530 (e.g., computing devices, processing units, or blades) in rack 2520. The collaborative intelligence environment and/or data trustee environment can be implemented with cloud computing platform 2510 that runs cloud services across different data centers and geographic regions. Cloud computing platform 2510 can implement fabric controller 2540 component for provisioning and managing resource allocation, deployment, upgrade, and management of cloud services. Typically, cloud computing platform 2510 acts to store data or run service applications in a distributed manner. Cloud computing infrastructure 2510 in a data center can be configured to host and support operation of endpoints of a particular service application. Cloud computing infrastructure 2510 may be a public cloud, a private cloud, or a dedicated cloud.

Node 2530 can be provisioned with host 2550 (e.g., operating system or runtime environment) running a defined software stack on node 2530. Node 2530 can also be configured to perform specialized functionality (e.g., compute nodes or storage nodes) within cloud computing platform 2510. Node 2530 is allocated to run one or more portions of a service application of a tenant. A tenant can refer to a customer utilizing resources of cloud computing platform 2510. Service application components of cloud computing platform 2510 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 2530, nodes 2530 may be partitioned into virtual machines (e.g., virtual machine 2552 and virtual machine 2554). Physical machines can also concurrently run separate service applications. The virtual machines or physical machines can be configured as individualized computing environments that are supported by resources 2560 (e.g., hardware resources and software resources) in cloud computing platform 2510. It is contemplated that resources can be configured for specific service applications. Further, each service application may be divided into functional portions such that each functional portion is able to run on a separate virtual machine. In cloud computing platform 2510, multiple servers may be used to run service applications and perform data storage operations in a cluster. In particular, the servers may perform data operations independently but exposed as a single device referred to as a cluster. Each server in the cluster can be implemented as a node.

Client device 2580 may be linked to a service application in cloud computing platform 2510. Client device 2580 may be any type of computing device, which may correspond to computing device 2500 described with reference to FIG. 25, for example. Client device 2580 can be configured to issue commands to cloud computing platform 2510. In implementations, client device 2580 may communicate with service applications through a virtual Internet Protocol (IP) and load balancer or other means that direct communication requests to designated endpoints in cloud computing platform 2510. The components of cloud computing platform 2510 may communicate with each other over a network (not shown), which may include, without limitation, one or more local area networks (LANs) and/or wide area networks (WANs).

Example Operating Environment

Figure 26:
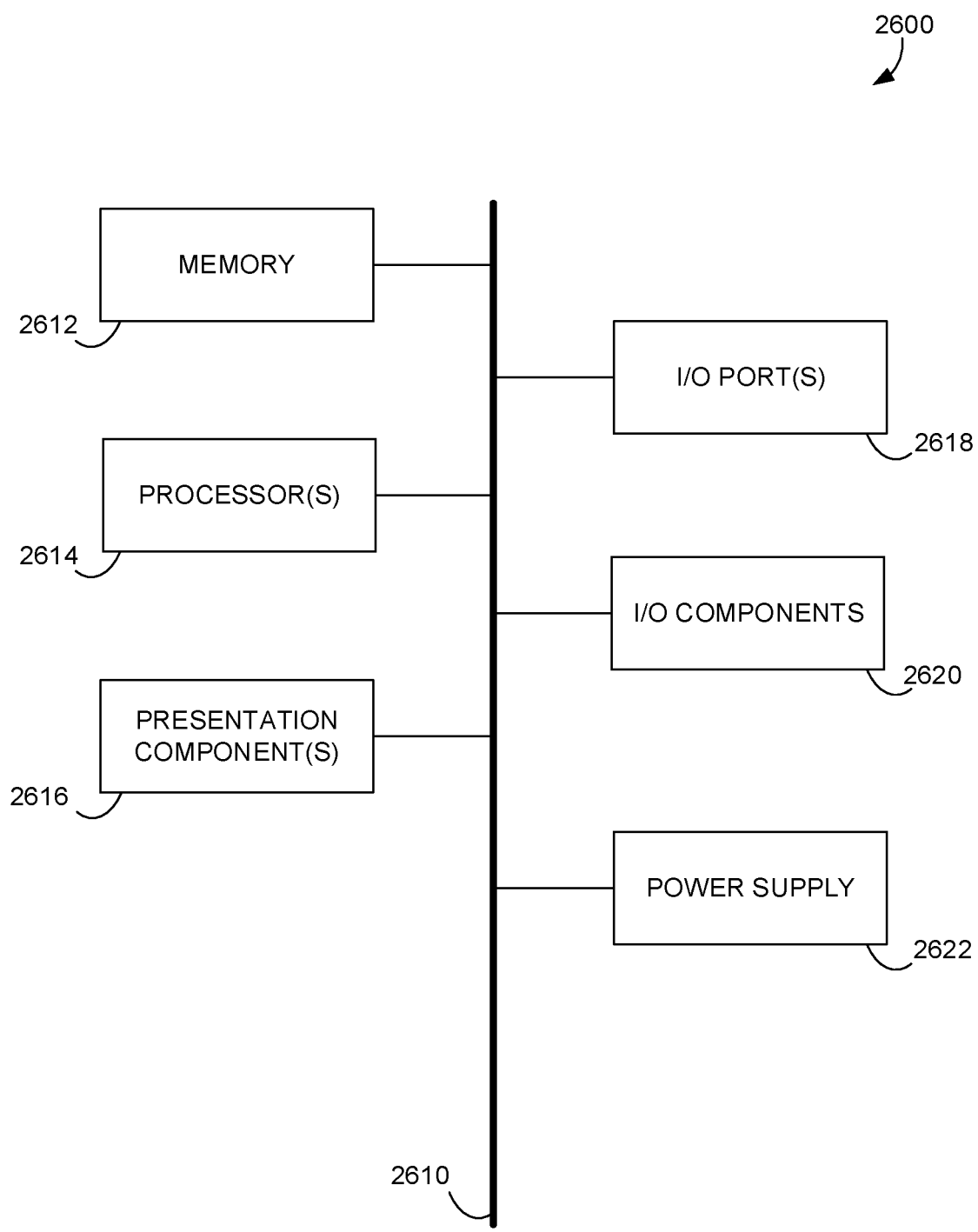
FIG. 26 is a block diagram of an example computing environment suitable for use in implementing certain implementations described herein.

Having briefly described an overview of certain implementations, an example operating environment is described below in order to provide a general context in which various aspects of the present invention may operate. Referring initially to FIG. 26 in particular, an example operating environment for implementing aspects of the present invention is shown and designated generally as computing device 2600. Computing device 2600 is but one example of a suitable computing environment and is not intended to suggest any limitation as to the scope of use or functionality of the invention. Neither should computing device 2600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 26, computing device 2600 includes bus 2610 that directly or indirectly couples the following devices: memory 2612, one or more processors 2614, one or more presentation components 2616, input/output ports 2618, input/output components 2620, and illustrative power supply 2622. Bus 2610 represents what may be one or more buses (such as an address bus, data bus, or combination thereof). The various blocks of FIG. 26 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 26 is merely illustrative of an example computing device that can be used in connection with one or more implementations of the present invention. Distinction is not made between such categories as "workstation," "server," "laptop," "hand-held device," etc., as all are contemplated within the scope of FIG. 26 and reference to "computing device."

Computing device 2600 typically includes a variety of computer-readable media. Computer-readable media can be any available media that can be accessed by computing device 2600 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 2600. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 2612 includes computer storage media in the form of volatile and/or nonvolatile memory. The memory may be removable, non-removable, or a combination thereof. Exemplary hardware devices include solid-state memory, hard drives, optical-disc drives, etc. Computing device 2600 includes one or more processors that read data from various entities such as memory 612 or I/O components 2620. Presentation component(s) 2616 present data indications to a user or other device. Exemplary presentation components include a display device, speaker, printing component, vibrating component, etc.

I/O ports 2618 allow computing device 2600 to be logically coupled to other devices including I/O components 2620, some of which may be built in. Illustrative components include a microphone, joystick, game pad, satellite dish, scanner, printer, wireless device, etc.

With reference to the collaborative intelligence environment described herein, implementations described herein support constraint computing and/or constraint querying. The components of the collaborative intelligence environment can be integrated components that include a hardware architecture and a software framework that support constraint computing and/or constraint querying functionality within a collaborative intelligence system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with implementations of the present invention.

By way of example, the collaborative intelligence system can include an API library that includes specifications for routines, data structures, object classes, and variables may support the interaction between the hardware architecture of the device and the software framework of the collaborative intelligence system. These APIs include configuration specifications for the collaborative intelligence system such that the different components therein can communicate with each other in the collaborative intelligence system, as described herein.

Having identified various components utilized herein, it should be understood that any number of components and arrangements may be employed to achieve the desired functionality within the scope of the present disclosure. For example, the components in the implementations depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an implementation that is claimed may contain a reference, in the alternative, to more than one other implementation. The implementation that is claimed may specify a further limitation of the subject matter claimed.

The subject matter of implementations of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, implementations of the present invention are described with reference to a distributed computing environment; however the distributed computing environment depicted herein is merely exemplary. Components can be configured for performing novel aspects of various implementations, where the term "configured for" can refer to "programmed to" perform particular tasks or implement particular abstract data types using code. Further, while implementations of the present invention may generally refer to the collaborative intelligence environment and the schematics described herein, it is understood that the techniques described may be extended to other implementation contexts.

Embodiments of the present invention have been described in relation to particular implementations which are intended in all respects to be illustrative rather than restrictive. Alternative implementations will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer system comprising:
one or more computer storage media storing computer-useable instructions that, when used by one or more computing devices, cause the one or more computing devices to perform operations comprising:
providing, to a first collaborator of a group of collaborators, access to a template data collaboration app that bundles a template data pipeline and a template governing contract, and includes references to an anonymous placeholder participant;
generating, from the template data collaboration app, a data collaboration app based at least on programmatically replacing the references to the anonymous placeholder participant with references to the first collaborator, the data collaboration app defining a data pipeline and a contract between the collaborators governing use of collaborator assets referenced by the data pipeline; and
enabling the first collaborator to trigger execution of the data pipeline in a data trustee environment to generate derived data from the collaborator assets without exposing the collaborator assets.

2. The computer system of claim 1, the operations further comprising providing an electronic canvas that visually represents the data pipeline as a flow diagram with elements joined by connections that represent data flow through the data pipeline.

3. The computer system of claim 1, wherein the data collaboration app bundles multiple data pipelines including the data pipeline, the operations further comprising providing an electronic canvas that visually represents the multiple data pipelines.

4. The computer system of claim 1, wherein the data collaboration app bundles multiple contracts including the contract, the operations further comprising providing an electronic canvas that visually represents traceability between the collaborator assets in the data pipeline and the multiple contracts by visualizing which of the collaborator assets are enabled by which of the multiple contracts.

5. The computer system of claim 1, the operations further comprising providing an electronic canvas that visually represents traceability between the collaborator assets in the data pipeline and the collaborators by visualizing which of the collaborators contributes which of the collaborator assets.

6. The computer system of claim 1, the operations further comprising, in response to receiving an input adding into the template data pipeline a placeholder for an asset associated with the anonymous placeholder participant, generating the template governing contract with a template entitlement granted by the anonymous placeholder participant enabling use of the asset in the data trustee environment.

7. The computer system of claim 1, the operations further comprising, in response to receiving an input from a developer sharing a developer copy of the template data collaboration app with the first collaborator, generating the template data collaboration app from the developer copy.

8. The computer system of claim 1, the operations further comprising disallowing sharing the template data collaboration app based on a determination that the template data collaboration app includes a reference to one of the collaborator assets.

9. One or more computer storage media storing computer-useable instructions that, when executed by one or more computing devices, cause the one or more computing devices to perform operations comprising:
providing, to a first collaborator of a group of collaborators, access to a template data collaboration app that bundles a template data pipeline and a template governing contract;
generating, from the template data collaboration app, a data collaboration app based at least on input filling in a placeholder element with a reference to a collaborator asset of the first collaborator, the data collaboration app defining a data pipeline and a contract between two or more of the collaborators governing use of the collaborator asset, without exposing the collaborator asset to the collaborators; and
enabling one of the collaborators to trigger execution of the data pipeline in a data trustee environment to generate derived data from the collaborator asset without exposing the collaborator asset.

10. The one or more computer storage media of claim 9, the operations further comprising providing an electronic canvas that visually represents the data pipeline as a flow diagram with elements joined by connections that represent data flow through the data pipeline.

11. The one or more computer storage media of claim 9, wherein the data collaboration app bundles multiple data pipelines including the data pipeline, the operations further comprising providing an electronic canvas that visually represents the multiple data pipelines.

12. The one or more computer storage media of claim 9, wherein the data collaboration app bundles multiple contracts including the contract, the operations further comprising providing an electronic canvas that visually represents traceability between collaborator assets in the data pipeline and the contracts by visualizing which of the collaborator assets are enabled by which of the multiple contracts.

13. The one or more computer storage media of claim 9, the operations further comprising providing an electronic canvas that visually represents traceability between collaborator assets in the data pipeline and the collaborators by visualizing which of the collaborators contributes which of the collaborator assets.

14. The one or more computer storage media of claim 9, the operations further comprising, in response to receiving an input adding into the template data pipeline the placeholder for the collaborator asset, generating the template governing contract with a template entitlement granted by an anonymous placeholder participant enabling use of the collaborator asset in the data trustee environment.

15. The one or more computer storage media of claim 9, the operations further comprising, in response to receiving an input from a developer sharing a developer copy of the template data collaboration app with the first collaborator, generating the template data collaboration app from the developer copy.

16. The one or more computer storage media of claim 9, the operations further comprising disallowing sharing of the template data collaboration app based on a determination that the template data collaboration app includes a reference to a dataset of one of the collaborators.

17. A method comprising:
providing, to a first collaborator of a group of collaborators, access to a template data collaboration app that bundles a template data pipeline and a template governing contract, and includes references to an anonymous placeholder participant;
generating, from the template data collaboration app, a data collaboration app based at least on programmatically replacing the references to the anonymous placeholder participant with references to the first collaborator, the data collaboration app defining a data pipeline and a contract between the collaborators governing use of collaborator assets referenced by the data pipeline; and
enabling the first collaborator to trigger execution of the data pipeline in a data trustee environment to generate derived data from the collaborator assets without exposing the collaborator assets.

18. The method of claim 17, further comprising providing an electronic canvas that visually represents the data pipeline as a flow diagram with elements joined by connections that represent data flow through the data pipeline.

19. The method of claim 17, wherein the data collaboration app bundles multiple data pipelines including the data pipeline, the method further comprising providing an electronic canvas that visually represents the multiple data pipelines.

20. The method of claim 17, wherein the data collaboration app bundles multiple contracts including the contract, the method further comprising providing an electronic canvas that visually represents traceability between the collaborator assets in the data pipeline and the multiple contracts by visualizing which of the collaborator assets are enabled by which of the multiple contracts.

* * * * *